United States Patent
Oka et al.

(10) Patent No.: US 7,336,360 B2
(45) Date of Patent: Feb. 26, 2008

(54) IMAGING POLARIMETRY

(75) Inventors: Kazuhiko Oka, Sapporo (JP);
Tomohiro Mizuno, Sapporo (JP);
Atsushi Taniguchi, Sapporo (JP);
Hiroshi Okabe, Kyoto (JP)

(73) Assignees: National University Corporation Hokkaido University, Sapporo-Shi (JP); Omron Corporation, Kyoto-Shi (JP)

( * ) Notice: Subject to any disclaimer, the term of this patent is extended or adjusted under 35 U.S.C. 154(b) by 164 days.

(21) Appl. No.: 11/352,458

(22) Filed: Feb. 13, 2006

(65) Prior Publication Data

US 2007/0030551 A1 Feb. 8, 2007

(30) Foreign Application Priority Data

Aug. 2, 2005 (JP) .......................... P2005-224600

(51) Int. Cl.
*G01J 4/00* (2006.01)
(52) U.S. Cl. ...................... 356/367; 356/365; 356/369
(58) Field of Classification Search ................ 356/365, 356/367
See application file for complete search history.

(56) References Cited

U.S. PATENT DOCUMENTS

2005/0007591 A1* 1/2005 Shribak et al. ............. 356/364

OTHER PUBLICATIONS

Oka, K., et al., "Compact complete imaging polarimeter using birefringent wedge prisms", Optics Express, vol. 11, No. 13, pp. 1510-1519 (Jun. 2003).
Kaneko, T., et al., "Two-dimensional Mapping of Polarization Using Birefringent Wedges," The 49th Extended Abstracts, Japan Society of Applied Physics and Related Societies, p. 977 (2002).

* cited by examiner

*Primary Examiner*—Roy M. Punnoose
(74) *Attorney, Agent, or Firm*—Foley & Lardner LLP

(57) ABSTRACT

To effectively reduce a measurement error in a parameter indicating two-dimensional spatial distribution of a state of polarization generated by variations in retardation of a birefringent prism pair due to a temperature change or other factors, while holding a variety of properties of an imaging polarimetry using the birefringent prism pair. By noting that reference phase functions $\phi_1(x, y)$ and $\phi_2(x, y)$ are obtained by solving an equation from each vibration component contained in an intensity distribution $I(x, y)$, the reference phase functions $\phi_1(x, y)$ and $\phi_2(x, y)$ are calibrated concurrently with measurement of two-dimensional spatial distribution $S_0(x, y)$, $S_1(x, y)$, $S_2(x, y)$, and $S_3(x, y)$ of Stokes parameters.

17 Claims, 25 Drawing Sheets

Birefringent prism pair BPP₁

Fig. 4
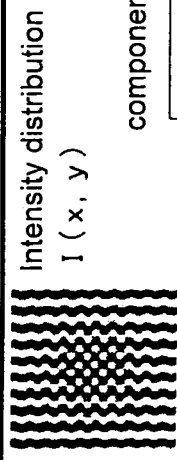
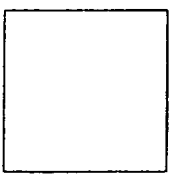
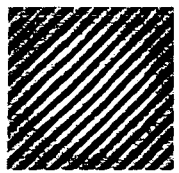
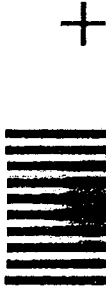
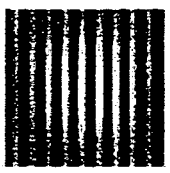
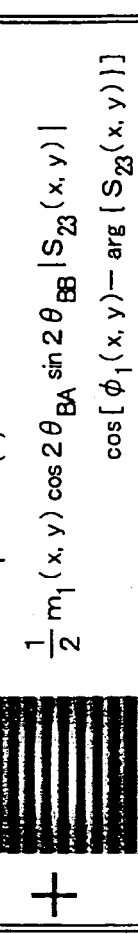
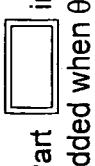

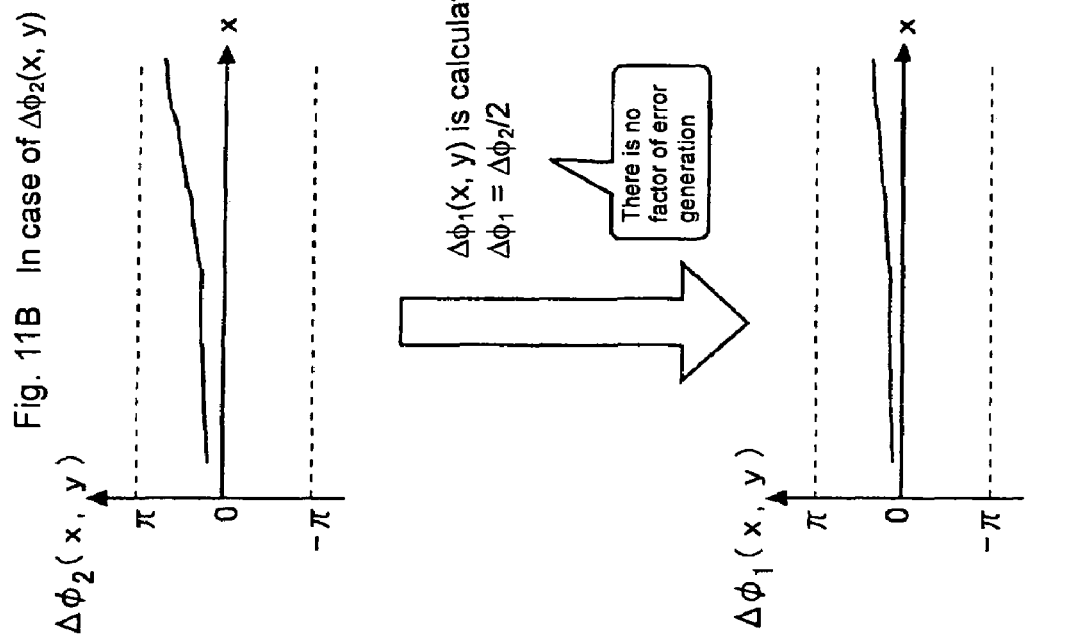
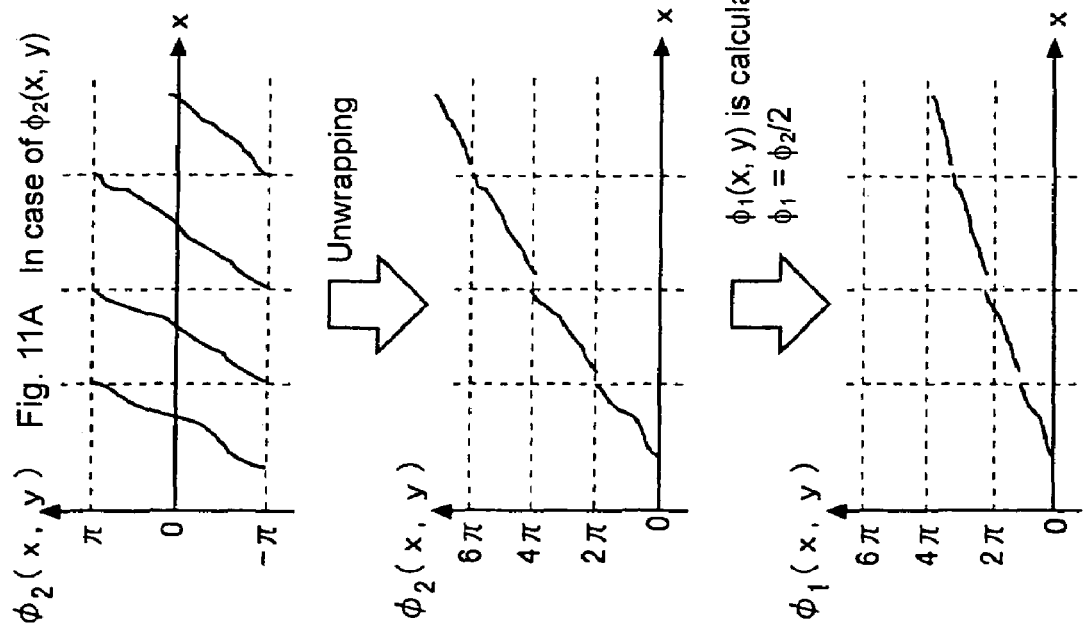

Fig. 16A + 3°C
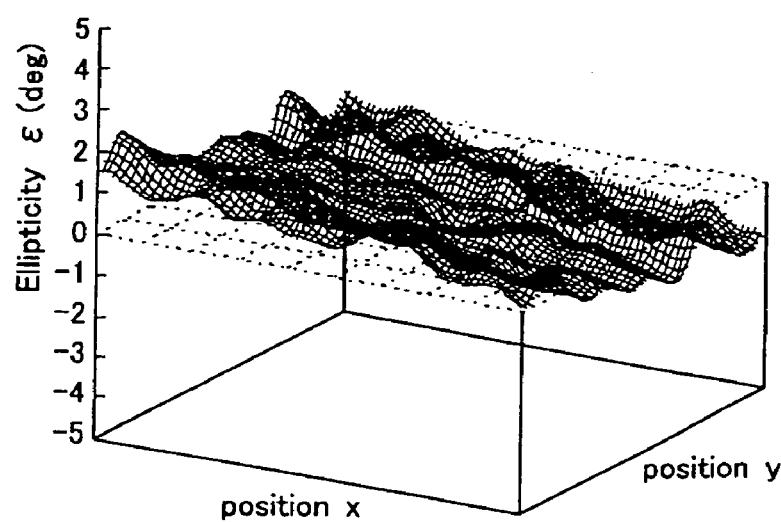
Fig. 16B + 6°C
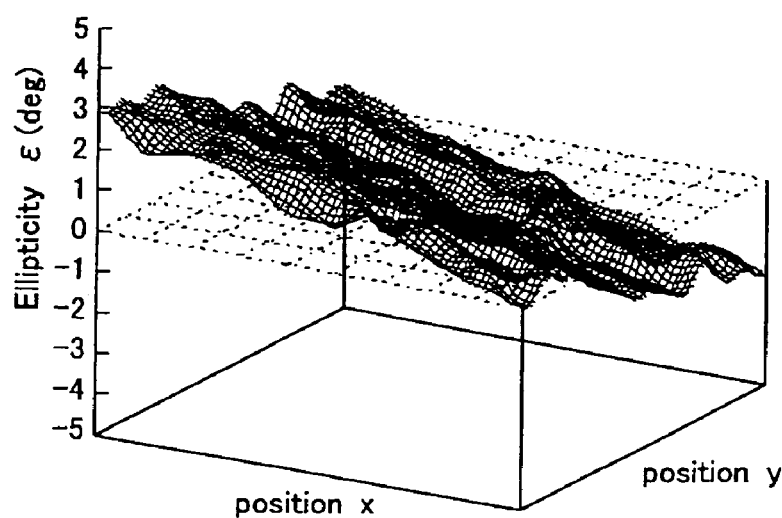
Fig. 16C + 9°C
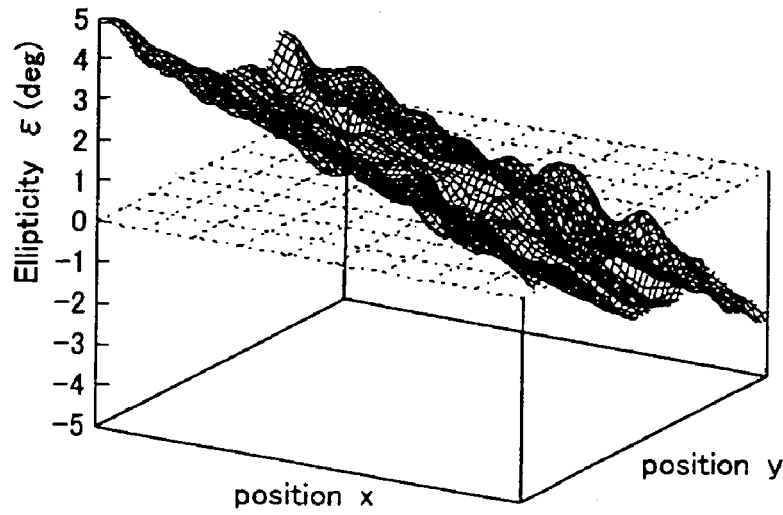

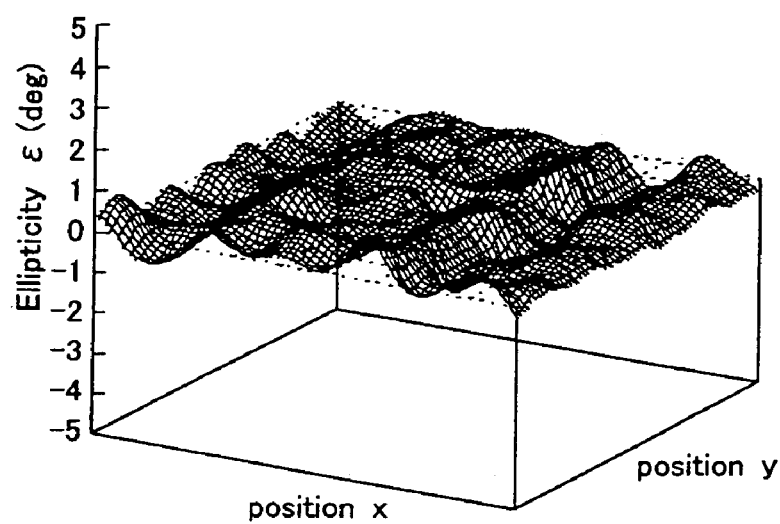
Fig. 17A + 3°C
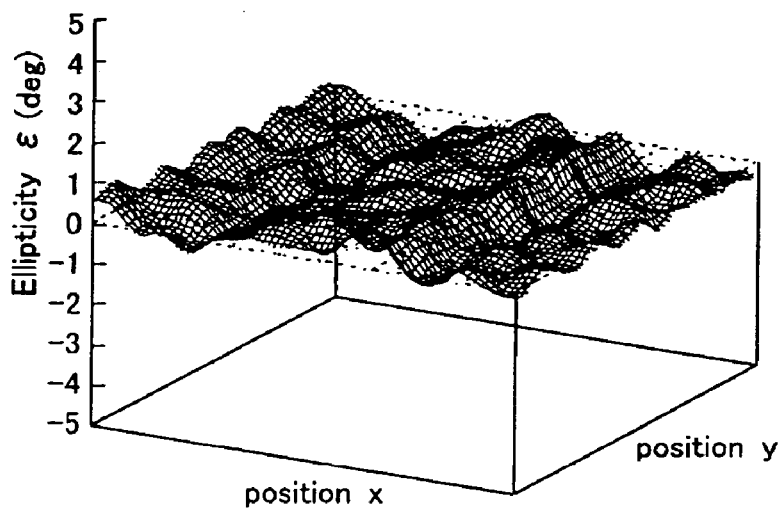
Fig. 17B + 6°C
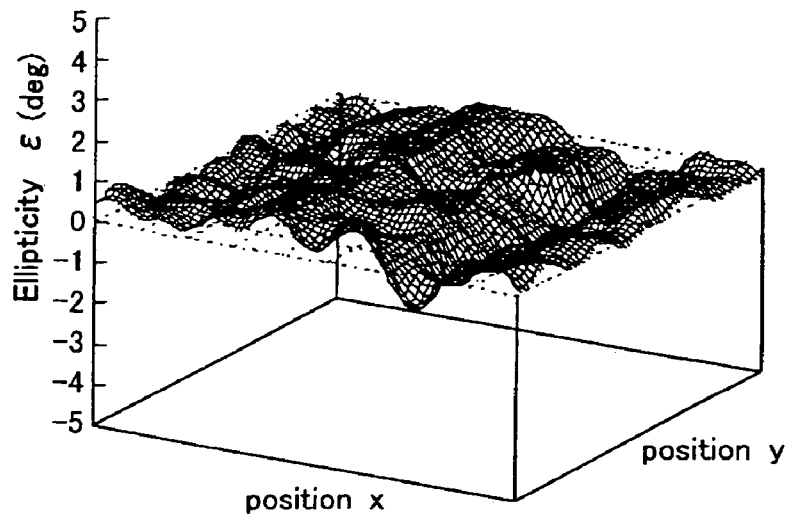
Fig. 17C + 9°C

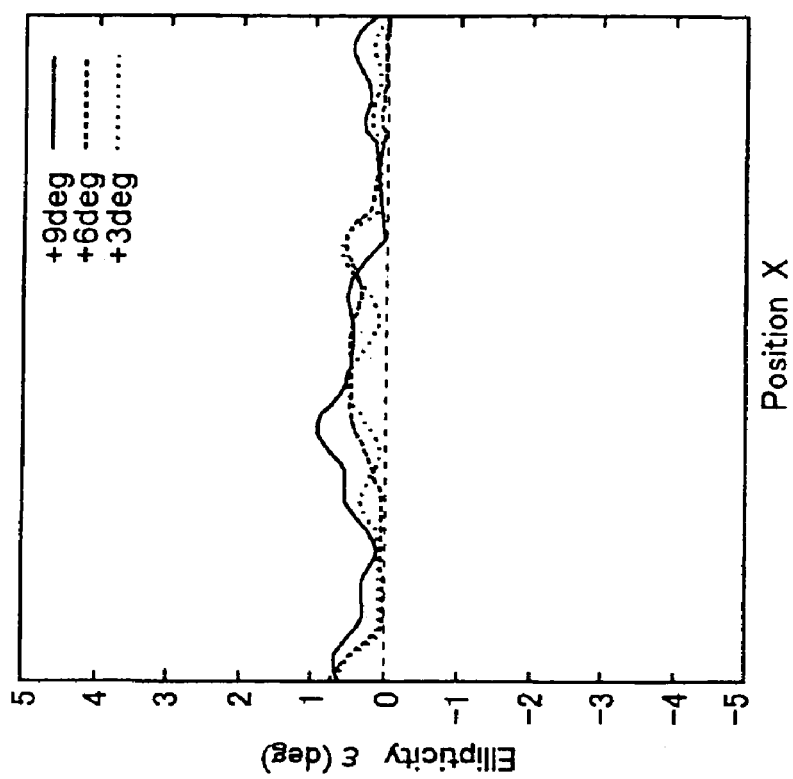
Fig. 18B  Pre-calibration and calibration during measurement
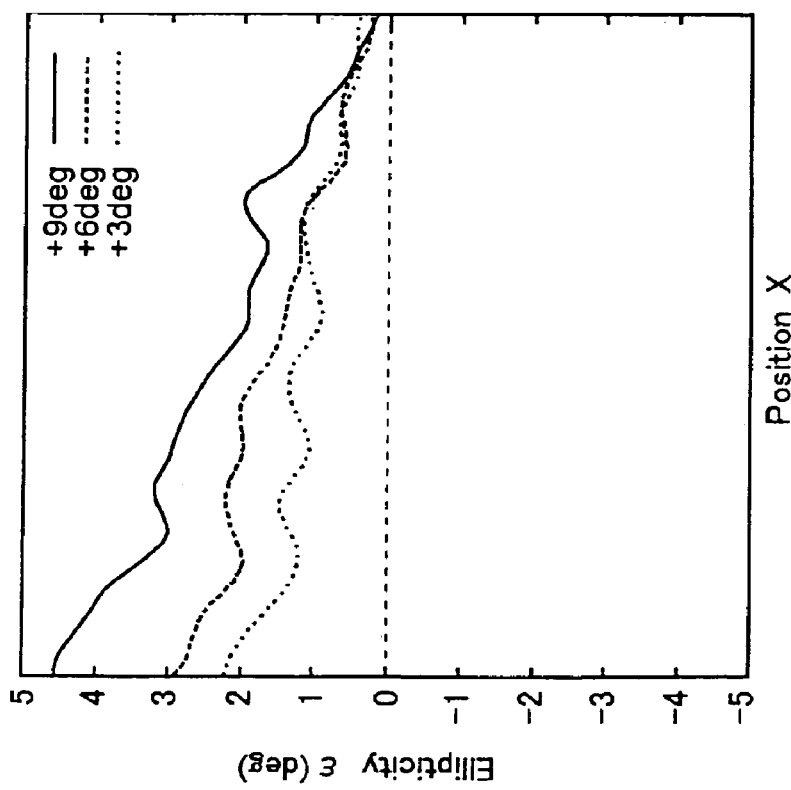
Fig. 18A  Only pre-calibration

IMAGING POLARIMETRY

BACKGROUND OF THE INVENTION

1. Field of the Invention

The present invention relates to an imaging polarimetry in which, and an imaging polarimeter with which, a two-dimensional spatial distribution of a state of polarization of light under measurement is measured by the use of a birefringent prism pair.

2. Description of the Related Art

Light has properties of a "transverse wave". Based upon the premise of three mutually orthogonal axes (x, y, z), when a propagation direction of light is assumed to be the z-axis direction, a vibration direction of the light is a direction along the x-y plane. The vibration direction of the light within the x-y plane has a bias. This bias of light is referred to as "polarization". A biased state of light is referred to as a "state of polarization (SOP)" in this specification. Typically, the SOP varies depending upon positions (coordinates) in the two-dimensional x-y plane.

When light in some state of polarization is incident on an object under measurement to acquire emitted light such as transparent or reflected light and the object under measurement has optical anisotropy to the light, a change in SOP is observed between incident light and emitting light. Acquiring information on anisotropy of the object under measurement from the change in SOP is referred to as "polarimetry". It is to be noted that causes of such anisotropy may include anisotropy of a molecular structure, presence of stress (pressure), and presence of a local field and a magnetic field.

A measurement in which a change in SOP between the incident light and the emitted light is obtained with respect to each position (coordinates) of the two-dimensional x-y plane and then to acquire information on anisotropy of the object under measurement is especially referred to as "imaging polarimetry". This imaging polarimetry has an advantage of acquiring a great amount of information as compared to the case of measurement at a point or in a region averaged by a face in the x-y plane. In the imaging polarimetry, a device for measuring an SOP of emitted light (occasionally, incident light), namely an imaging polarimeter, is a key device.

As fields of application of the imaging polarimetry known are the field of an inspection of optical electronics, the medical field, the remote sensing field, the machine vision field and the like. In the field of the inspection of the optical electronics, for example, since birefringence or a defect due to residual stress can be measured in a nondestructive and non-contact manner, the imaging polarimetry has been applied to an inspection or study of a liquid crystal, an optical film, an optical disc, and the like. In the medical field, an attempt has been made for early detection of glaucoma or a cancer cell since several kinds of cells have polarization properties. In the remote sensing field, an inclination or the degree of flatness of an object under measurement can be measured from the two-dimensional spatial distribution of the state of polarization by remote control and for example, the imaging polarimetry is applied to an examination in vegetation. In addition, in the machine vision field, for the same reason, a configuration of an object is recognized from a polarization image.

Incidentally, assuming that light traveling in the z-axis direction exists, polarized light in a state where a vibration component in the x-axis direction is perfectly correlated (synchronized) with a vibration component in the y-axis direction is classified into three types: linearly polarized light, elliptically polarized light, and circularly polarized light. Parameters for expressing a state of elliptically polarized light are: $\epsilon$ for an ellipticity angle, $\theta$ for an azimuth angle, $\Delta$ for a phase difference, and $\Psi$ for an amplitude ratio angle.

Further, as parameters for effectively expressing a degree of polarization of light, the ellipticity angle, the azimuth angle and the like, Stokes Parameters are used. The Stokes Parameters are composed of four parameters having definitions as follows:

$S_0$: total intensity $S_1$: difference between intensities of linearly polarized components with angles of 0° and 90°.

$S_2$: difference between intensities of linear polarized components with angles ±45°.

$S_3$: difference between intensities of left and right circularly polarized light components.

In a three-dimensional space where the three mutually orthogonal axes are taken as $S_1$, $S_2$ and $S_3$, assuming a sphere with a radius $S_0$ and an original point of the axes taken as a center, an SOP of arbitrary light is expressed as one point in this three-dimensional space and a degree of polarization is expressed by the following expression:

$$\text{Degree of polarization} = (\text{distance from original point to point}$$
$$(S_1, S_2, S_3))/S_0$$
$$= (S_1^2 + S_2^2 + S_3^2)^{1/2}/S_0$$

It may be understood from the above that in the case of a perfectly polarized light (degree of polarization=1), one point expressing the SOP exists in the sphere with a radius $S_0$. Further, the ellipticity angle and the azimuth angle respectively correspond to halves of a latitude and a longitude of the one point expressing the SOP in the above three-dimensional space. As thus described, it is possible to express all information on the SOP if the four parameters $S_1$, $S_2$, $S_3$ and $S_0$ of the Stokes Parameters can be obtained.

As conventionally prevailing imaging polarimetries, a rotating-retarder polarimetry and a polarization-modulation polarimetry are known.

In the rotating-retarder polarimetry, a retarder and an analyzer intervene in sequence in a channel for light under measurement toward an imaging device. Here, the retarder is an optical element having two principal axes (fast axis and slow axis) in mutually orthogonal directions, and is also configured to change a phase difference between the two principal axes before and after passage of light. Further, the analyzer is an optical element having one principal axis and also is configured to allow transmission of only one linearly polarized light component corresponding to the direction of the principal axis.

In this rotating-retarder polarimetry, for obtaining two-dimensional spatial distributions of the four Stokes Parameters independently, it is necessary to physically rotate a retarder itself and take an intensity distribution measurement for at least four kinds of directions. Namely, the Stokes Parameters of incident light are expressed as functions $S_0(x, y)$, $S_1(x, y)$, $S_2(x, y)$, and $S_3(x, y)$ of two-dimensional spatial coordinates.

In the polarization-modulation polarimetry, two retarders (first retarder and second retarder) capable of electrically controlling a phase difference and one analyzer intervene in sequence in a channel for light under measurement toward an imaging device. Among such retarders used are an electro-optic modulator, a liquid crystal and a photoelastic modulator. For example, a phase difference of 45° is set between the principal axes of the first retarder and the second retarder.

Also in this polarization-modulation polarimetry, for obtaining two-dimensional spatial distributions of the four Stokes Parameters independently, it is necessary to vibrate, by electric control, a phase difference between the first retarder and the second retarder in a predetermined angle range to obtain a plurality of intensity distributions.

However, concerning the conventional general imaging polarimetry typified by the rotating-retarder polarimetry and the polarization-modulation polarimetry, the following problems have been pointed out.

(1) First Problem

Since a mechanical or active polarization controlling element is required, there are problems including that: [1] a problem of vibration, heat generation and the like are unavoidable; [2] the degree of size reduction is limited due to necessity for a mechanical element and the like to have some capacity; [3] a driving device for consuming electric power is essential; and [4] maintenance is necessary and complex.

(2) Second Problem

Since it is necessary to repeatedly measure a plurality of intensity distributions while changing conditions of the polarization modulating (controlling) element, there are problems including that: [1] measurement takes relatively long; and [2] an object under measurement needs to be kept stable during measurement.

In order to solve the above problems with the conventional general imaging polarimetry, the present inventors and the like developed, in advance, an "imaging polarimetry using a birefringent prism pair" (refer to T. Kaneko and K. Oka, "Measurement of spatial two-dimensional distribution of polarized light state using birefringent wedge," The 49th Extended Abstracts, Japan Society of Applied Physics and Related Societies (Japan Society of Applied Physics, Hiratsuka, 2002) p. 977 and K. Oka and T. Kaneko, "Compact complete imaging polarimeter using birefringent wedge prisms," Opt. Express, Vol. 11, No. 13, pp. 1510-1519, 2003).

A constitutional view of an experiment system for explaining the imaging polarimetry using the birefringent prism pair is shown in FIG. 19. As apparent from this figure, light projected from a helium-neon laser 1 is enlarged in its beam diameter by collimator lenses 2 and 4 and a pinhole 3 and transmitted through a polarizer 5 and a twisted nematic liquid crystal 6, to obtain a light wave having an SOP depending upon the position (coordinates) of the two-dimensional x-y plane. Two-dimensional spatial distributions $S_0(x, y)$, $S_1(x, y)$, $S_2(x, y)$ and $S_3(x, y)$ of the Stokes parameters of the light wave are obtained by a measurement system 7 surrounded with a broken line in the figure.

Light under measurement is first transmitted through an imaging lens 8, and through two birefringent prism pairs $BPP_1$ and $BPP_2$ and a flat-plate analyzer A in sequence, and then incident on a CCD imaging element 9. The image lens is used in order to forms an image of a projection surface of the twisted nematic liquid crystal 6 on the CCD imaging element. Meanwhile, the two birefringent prism pairs $BPP_1$ and $BPP_2$, and the flat-plate analyzer A are overlapped on a front face of the CCD imaging element. (The surfaces of $BPP_1$ and $BPP_2$ and A may be focused on the front surface of the CCD imaging element optically in the use of a relay lens and the like. The birefringent prism pair comprises a pair of wedge-shaped prisms formed of a birefringent medium and alternately overlapped with each other. A contact surface of each of the two birefringent prism pairs $BPP_1$ and $BPP_2$ is inclined at a fine angle with respect to x axis and y axis. Here, two principal axes of the birefringent prism pair $BPP_1$ agree with the x and y axes, while two principal axes of the $BPP_2$ are inclined 45° from those. Here, a transmission axis of the analyzer A is arranged in parallel to the x axis.

In each of the two birefringent prism pairs $BPP_1$ and $BPP_2$, a phase difference created between the orthogonal polarized light components depends upon two-dimensional spatial coordinates. Hence, as shown in FIG. 20, an intensity distribution including three carrier components is obtained from the CCD imaging element 9. An amplitude and a phase of each of the carrier components are modulated by the two-dimensional spatial distribution of the Stokes Parameters of the light under measurement. It is therefore possible to obtain each of the Stokes Parameters by execution of a signal processing with a computer 10 by the use of Fourier transformation.

One example of results of an experiment is shown in FIG. 21. This is a result obtained in the case of uniformly applying an electric field to only a part of a transparent electrode of a character "A" in the twisted nematic liquid crystal 6. Both right and left figures show two-dimensional spatial distribution $\theta(x, y)$ of the azimuth angle and two-dimensional spatial distribution $\epsilon(x, y)$ of the ellipticity angle which are calculated from the two-dimensional spatial distribution of the Stokes parameters, respectively. It is thereby understood that an SOP depends upon two-dimensional spatial coordinates.

As thus described, according to the imaging polarimetry using the birefringent prism pair, it is possible to obtain the two-dimensional spatial distribution of each of the Stokes Parameters by a frequency analysis of properties of the intensity distribution. It is reasonably necessary to obtain respective retardations of the two birefringent prism pairs $BPP_1$ and $BPP_2$ prior to the frequency analysis. Here, retardation means a phase difference created between linearly polarized light components along the two orthogonal principal axes.

According to the foregoing imaging polarimetry using the birefringent prism pair, advantages can be obtained including that: [1] a mechanically movable element such as a rotating retarder is unnecessary; [2] an active element such as an electro-optic modulator is unnecessary; [3] four Stokes Parameters can be obtained from one intensity distribution at once so that a so-called snap shot measurement can be performed; and [4] the constitution is simple, and thus suitable for size reduction.

However, concerning the foregoing imaging polarimetry using the birefringent prism pair, a problem of generation of a relatively large measurement error has been pointed out for the following reasons.

(1) Variations (Fluctuations) in Retardation of the Birefringent Prism Pairs $BPP_1$, $BPP_2$ Retardation of the birefringent prism pair varies sensitively due to a temperature or pressure change, resulting in that the phase of the intensity distribution detected by the imaging element varies due to the temperature or pressure change, as shown in FIG. 22. Consequently, as shown in FIG. 23, the temperature or pressure change causes generation of an error in a measured value of the Stokes parameter obtained from the intensity distribution. In addition, although only the x surface is shown in FIGS. 22 and 23 for the sake of simplicity, the same is said in the y direction.

(2) Displacement in Relative Position between the Birefringent Prism Pair and the Imaging Element In a system to which a relay lens is inserted between the birefringent prism pair and the imaging element, relative positional displacement between both of them causes a large error factor. When the coordinates on the birefringent prism pair to be sampled by each pixel of the imaging element is displaced due to the vibration every measurement, as shown in FIG. 24, a state is generated which is equivalent to a case where retardation of the birefringent prism pair varies, resulting in generation of an error in a measured value of the Stokes parameters obtained from the intensity distribution. In addition, although only the x surface is shown in FIG. 24 for the sake of simplicity, the same is said in the y direction.

Incidentally, for example, in the inspection of the optical electronics, accuracy required in a two-dimensional spatial distribution of an ellipticity angle or an azimuth angle is considered to be an error in the order of not larger than 0.1°. When this accuracy is to be realized by stabilizing retardation of the birefringent prism pair, it is necessary to keep a variation in temperature of the birefringent prism pair at or under 0.5° C.

However, it requires a large-sized temperature compensating device such as a heater or a cooler for the temperature stabilization, which unfavorably causes a loss of advantages (size reduction, non-inclusion of an active element, etc.) of the imaging polarimetry using the birefringent prism pair. Hence it is practically difficult to reduce a measurement error by stabilizing the retardation of the birefringent prism pair.

In addition, in the system to which the relay lens is inserted, it is practically difficult to prevent the vibration so that the relative displacement between the birefringent prism pair and the imaging element become negligible in the applied field in which the polarimeter has to be provided on a mobile body such as the remote sensing or the robot vision field.

SUMMARY OF THE INVENTION

The present invention was made by noting the problems of the conventional imaging polarimetry using a birefringent prism pair. It is an object of the present invention to provide an imaging polarimetry and an imaging polarimeter using a birefringent prism pair, which are capable of measurement with higher accuracy, while holding the advantages thereof including that: a mechanically movable element such as a rotating retarder is unnecessary; an active element such as an electro-optic modulator is unnecessary; four Stokes Parameters can be provided from one intensity distribution at once so that a so-called snap shot measurement can be performed; and the constitution is simple, and thus suitable for size reduction.

Further objects and working effects of the present invention are readily understood by the skilled in the art by referring to the following description of the specification.

(1) An imaging polarimetry of the present invention comprises: a step of preparing a polarimetric imaging device, a step of obtaining a two-dimensional intensity distribution, and an arithmetic step.

A polarimetric imaging device provided in the step of preparing a polarimetric imaging device is one where a first birefringent prism pair, a second birefringent prism pair and an analyzer, through which light under measurement passes in sequence, and a device for obtaining a two-dimensional intensity distribution of the light having passed through the analyzer are provided, each birefringent prism pair comprises parallel flat plates in which two wedge-shaped retarders having the same apex angle are attached and directions of fast axes of the two retarders are orthogonal to each other, the second birefringent prism pair is arranged such that the direction of a principal axis of the second birefringent prism pair disagrees with the direction of a principal axis of the first birefringent prism pair, and the analyzer is arranged such that the direction of a transmission axis of the analyzer disagrees with the direction of the principal axis of the second birefringent prism pair.

In the step of obtaining the two-dimensional intensity distribution, the light under measurement is launched into the polarimetric imaging device.

In the arithmetic step, by the use of the obtained two-dimensional intensity distribution, a set of phase attribute functions of a measurement system is obtained, and also a parameter indicating a two-dimensional spatial distribution of a state of polarization (SOP) of the light under measurement is obtained. Here, the set of phase attribute functions is a set of functions defined by properties of the polarimetric imaging device, and includes a function depending upon at least a first reference phase function ($\phi_1(x, y)$) as retardation of the first birefringent prism pair and a function depending upon at least a second reference phase function ($\phi_2(x, y)$) as retardation of the second birefringent prism pair, and by those functions themselves, or by addition of another function defined by the properties of the polarimetric imaging device, the set of phase attribute functions becomes a set of functions sufficient to determine the parameter indicating the two-dimensional spatial distribution of the SOP of the light under measurement.

There may be a case where a one-dimensional or two-dimensional imaging element is used as the "means of obtaining a two-dimensional intensity distribution". The one-dimensional imaging element can be used when the spatial distribution of the SOP of the light under measurement and the polarimetric imaging device are relatively displaced such as a case where the object under measurement and the polarimetric imaging device are relatively displaced almost perpendicular to the propagation direction of the light under measurement, for example. When such relative displacement is used, the two-dimensional intensity distribution can be obtained from a change in time of the intensity obtained from the one-dimensional imaging element. At this time, it is necessary that the arrangement direction of the pixels of the one-dimensional imaging element has to disagree with the direction of the above relative displacement. For example, that arrangement direction may be perpendicular to the direction of the above relative displacement.

"Obtaining a parameter indicating a two-dimensional spatial distribution of an SOP" includes obtaining all or part of two-dimensional spatial distributions of the four Stokes parameters, namely, $S_0(x, y)$ for expressing a total intensity, $S_1(x, y)$ for expressing a difference between intensities of linear polarized light components with angles of 0° and 90°, $S_2(x, y)$ for expressing a difference between intensities of linear polarized light components with angles ±45, and $S_3(x, y)$ for expressing a difference between intensities of the left-hand and right-hand circularly polarized light components. While whether all the two-dimensional spatial distributions of the Stokes parameters are obtained or not is left to a person executing this step, all the two-dimensional spatial distributions of the Stokes parameters can be obtained in principle according to the present invention.

Further, "obtaining a parameter indicating a two-dimensional spatial distribution of an SOP" includes the case of obtaining a parameter equivalent to the two-dimensional spatial distribution of the Stokes parameter. For example, a two-dimensional spatial distribution of a set of parameters of a light intensity, a degree of polarization, an ellipticity angle and an azimuth angle, or a two-dimensional spatial distribution of a set of parameters of a light intensity, a degree of polarization, a phase difference, and an amplitude ratio angle, is equivalent to the two-dimensional spatial distribution of the Stokes parameters. While all of these parameters can be obtained in principle according to the present invention, the above-mentioned obtainment of a parameter also includes a case where part of the parameters is obtained by selection of a person executing the step.

"Another function defined by the properties of the polarimetric imaging device", can be corresponded to a reference amplitude function, a reference value for calibration of a reference phase function, data showing a relation between the first reference phase function and the second reference phase function, data showing a relation between the first reference phase function difference and the second reference phase function difference, and the like.

When the two-dimensional intensity distribution of the SOP of the light in a specific region under measurement such as a region occupied by the object under measurement is to be measured, the two-dimensional spatial distribution of the SOP of the light in that region is to be reproduced by the polarimetric imaging device. As one means for that, an imaging lens is provided between the region under measurement and the polarimetric imaging device so that the region under measurement is focused on the polarimetric imaging device. At this time, it is preferable that the first birefringent prism pair, the second birefringent prism pair, the analyzer, and the imaging element are provided in proximity to each other and these are within a focus depth of the imaging lens. Alternatively, the second birefringent prism pair and the imaging element may be set apart from each other and a relay lens may be provided so that the image of the region under measurement which was focused on the first birefringent prism pair and the second birefringent prism pair by the imaging lens can be focused on the imaging element by the relay lens again. In this case, the analyzer may be provided at any place between the second birefringent prism pair and the imaging element.

According to another means for reproducing the two-dimensional spatial distribution of the polarization properties in the region under measurement, in the polarimetric imaging device, the region under measurement and the imaging device are provided close to each other and the region under measurement is projected on to the imaging device by parallel light beams without providing the imaging lens. Namely, to provide the imaging lens is not essential in the present invention.

The present invention is not limited to measurement of the two-dimensional spatial distribution of the SOP of the light in the region under measurement, and it can be applied to measurement of propagation direction distribution of SOP of light under measurement with an optical system which converts a distribution of a propagation direction of light under measurement to a two-dimensional spatial distribution of light in an imaging device, for example. Such measurement can be implemented by providing a lens between the region under measurement and the imaging device and setting the region under measurement so as to be focused by the lens.

According to the image polarimetry of the present invention, a measurement error in the parameter indicating the two-dimensional spatial distribution of the SOP, generated by variations in retardation of the birefringent prism pair due to a temperature change or other factors can be effectively reduced while properties of the imaging polarimetry using the birefringent prism pair is remained in which the parameters showing the two-dimensional spatial distribution of the all SOP of the light under measurement can be obtained in principle by obtaining the intensity distribution once without needing a mechanically movable part for controlling polarized light and an active element such as an electro-optical modulator.

(2) The analyzer may be arranged such that the direction of the transmission axis thereof forms an angle of 45° with respect to the direction of the principal axis of the second birefringent prism pair.

(3) In one embodiment of the imaging polarimetry of the present invention, the set of the phase attribute functions is composed of the first reference phase function and the second reference phase function. In the arithmetic step of this embodiment, data showing a relation between the first reference phase function and the second reference phase function is made available.

The arithmetic step according to this embodiment is a unit where, by the use of the obtained intensity distribution, a first intensity distribution component which nonperiodically vibrates with special coordinates and a third intensity distribution component which vibrates with spatial coordinates at a frequency depending upon the second reference phase function and not depending upon the first reference phase function are obtained, and at least one of a second intensity distribution component which vibrates with spatial coordinates at a frequency depending upon a difference between the first reference phase function and the second reference phase function, a fourth intensity distribution component which vibrates with spatial coordinates at a frequency depending upon a sum of the first reference phase function and the second reference phase function, and a fifth intensity distribution component which vibrates with spatial coordinates at a frequency depending upon the first reference phase function and not depending upon the second reference phase function is obtained, and by the use of the data showing the relation between the first reference phase function and the second reference phase function and each of the intensity distribution components, the first reference phase function and the second reference phase function are obtained, and also the parameter indicating the two-dimensional spatial distribution of the SOP is obtained.

Here, the "data showing the relation between the first reference phase function and the second reference phase function" is data with which one of the two reference phase functions can be obtained when the other thereof is given, such as ratios of inclination between the two reference phase functions with respect to x axis and y axis.

"Obtaining the reference phase function" includes the case of obtaining a parameter equivalent thereto. In particular, obtaining a complex function including information on the reference phase function corresponds to obtaining a parameter equivalent to the reference phase function.

In a case where the direction of the transmission axis of the analyzer forms an angle of 45° with respect to the direction of the principal axis of the second birefringent prism pair, the fifth spectral intensity component does not appear. Therefore, when at least one of the second, fourth and fifth intensity distribution components is to be obtained in the arithmetic step, at least either the second intensity distribution component or the fourth intensity distribution component may be obtained. In this manner, there is an advantage of making the arithmetic operation simpler. Meanwhile, in the case of not limiting the angle between the direction of the transmission axis of the analyzer and the direction of the principal axis of the second birefringent prism pair to an angle of 45°, there is an advantage of easing a limitation on an error in assembly of an optical system, to facilitate manufacturing of the optical system.

(4) In another embodiment of the imaging spectrometry of the present invention, the set of phase attribute functions is composed of a difference ($\Delta\phi_1(x, y)$) of the first reference phase function from a reference value for calibration of the first reference phase function and a difference ($\Delta\phi_2(x, y)$) of the second reference phase function from a reference value for calibration of the second reference phase function. In the arithmetic step of this embodiment, the reference value ($\phi_1^{(i)}(x, y)$) for calibration of the first reference phase function, the reference value ($\phi_2^{(i)}(x, y)$) for calibration of the second reference phase function, and data showing a relation between the first reference phase function difference and the second reference phase function difference are made available.

The arithmetic step according to this embodiment is a unit where, by the use of the obtained intensity distribution, a first spectral intensity component which nonperiodically vibrates with spatial coordinates and a third intensity distribution component which vibrates with spatial coordinates at a frequency depending upon the second reference phase function and not depending upon the first reference phase function are obtained, and at least one of a second intensity distribution component which vibrates with spatial coordinates at a frequency depending upon a difference between the first reference phase function and the second reference phase function, a fourth intensity distribution component which vibrates with spatial coordinates at a frequency depending upon a sum of the first reference phase function and the second reference phase function, and a fifth intensity distribution component which vibrates with spatial coordinates at a frequency depending upon the first reference phase function and not depending upon the second reference phase function is obtained, and by the use of the reference value for calibration of the first reference phase function, the reference value for calibration of the second reference phase function, the data showing the relation between the first reference phase function difference and the second reference phase function difference, and each of the obtained intensity distribution components, the first reference phase function difference and the second reference phase function difference are obtained, and also the parameter indicating the two-dimensional spatial distribution of the SOP is obtained.

Here, the "reference values for calibration" of the first and second reference phase functions may be measured initial values of the respective reference phase functions, or may be appropriately set values thereof not based upon actual measurement. However, the relation between the two reference values for calibration preferably conforms to the relation between the first reference phase function difference and the second reference phase function difference.

The "reference phase function difference" is defined as a difference between the "reference phase function" and the "reference value for calibration of the reference phase function". When the "reference value for calibration of the reference phase function" does not agree with an actual initial value, therefore, the "reference phase function difference" does not mean an actual difference in the reference phase function.

The "data showing the relation between the first reference phase function difference and the second reference phase function difference" is data with which one of the two reference phase function differences can be obtained when the other thereof is given, such as ratios of inclination between the two reference phase function differences with respect to x axis and y axis.

"Obtaining the reference phase function difference" includes the case of obtaining a parameter equivalent thereto. In particular, obtaining a complex function including information on the reference phase function difference corresponds to obtaining a parameter equivalent to the reference phase function difference.

As for the case where the fifth intensity distribution component does not appear when the direction of the transmission axis of the analyzer forms an angle of 45° with respect to the direction of the principal axis of the second birefringent prism pair, the foregoing case applies.

For comparison with this embodiment, first, the case of proceeding an arithmetic operation not by the use of the reference phase function difference but by the use of the reference phase function as in the embodiment of (3) above is considered. Putting aside appearance in an arithmetic operation, the second reference phase function, which is in principle determinable independently from an SOP of the light under measurement, is first determined, and subsequently the first reference phase function is determined using the second reference phase function. At this time, the obtained second reference phase function is accompanied with phase ambiguity of an integral multiple of $2\pi$. Such accompanying phase ambiguity itself does not affect a calculation error in parameters showing the two-dimensional spatial distribution of the SOP. However, since phase unwrapping performed in obtaining the first reference phase function from the second reference phase function causes generation of a calculation error in the first reference phase function, a calculation error in the parameters showing the two-dimensional spatial distribution of the SOP may be generated. Phase unwrapping is a process of determining a value of the second reference phase function such that the value of the second reference phase function continuously changes beyond the range of $2\pi$ with respect to a position change. In the case of not using the second reference phase function difference, the first reference phase function is obtained through the use of the "data showing the relation between the first and second reference phase functions" to the second reference phase function after phase unwrapping. When the position intervals at the time of change in the value of the second reference phase function by $2\pi$ are not sufficiently large as compared to sampling intervals of the position, or when a noise is included in the measured value of the second reference phase function, the second reference phase function after phase unwrapping could be calculated by a wrong unit, $2\pi$. If the first reference phase function is obtained from the second reference phase function including the error by the unit of $2\pi$, since an error included in the first reference phase function is typically not calculated by the unit of $2\pi$, the error in the first reference phase function would become a large error in the case of calculating the parameters indicating the two-dimensional spatial distribution of the SOP. As opposed to this, in the case of the embodiment of (4) above, since the second reference phase function difference changes modestly with respect to the position change, phase unwrapping on the second reference phase function difference is unnecessary or necessary only in a small frequency, thereby leading to elimination of, or extreme reduction in, the possibility for generation of an error in the first reference phase function difference due to phase unwrapping.

(5) In the embodiment of (4) above, the spectroscopic polarimetry may further comprise a step of launching light for calibration, with known parameters each showing the two-dimensional spatial distribution of the SOP, into the polarimetric imaging device to obtain a two-dimensional intensity distribution for calibration, so as to obtain the reference value ($\phi_1^{(i)}(x, y)$) for calibration of the first reference phase function and the reference value ($\phi_2^{(i)}(x, y)$) for calibration for the second reference phase function by the use of each of the parameters showing the two-dimensional spatial distribution of the SOP of the light for calibration and the obtained intensity distribution for calibration, whereby these reference values for calibration are made available.

(6) Moreover, in the embodiment of (4) above, the imaging polarimetry may further comprise a step of launching light for calibration, with known parameters each showing the two-dimensional spatial distribution of the SOP, into the polarimetric imaging device to obtain a two-dimensional intensity distribution for calibration, so as to obtain the reference value ($\phi_1^{(i)}(x, y)$) for calibration of the first reference phase function, the reference value ($\phi_2^{(i)}(x, y)$) for calibration for the second reference phase function, and the data showing the relation between the first reference phase function difference and the second reference phase function difference, by the use of each of the parameters showing the two-dimensional spatial distribution of the SOP of the light for calibration and the obtained intensity distribution for calibration, whereby these reference values for calibration are made available.

(7) In the embodiment of (3) above, the imaging polarimetry may further comprise a step of launching light for calibration, with known parameters each showing the two-dimensional spatial distribution of the SOP, into the polarimetric imaging device to obtain a two-dimensional intensity distribution for calibration, so as to obtain the data showing the relation between the first reference phase function difference and the second reference phase function difference, by the use of each of the parameters showing the two-dimensional spatial distribution of the SOP of the light for calibration and the obtained intensity distribution for calibration, whereby the data showing the relation between the first reference phase function difference and the second reference phase function difference is made available.

(8) In the embodiments of (5) and (6) above, it is possible to use linearly polarized light as the light for calibration.

(9) In the embodiment of (7) above, it is possible to use linearly polarized light as the light for calibration.

(10) In another embodiment of the imaging polarimetry according to the present invention, in the arithmetic step, a value of each element of a generalized inverse matrix of a matrix is made available such that a relation is formed where a first vector including information on the two-dimensional intensity distribution is expressed by a product of the matrix and a second vector including information on the two-dimensional spatial distribution of the SOP of the light under measurement and information on the set of phase attribute functions.

The arithmetic step according to this embodiment is a unit where a value of each element of the first vector is specified by the use of the obtained intensity distribution, a value of each element of the second vector is obtained by calculation of a product of the generalized inverse matrix and the first vector, and by the use of the value of the element included in the second vector, the set of phase attribute functions is obtained, and also the parameter showing the two-dimensional spatial distribution of the SOP of the light under measurement is obtained.

(11) In another embodiment subject to the embodiment of (10) above, the set of phase attribute functions is composed of a difference ($\Delta\phi_1(x, y)$) of the first reference phase function from a reference value for calibration of the first reference phase function and a difference ($\Delta\phi_2(x, y)$) of the second reference phase function from a reference value for calibration of the second reference phase function. In the arithmetic step of this embodiment, data showing a relation between the first reference phase function difference and the second reference phase function difference is made available. Further, the generalized inverse matrix of the matrix, obtained from the reference value ($\phi_1^{(i)}(x, y)$) for calibration of the first reference phase function and the reference value ($\phi_2^{(i)}(x, y)$) for calibration for the second reference phase function, is made available.

The arithmetic step is a unit where a value of each element of the first vector is specified by the use of the obtained intensity distribution, a value of each element of the second vector is obtained by calculation of a product of the generalized inverse matrix and the first vector, and by the use of the value of the element included in the second vector and the data showing the relation between the first reference phase function difference and the second reference phase function difference, the first reference phase function difference and the second reference phase function difference are obtained, and also the parameter showing the two-dimensional spatial distribution of the SOP is obtained.

(12) An imaging polarimeter of the present invention comprises a polarimetric imaging device and an arithmetic unit.

The polarimetric imaging device comprises a first birefringent prism pair, a second birefringent prism pair and an analyzer, through which light under measurement passes in sequence, and means for obtaining a two-dimensional intensity distribution of the light having passed through the analyzer are provided, in which each birefringent prism pair comprises parallel flat plates in which two wedge-shaped retarders having the same apex angle are attached and directions of fast axes of the two retarders are orthogonal to each other. Here the second birefringent prism pair is arranged such that the direction of a principal axis of the second birefringent prism pair disagrees with the direction of a principal axis of the first birefringent prism pair. The analyzer is arranged such that the direction of a transmission axis of the analyzer disagrees with the direction of the principal axis of the second birefringent prism pair.

In the arithmetic unit, by the use of the two-dimensional intensity distribution obtained by launching the light under measurement into the polarimetric imaging device, a set of phase attribute functions of a measurement system is obtained, and also a parameter indicating a two-dimensional spatial distribution of a state of polarization (SOP) of the light under measurement is obtained. Here, the set of phase attribute functions is a set of functions defined by properties of the polarimetric imaging device, and includes a function depending upon at least a first reference phase function ($\phi_1(x, y)$) as retardation of the first birefringent prism pair and a function depending upon at least a second reference phase function ($\phi_2(x, y)$) as retardation of the second retarder, and by those functions themselves, or by addition of another function defined by the properties of the polarimetric imaging device, the set of phase attribute functions becomes a set of functions sufficient to determine a parameter indicating a two-dimensional spatial distribution of the SOP of the light under measurement.

(13) The analyzer may be arranged such that the direction of the transmission axis of the analyzer forms an angle of 45° with respect to the direction of the principal axis of the second birefringent prism pair.

(14) In one embodiment of the imaging polarimeter of the present invention, the set of phase attribute functions is composed of the first reference phase function and the second reference phase function. In the arithmetic unit of this embodiment, data showing a relation between the first reference phase function and the second reference phase function is made available.

The arithmetic unit according to this embodiment is a unit where, by the use of the two-dimensional intensity distribution obtained by launching the light under measurement into the polarimetric imaging device, a first intensity distribution component which nonperiodically vibrates with spatial coordinates and a third intensity distribution component which vibrates with spatial coordinates at a frequency depending upon a second reference phase function and not depending upon the first reference phase function are obtained, and at least one of a second intensity distribution component which vibrates with spatial coordinates at a frequency depending upon a difference between the first reference phase function and the second reference phase function, a fourth intensity distribution component which vibrates with spatial coordinates at a frequency depending upon a sum of the first reference phase function and the second reference phase function, and a fifth intensity distribution component which vibrates with spatial coordinates at a frequency depending upon the first reference phase function and not depending upon the second reference phase function is obtained, and by the use of the data showing the relation between the first reference phase function and the second reference phase function and each of the obtained intensity distribution components, the first reference phase function and the second reference phase function are obtained, and also the parameter indicating the two-dimensional spatial distribution of the SOP is obtained.

(15) In another embodiment of the imaging polarimeter of the present invention, the set of phase attribute functions is composed of a difference ($\Delta\phi_1(x, y)$) of the first reference phase function from a reference value for calibration of the first reference phase function and a difference ($\Delta\phi_2(x, y)$) of the second reference phase function from a reference value for calibration of the second reference phase function. In the arithmetic unit of this embodiment, the reference value ($\phi_1^{(i)}(x, y)$) for calibration of the first reference phase function, the reference value ($\phi_2^{(i)}(x, y)$) for calibration of the second reference phase function, and data showing a relation between the first reference phase function difference and the second reference phase function difference are made available.

The arithmetic unit according to this embodiment is a unit whereby the use of the two-dimensional intensity distribution obtained by launching the light under measurement into the polarimetric imaging device, a first intensity distribution component which nonperiodically vibrates with spatial coordinates and a third intensity distribution component which vibrates with spatial coordinates at a frequency depending upon a second reference phase function and not depending upon the first reference phase function are obtained, and at least one of a second intensity distribution component which vibrates with spatial coordinates at a frequency depending upon a difference between the first reference phase function and the second reference phase function, a fourth intensity distribution component which vibrates with spatial coordinates at a frequency depending upon a sum of the first reference phase function and the second reference phase function, and a fifth intensity distribution component which vibrates with spatial coordinates at a frequency depending upon the first reference phase function and not depending upon the second reference phase function is obtained, and by the use of the reference value for calibration of the first reference phase function, the reference value for calibration of the second reference phase function, the data showing the relation between the first reference phase function difference and the second reference phase function difference, and each of the obtained intensity distribution components, the first reference phase function difference and the second reference phase function difference are obtained, and also the parameter indicating the two-dimensional spatial distribution of the SOP is obtained.

(16) In another embodiment of the imaging polarimeter according to the present invention, in the arithmetic unit, a value of each element of a generalized inverse matrix of a matrix is made available such that a relation is formed where a first vector including information on the two-dimensional intensity distribution is expressed by a product of the matrix and a second vector including information on the two-dimensional spatial distribution of the SOP of the light under measurement and information on the set of the phase attribute function.

The arithmetic unit according to this embodiment is a unit where a value of each element of the first vector is specified by the use of the two-dimensional intensity distribution obtained by launching the light under measurement into the polarimetric imaging device, a value of each element of the second vector is obtained by calculation of a product of the generalized inverse matrix and the first vector, and by the use of the value of the element included in the second vector, the set of phase attribute functions is obtained, and also the parameter showing the two-dimensional spatial distribution of the SOP of the light under measurement is obtained.

(17) In another embodiment subject to the embodiment of (16) above, the set of phase attribute functions is composed of a difference ($\Delta\phi_1(x, y)$) of the first reference phase function from a reference value for calibration of the first reference phase function and a difference ($\Delta\phi_2(x, y)$) of the second reference phase function from a reference value for calibration of the second reference phase function. In the arithmetic unit of this embodiment, data showing a relation between the first reference phase function difference and the second reference phase function difference is made available. Further, the generalized inverse matrix of the matrix, obtained from the reference value ($\phi_1^{(i)}(x, y)$) for calibration of the first reference phase function and the reference value ($\phi_2^{(i)}(x, y)$) for calibration for the second reference phase function, is made available.

The arithmetic unit in this embodiment is a unit where a value of each element of the first vector is specified by the use of the two-dimensional intensity distribution obtained by launching the light under measurement into the polarimetric imaging device, a value of each element of the second vector is obtained by calculation of a product of the generalized inverse matrix and the first vector, and by the use of the value of the element included in the second vector and the data showing the relation between the first reference phase function difference and the second reference phase function difference, the first reference phase function difference and the second reference phase function difference are obtained, and also the parameter showing the two-dimensional spatial distribution of the SOP is obtained.

According to the present invention, while in principle inheriting the property of the imaging polarimetry using the birefringent prism pair in which a mechanically movable part for controlling polarized light and an active element such as an electro-optical modulator are unnecessary, all parameters indicating a two-dimensional spatial distribution of an SOP of light under measurement can be obtained, and it is possible to effectively reduce a measurement error in the parameter indicating the two-dimensional spatial distribution of the SOP, generated by variations in retardation of a birefringent prism pair due to a temperature change or other factors.

BRIEF DESCRIPTION OF THE DRAWINGS

FIG. 4 shows an explanatory view of a relation between the intensity distribution obtained from the imaging element and its five components (No. 2).

FIG. 11 shows a comparative explanatory view of methods (No. 1, 2) for calibrating a reference phase function during measurement.

FIG. 16 shows a view of an example of experimental results (pre-calibration only)

FIG. 17 shows a view of an example of experimental results (calibration and calibration during measurement).

FIG. 18 shows a view of an example of experimental results (sectional view of the measured results)

DESCRIPTION OF THE PREFERRED EMBODIMENTS

A preferred embodiment of the present invention will be described in detail with reference to the accompanying drawings (FIGS. 1 to 11) hereinafter.

Figure 1:
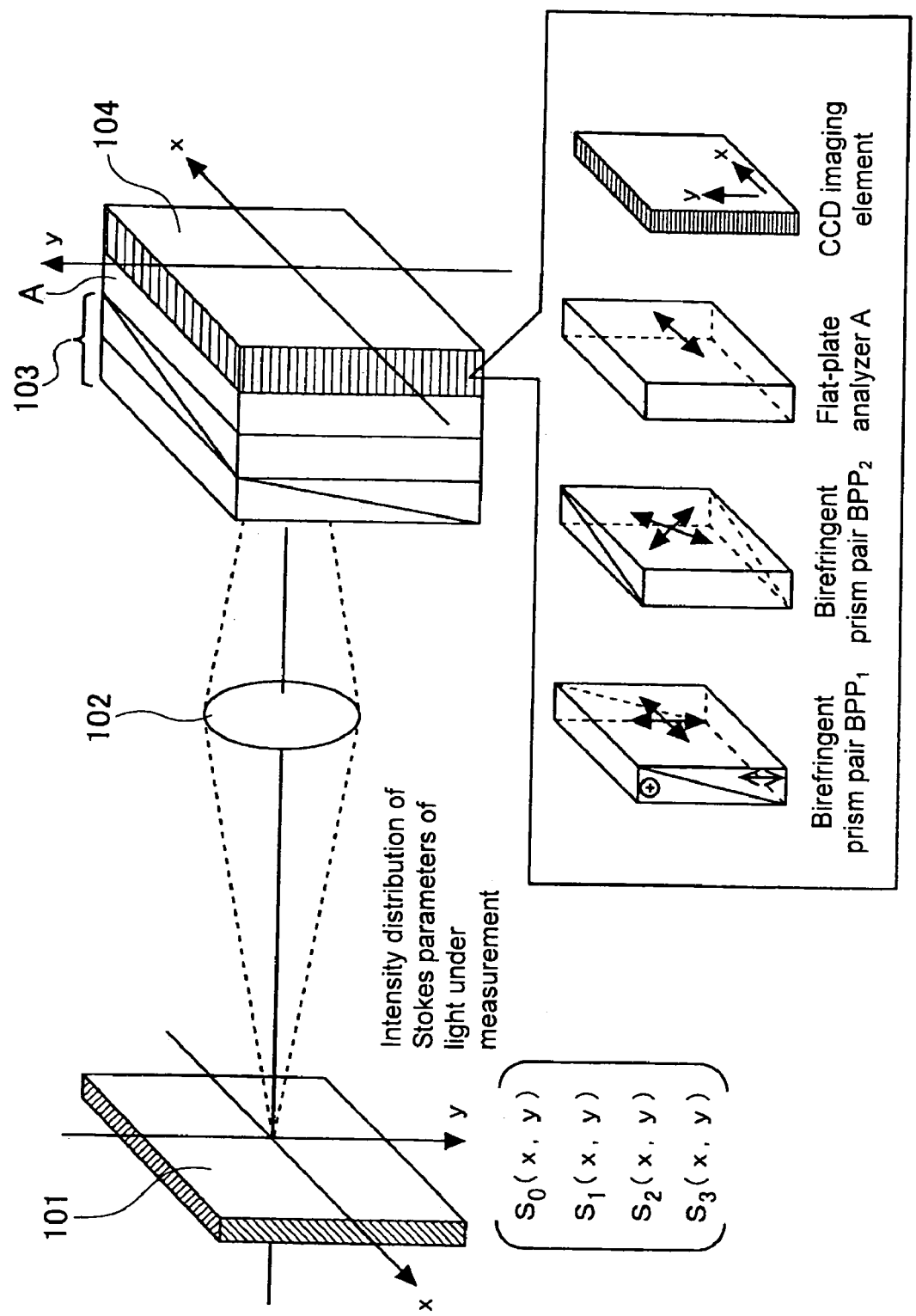
FIG. 1 shows an explanatory view of a principle of an imaging polarimetry using a birefringent prism pair as the premise of the present invention.
Figure 2:
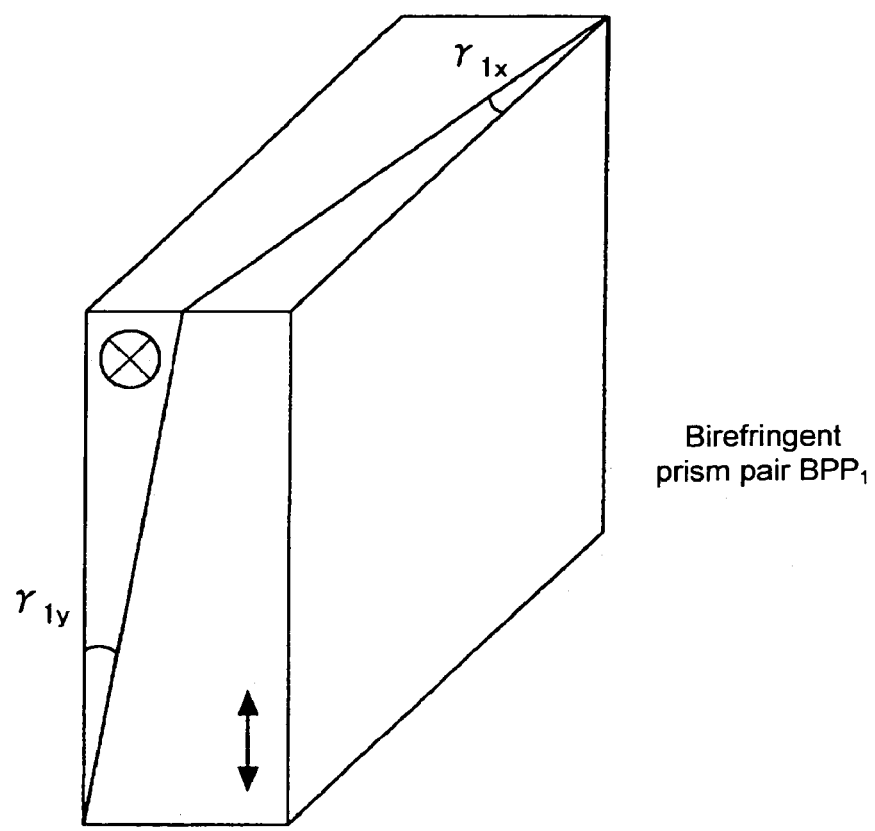
FIG. 2 shows an explanatory view of the birefringent prism pair as the premise of the present invention.

Chapter 1: Imaging Polarimetry using Birefringent Prism Pair as Premise of the Present Invention 1.1 Principle of Imaging Polarimetry using Birefringent Prism Pair FIG. 1 shows a basic constitution of an imaging polarimeter using a birefringent prism pair for use in an imaging polarimetry using the birefringent prism pair. This imaging polarimeter comprises an imaging lens 102, two birefringent prism pairs 103 ($BPP_1$ and $BPP_2$), an analyzer A, and an imaging elements 104. In addition, instead of the imaging element 104, an object under measurement may be scanned.

As shown in a lower right box in FIG. 1, each birefringent prism pair is constituted such that a pair of wedge-shaped prisms formed of a birefringent material and having the same apex angle is attached so that their oblique sides are alternate. Here, directions of crystal axes of the birefringent prisms are perpendicular to an optical axis and intersect with each other at right angles. When this constitution is seen as the whole prism pair, its front and rear surfaces are parallel to each other and are perpendicular to the optical axis, while a contact surface between the two prisms is slightly inclined with respect to the front and rear surface of the prism pair. Optically, the birefringent prism pair serves as a retarder in which its property is varied depending on two-dimensional coordinates. Here, the retarder varies a phase difference between the mutually orthogonal linearly polarized light components before and after passage of light through an element. These two intersecting linearly polarized light components are called principal axes and an amount of the phase difference is called retardation.

The principal axes of the birefringent prism pair $BPP_1$ and $BPP_2$ are inclined at 45° from each other and a transmission axis of the analyzer A agrees with one principle axis of the birefringent prism pair $BPP_1$.

It is to be noted that crossing angles among the three elements (the birefringent prism pairs $BPP_1$ and $BPP_2$ and the analyzer A) may not necessarily be 45°. Measurement is possible even with a different crossing angle, although less efficient to some extent. In short, any crossing angle can be applied so long as the principal axes of the adjacent elements are not superposed on each other. A description in this respect-is given later. What is important is that each element is fixed and thus not required to be rotated or modulated as in a conventional method.

In addition, the inclination directions of the contact surfaces of the birefringent prism pairs $BPP_1$ and $BPP_2$ have to be different from each other. As an example, the above condition is satisfied when the contact surface of the $BPP_2$ is inclines only in an x direction and the contact surface of the $BPP_1$ is inclined only in a y direction as shown in the lower right box in FIG. 1.

Light under measurement by the polarimeter (light whose state of polarization (SOP) is measurable) is light whose SOP varies depending on the two-dimensional spatial coordinates. According to such light, properties varied in its SOP by transmission, reflection, scattering are created by an object under measurement which varies according to the two-dimensional spatial coordinates. Two-dimensional spatial distribution of the SOP of the light under measurement can be expressed by Stokes parameters $S_0(x, y)$, $S_1(x, y)$, $S_2(x, y)$, and $S_3(x, y)$ depending on the two-dimensional spatial coordinates $(x, y)$. Further, coordinate axes x and y for determining the Stokes parameters is taken so as to agree with the two intersecting principal axes of the $BPP_1$.

The light under measurement projecting from the object 101 under measurement positioned on the left in the drawing passes in sequence through the imaging lens 102, the two birefringent prism pairs 103 ($BPP_1$ and $BPP_2$), and the analyzer A and is incident on the imaging element 104. Here, the imaging lens 102 focuses a projection surface of the object on an imaging surface of the imaging element 104. In addition, it is assumed that the birefringent prism pairs $BPP_1$ and $BPP_2$ and the analyzer A are sufficiently thin and they are adhered to the imaging surface of the imaging element 104. Because the imaging surface of the imaging element, on which the projection surface of the object under measurement is focused, is to be regarded as the same as the surfaces of the prism pairs $BPP_1$ and $BPP_2$, that is, spread or blur of image from the prism pair $BPP_1$ to the imaging element 104 is to be prevented. In addition, instead of adhering the birefringent prism pairs $BPP_1$ and $BPP_2$ and the analyzer A to the imaging element 104, when relay lenses (second and third imaging lenses) may be occasionally inserted between the $BPP_1$ and $BPP_2$ or between the $BPP_2$ and the imaging element (before or after the analyzer A) to keep an imaging relation among the four elements (the projection surface of the object under measurement, $BPP_1$, $BPP_2$, and the injection surface of the imaging element).

The Stokes parameters depending on the two-dimensional spatial coordinates x and y are obtained from an intensity distribution acquired from the imaging element by the use of a later-described process.

Before description of the process for obtaining the Stokes parameters, properties of the birefringent prism pairs $BPP_1$ and $BPP_2$ are formulated as a preparation for the process. Here, it is assumed that angles formed between the contact surface of the wedges in the birefringent prism pair $BPP_1$ and the x and y axes are set to $\gamma 1x$ and $\gamma 2x$. Similarly, inclination angles $\gamma 2x$ and $\gamma 2y$ of the contact surface in the $BPP_2$ are specified. Retardation of the birefringent prism pair $BPP_j$ (j=1 and 2) can be expressed by the following expression:

$$\phi_j(x, y) = 2\pi(U_{jx} x + U_{jy} y) + \varphi_j(x, y) \quad (1.1)$$

where

[Mathematical expression 1]

$$U_{jx} = \frac{2B_j}{\lambda} \tan\gamma_{jx} \quad (1.2a)$$

$$U_{jy} = \frac{2B_j}{\lambda} \tan\gamma_{jy} \quad (1.2b)$$

Here, $\lambda$ is a wavelength of a light source, and $B_j$ is its double refraction of a prism medium. Further, $\varphi_j(x, y)$ designates a small non-linear component due to imperfectness at the time of processing the prism. As can be seen from the above expressions, the retardation of each birefringent prism pair is almost linearly varied with respect to the spatial coordinates x and y.

In addition, since the inclination of the surfaces in the $BPP_1$ and $BPP_2$ are different from each other, it is necessary that at least one of the following expressions has to be established.

$$\gamma_{1x} \neq \gamma_{2x} \quad (1.3a)$$

$$\gamma_{1y} \neq \gamma_{2y} \quad (1.3b)$$

For example, in case that the contact surface of the $BPP_1$ is inclined in the y direction only and the contact surface of the $BPP_2$ is inclined in the x direction only (that is, like the lower right box in FIG. 1), the following expressions are provided.

$$\gamma_{1x}=0 \quad (1.4a)$$

$$\gamma_{1y} \neq 0 \quad (1.4b)$$

$$\gamma_{2x} \neq 0 \quad (1.4c)$$

$$\gamma_{2y}=0 \quad (1.4d)$$

1.2 Intensity Distribution Acquired from Imaging Element

Referring to the "imaging polarimeter using the birefringent prism pair" shown in FIG. 1, the intensity distribution acquired from the imaging element 104 is expressed by the following expression.

[Mathematical Expression 2]

$$I(x, y) = \frac{1}{2}m_0(x, y)S_0(x, y) + \quad (1.5)$$
$$\frac{1}{4}m_-(x, y)|S_{23}(x, y)|\cos[\phi_2(x, y) - \phi_1(x, y) + \arg\{S_{23}(x, y)\}] +$$
$$\frac{1}{2}m_2(x, y)S_1(x, y)\cos[\phi_2(x, y)] -$$
$$\frac{1}{4}m_+(x, y)|S_{23}(x, y)|\cos[\phi_2(x, y) + \phi_1(x, y) - \arg\{S_{23}(x, y)\}]$$

where $$S_{23}(x, y)=S_2(x, y)+iS_3(x, y) \quad (1.6)$$

Here, $m_0(x, y)$, $m_-(x, y)$, $m_2(x, y)$, $m_+(x, y)$ each denote a ratio of amplitude extinction due to failure of imaging element to follow a fine vibration component in the intensity distribution. In order to understand the property of this expression, Expressions (1.1) is substituted into the following Expression (1.3).

[Mathematical Expression 3]

$$I(x, y) = \frac{1}{2}m_0(x, y)S_0(x, y) + \frac{1}{4}m_-(x, y)|S_{23}(x, y)| \quad (1.7)$$
$$\cos[2\pi(U_{-x}x + U_{-y}y) + \Phi_-(x, y) + \arg\{S_{23}(x, y)\}] +$$
$$\frac{1}{2}m_2(x, y)S_1(x, y)\cos[2\pi(U_{2x}x + U_{2y}y) + \Phi_2(x, y)] - \frac{1}{4}m_+(x, y)$$
$$|S_{23}(x, y)|\cos[2\pi(U_{+x}x + U_{+y}y) + \Phi_+(x, y) - \arg\{S_{23}(x, y)\}]$$

where the following expressions are satisfied.

$$U_{-x}=U_{2x}-U_{1x} \quad (1.8a)$$

$$U_{-y}=U_{2y}-U_{1y} \quad (1.8b)$$

$$U_{+x}=U_{2x}+U_{1x} \quad (1.8c)$$

$$U_{+y}=U_{2y}+U_{1y} \quad (1.8d)$$

$$\Phi_-(x, y) = \Phi_2(x, y) - \Phi_1(x, y) \quad (1.8e)$$

$$\Phi_+(x, y) = \Phi_2(x, y) + \Phi_1(x, y) \quad (1.8f)$$

Figure 3:
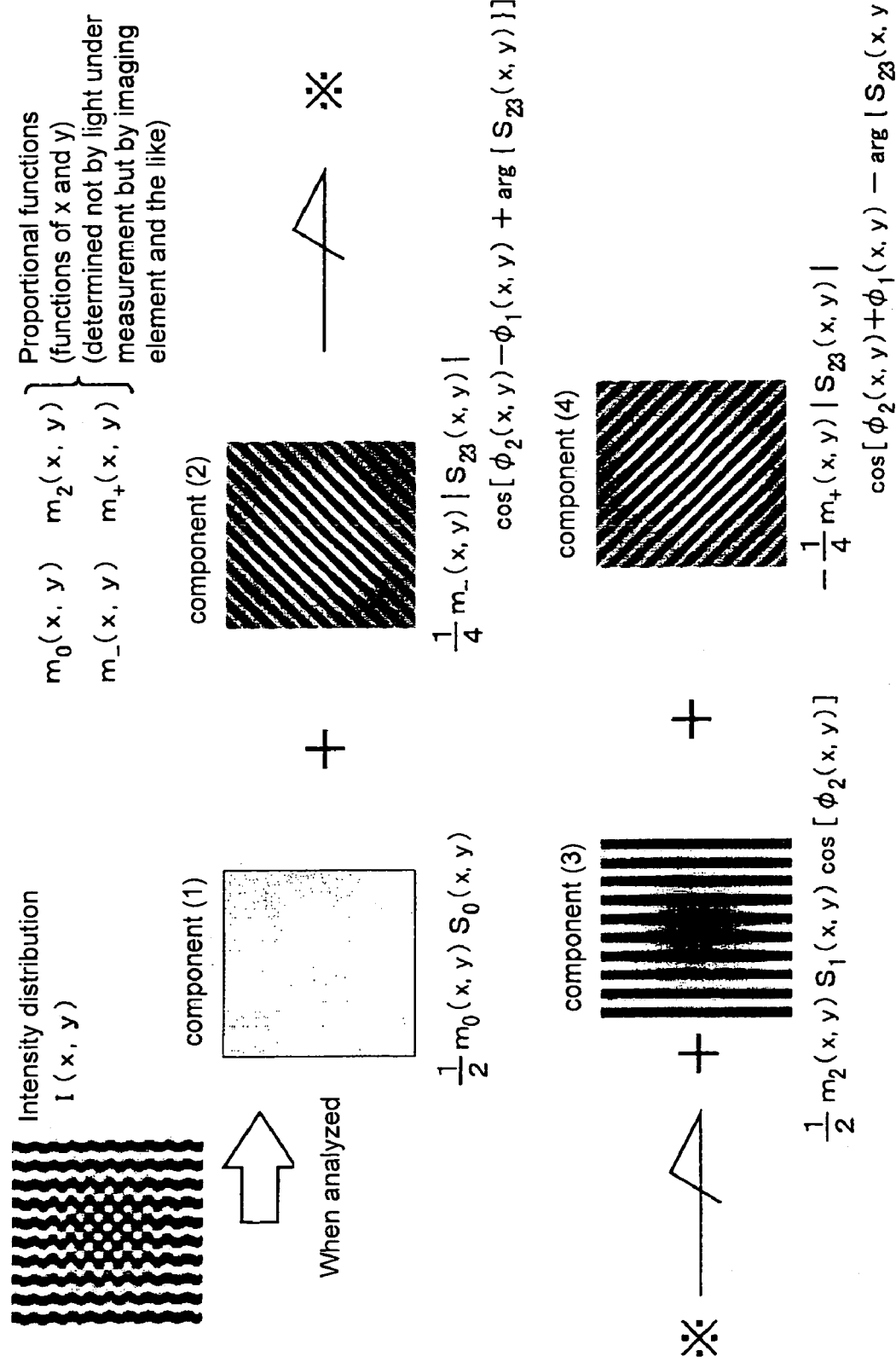
FIG. 3 shows an explanatory view of a relation between an intensity distribution obtained from an imaging element and its four components (No. 1).

As seen from Expression (1.7), the intensity distribution I (x, y) acquired from the imaging element contains four components. One of them is a component that gently varies with respect to the spatial coordinates (x, y), and other three components are quasi-sinusoidal components that vibrate with respect to the spatial coordinates (x, y). These are schematically shown in FIG. 3.

Here, the central spatial frequencies of the three vibration components are $(U_{-x}, U_{-y})$, $(U_{2x}, U_{2y})$, $(U_{+x}, U_{+y})$. This means that three interference patterns in three different directions are superimposed on each other.

What needs to be concerned herein that these four components have information of any one of $S_0$ (x, y), $S_1$ (x, y) and $S_{23}$ (x, y). When each component can be separated, it is possible to determine the two-dimensional spatial distributions $S_0$ (x, y), $S_1$ (x, y), $S_2$ (x, y), and $S_3$ (X, y) of all Stokes parameters from one intensity distribution I (x, y).

1.3 When Crossing Angle between Elements is not 45°

Next described is an intensity distribution acquired in the imaging element 104 when a crossing angle between the elements is not 45°.

Here also described as a supplemental explanation is an intensity distribution acquired when a crossing angle between the elements in the optical system is not 45°.

It is assumed now that, in the optical system shown in FIG. 1, the angle formed between the principal axes of the birefringent prism pairs $BPP_1$ and $BPP_2$ is $\theta_{BB}$ and the angle formed between the principal axis of the birefringent prism pairs $BPP_2$ and the transmission axis of the analyzer A is $\theta_{BA}$. Although calculation has been limited to the case of $\theta_{BB}=45°$ and $\theta_{BA}=-45°$, the case where those angles are more common ones is shown here.

An expression for the obtained intensity distribution I (x, y) is given as follows.

[Mathematical Expression 4]

$$I(x, y) = \quad (1.9)$$
$$\frac{1}{2} m_0(x, y)[S_0(x, y) + \cos 2\theta_{BA} \cos 2\theta_{BB} S_1(x, y)] - \frac{1}{2}(\sin 2\theta_{BA} \sin^2\theta_{BB})$$
$$m_-(x, y)|S_{23}(x, y)|\cos[\phi_2(x, y) - \phi_1(x, y) + \arg\{S_{23}(x, y)\}] -$$
$$\frac{1}{2}(\sin 2\theta_{BA} \sin 2\theta_{BB}) m_2(x, y) S_1(x, y) \cos[\phi_2(x, y)] +$$
$$\frac{1}{2}(\sin 2\theta_{BA} \cos^2\theta_{BB}) m_+(x, y)|S_{23}(x, y)|$$
$$\cos[\phi_2(x, y) + \phi_1(x, y) - \arg\{S_{23}(x, y)\}] + \frac{1}{2}(\cos 2\theta_{BA} \sin 2\theta_{BB})$$
$$m_1(x, y)|S_{23}(x, y)|\cos[\phi_1(x, y) - \arg\{S_{23}(x, y)\}]$$

These are schematically shown in FIG. 4.

When this expression is compared with the intensity distribution in the previous expression (1.5), namely when the angles $\theta_{BB}$ and $\theta_{BA}$ are respectively limited to 45° and −45°, the following differences are found in addition to a mere difference in constant multiple of a coefficient. It is to be noted that the different part is indicated with an underline in Expression (1.9).

The component that gently varies with respect to the intensity distribution (x, y) depends not only upon $S_0$ (x, y) but additionally upon $S_1$ (x, y).

A component that quasi-sinusoidally vibrates according to the phase $\phi_1$ (x, y), namely a component that vibrates at a central spatial frequency $(U_{1x}, U_{1y})$ is added. It should be noted that this component has information of $S_{23}$ (x, y) like the two components which vibrate according to the $\phi_2$ (x, y)−$\phi_1$ (x, y) and $\phi_2$ (x, y)+$\phi_1$ (x, y). It means that this term can be treated in the same manner as the other two terms including $S_{23}$.

Here, conditions for nonappearance of the above two components are considered.

The former term appears in a limited case "when both $\theta_{BB}\neq\pm 45°$ and $\theta_{BA}\neq\pm 45°$ are satisfied". Meanwhile, the latter term appears "when $\theta_{BA}\neq\pm 45°$ (regardless of whether $\theta_{BB}$ aggress with 45° or not)". From these, a fact can be mentioned as follows.

When the principal axis of the birefringent prism pair $BPP_2$ and the transmission axis of the analyzer A cross each other at an angle of 45° (i.e. $\theta_{BA}\neq\pm 45°$), the intensity distribution obtained from the imaging element is given by Expression (1.5) except for the difference in constant multiple of a coefficient of each term. Here, whether the angle $\theta_{BB}$ formed between the principal axes of the birefringent prism pairs $BPP_1$ and $BPP_2$ agrees with ±45° or not is irrelevant.

In other words, the intensity distribution can take the form of Expression (1.5) under a condition that the principal axis of the birefringent prism pair $BPP_2$ and the transmission axis of the analyzer A cross each other at an angle of 45°. On the other hand, whether the angle formed between the principal axes of the birefringent prism pairs $BPP_1$ and BPP2 agrees with ±45° or not is irrelevant.

Figure 5:
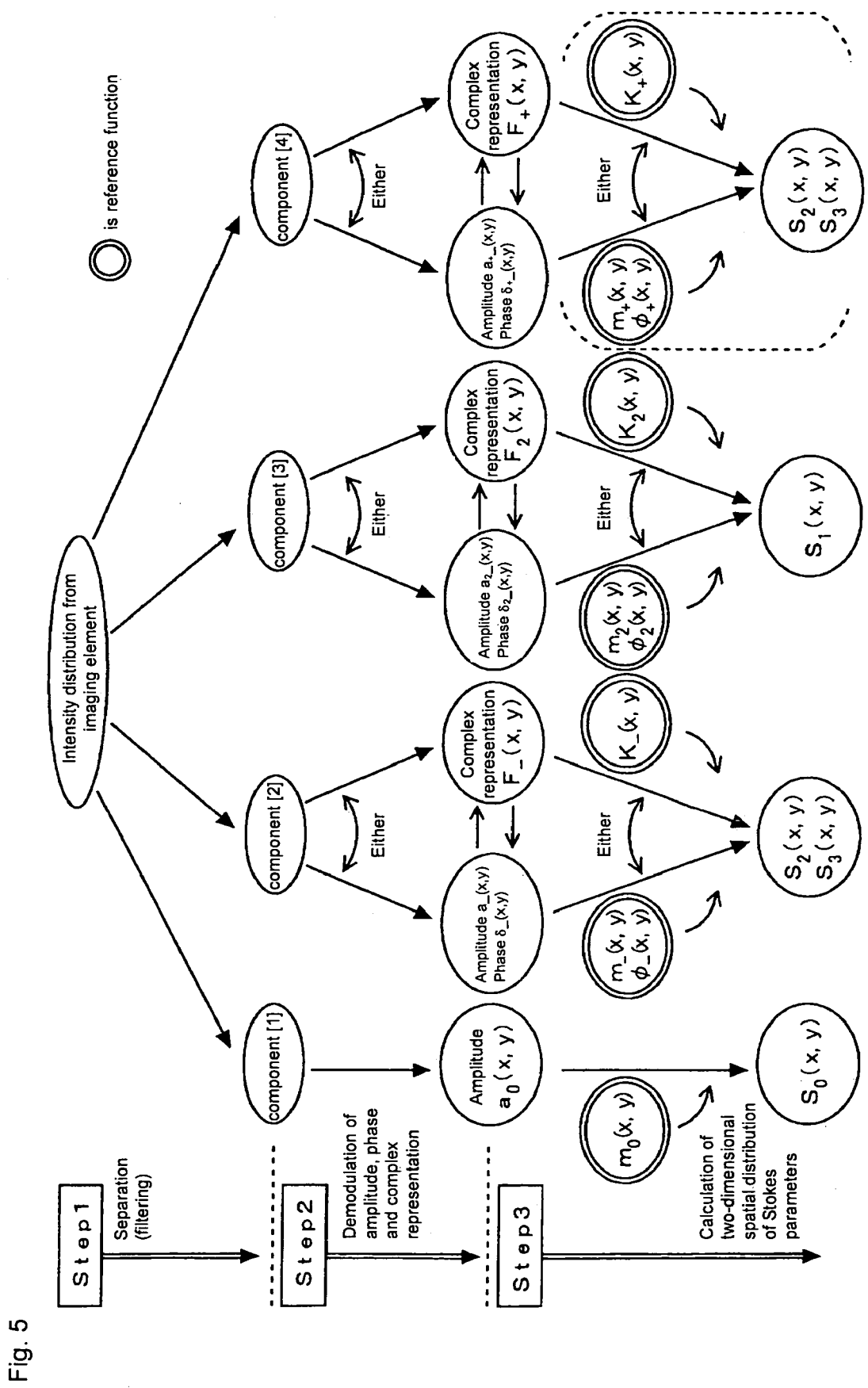
FIG. 5 shows an explanatory view of a process (flows of signal processing) for demodulating a two-dimensional spatial distribution of Stokes parameter.

1.4 Process for Demodulating Two-Dimensional Spatial Distribution of Stokes Parameter A specific process for demodulating the two-dimensional spatial distribution of the stokes parameter is described below with reference to FIG. 5. A brief description of the flow of the process is as follows.

Step 1: Each term is separated from the intensity distribution I (x, y) obtained from the imaging element.

Step 2: An amplitude and a phase of each component are obtained. (Or equivalent quantities, e.g. a real part and an imaginary part in complex representation are obtained).

Step 3:

[Mathematical Expression 5]

$$\cdot \text{reference amplitude function} \begin{Bmatrix} m_0(x, y) \\ m_-(x, y) \\ m_2(x, y) \\ m_+(x, y) \end{Bmatrix}$$

$$\cdot \text{reference phase function} \begin{Bmatrix} \phi_1(x, y) \\ \phi_2(x, y) \end{Bmatrix}$$

The above reference functions included in an amplitude and a phase of each vibration component are removed to obtain the two-dimensional spatial distributions $S_0$ (x, y), $S_1$ (x, y), $S_2$ (x, y) and $S_3$ (x, y) of the Stokes parameters. (These reference functions depend not upon light under measurement but only upon parameters of a polarimeter).

Each of the steps is described as follows.

[Step 1]

As described in the previous section, the intensity distribution I (x, y) obtained from the imaging element contains four components. An operation for taking out each component by a signal process is performed. What is applied to this operation is that each component vibrates at a different period (frequency). With the use of (any one on a variety of frequency filtering techniques being broadly used in fields of communication engineering, signal analysis and the like, it is possible to separate each component.

[Mathematical Expression 6]

· component [1](low frequency component) (1.10a)

$$\frac{1}{2}m_0(x, y)S_0(x, y)$$

· component [2](central spatial frequency $U_{-x}, U_{-y}$)) (1.10b)

$$\frac{1}{4}m_-(x, y)|S_{23}(x, y)|\cos[\phi_2(x, y) - \phi_1(x, y) + \arg\{S_{23}(x, y)\}]$$

· component [3](central spatial frequency $U_{2x}, U_{2y}$)) (1.10c)

$$\frac{1}{2}m_2(x, y)S_1(x, y)\cos[\phi_2(x, y)]$$

· component [4](central spatial frequency $U_{+x}, U_{+y}$)) (1.10d)

$$-\frac{1}{4}m_+(x, y)|S_{23}(x, y)|\cos[\phi_2(x, y) + \phi_1(x, y) - \arg\{S_{23}(x, y)\}]$$

component [1] is a component of intensity distribution which nonperiodically vibrates with spatial coordinates component [2] is a component of intensity distribution which vibrates with spatial coordinates at a frequency depending upon a difference between the first reference phase function $\phi_1(x, y)$ and the second reference phase function $\phi_2(x, y)$ component [3] is a component of intensity distribution which vibrates with spatial coordinates at a frequency depending upon a second reference phase function $\phi_2(x, y)$ and not depending upon the first reference phase function $\phi_1(x, y)$ component [4] is a component of intensity distribution which vibrates with spatial coordinates at a frequency depending upon a sum of the first reference phase function $\phi_1(x, y)$ and the second reference phase function $\phi_2(x, y)$. When the principal axis of the birefringent prism pair BPP$_2$ and the transmission axis of the analyzer A is not 45°, a component of intensity distribution [5] appears which vibrates with special coordinates at a frequency depending upon the first reference phase function $\phi_1(x, y)$ and not depending upon the second reference phase function $\phi_2(x, y)$.

[Step 2]

Figure 6:
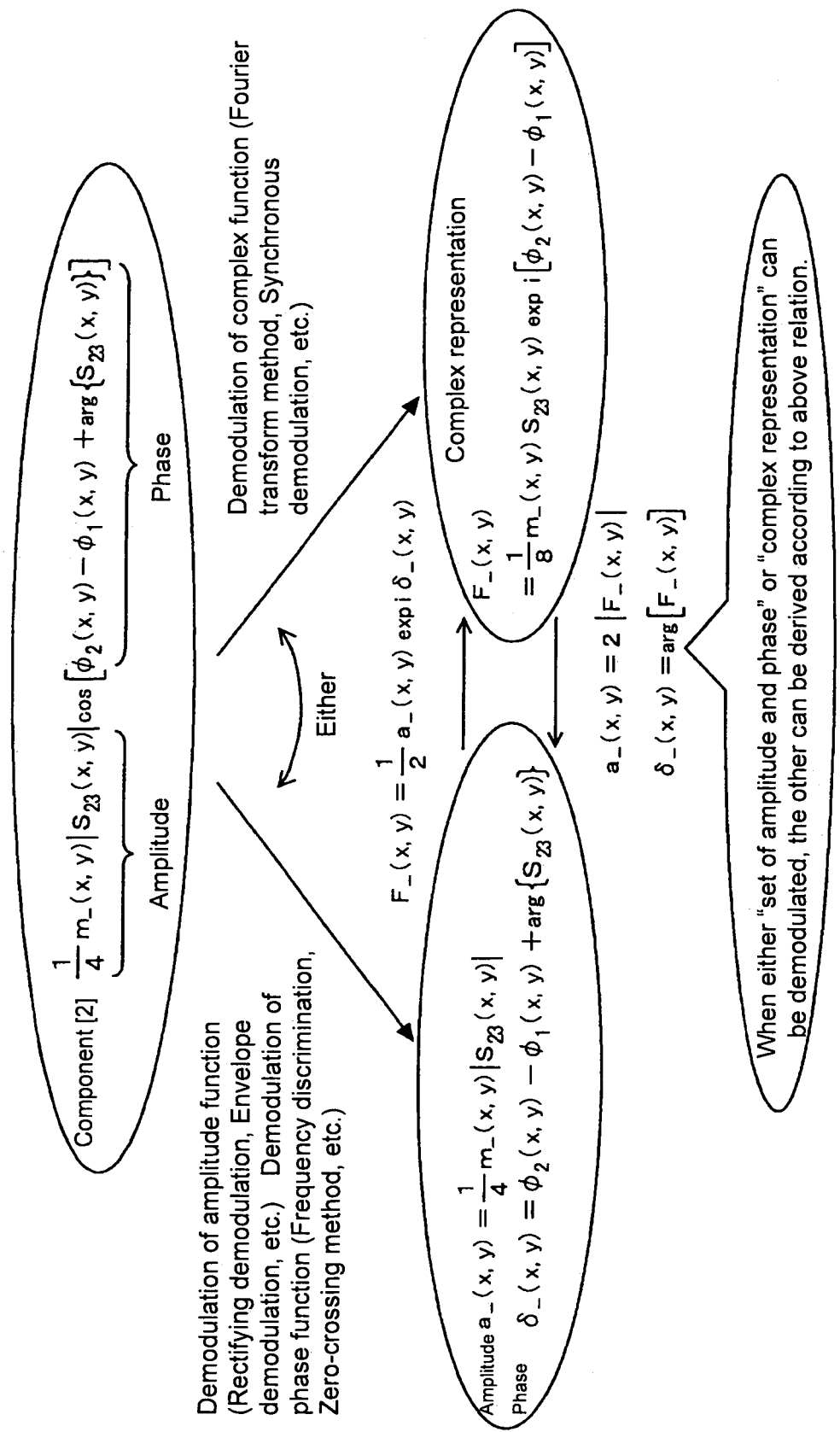
FIG. 6 shows an explanatory view of one example of Step 2.

As for each component separated in Step 1, a "set of an amplitude and a phase" and a "complex representation" are obtained, as shown in FIG. 6. This can be readily realized by using a variety of demodulation methods which are common in fields of communication engineering, signal analysis and the like, as in Step 1. Those methods include:

Amplitude demodulation: rectifying demodulation, envelope demodulation, etc.

Phase demodulation: frequency discrimination, zero-crossing method, etc.

Complex representation demodulation: Fourier transform method (later described), synchronous demodulation, etc.

Here, definitions and basic properties of the "amplitude", "phase" and "complex representation" of a vibration component are summarized below. As seen from Expressions (1.10a) to (1.10d), each of the separated components except for component [1] takes the form of:

$$a(x, y)\cos\delta(x, y) \quad (1.11)$$

a(x, y) and δ(x, y) here are respectively referred to as the "amplitude" and "phase" of the vibration component. It is to be noted that, if assuming that the phase $\delta_0(x, y)=0$ (i.e. cos $\delta_0(x, y)=1$) also in component [1], the amplitude of this component can also be defined.

Further, F(x, y) having the following relation with the amplitude and the phase is called a complex representation.

[Mathematical Expression 7]

$$F(x, y) = \frac{1}{2}a(x, y)\exp[i\delta(x, y)] \quad (1.12a)$$

$$= \left[\frac{1}{2}a(x, y)\cos\delta(x, y)\right] + i\left[\frac{1}{2}a(x, y)\sin\delta(x, y)\right] \quad (1.12b)$$

The real part of F(x, y) is formed by dividing the amplitude of the vibration component into halves, and the imaginary part thereof is displaced from the real part at the angle of 90°. It should be noted that in component [1], the amplitude is not divided into halves since δ (x, y)=0, i.e. no imaginary part exists.

What needs to be concerned here is that when either the "set of the amplitude and phase" or the "complex representation" is demodulated, the other one can be immediately calculated by the use of the following relational expression.

[Mathematical Expression 8]

"amplitude $a(x, y)$, phase $\delta(x, y)$" → (1.13)
"complex representation $F(x, y)$"

$$F(x, y) = \frac{1}{2}a(x, y)e^{i\delta(x,y)}$$

"complex representation $F(x, y)$" → (1.14a)
"amplitude $a(x, y)$, phase $\delta(x, y)$"

$$a(x, y) = 2|F(x, y)|$$

$$\delta(x, y) = \arg[F(x, y)] \quad (1.14b)$$

Namely, when on is demodulated, the other can be immediately calculated as necessary.

When the "amplitude" and "phase" of each component are demodulated, the following results are obtained.

[Mathematical Expression 9]

· component [1](low frequency component) (1.15a)

"amplitude" $a_0(x, y) = \frac{1}{2}m_0(x, y)S_0(x, y)$

"phase" $\delta_0(x, y) = 0$

· component [2](central spatial frequency $U_{-x}, U_{-y}$)) (1.15b)

"amplitude" $a_-(x, y) = \frac{1}{4}m_-(x, y)|S_{23}(x, y)|$

"phase" $\delta_-(x, y) = \phi_2(x, y) - \phi_1(x, y) + \arg\{S_{23}(x, y)\}$

· component [3](central spatial frequency $U_{2x}, U_{2y}$)) (1.15c)

"amplitude" $a_2(x, y) = \frac{1}{2}m_2(x, y)S_1(x, y)$

"phase" $\delta_2(x, y) = \phi_2(x, y)$

-continued component [4](central spatial frequency $U_{+x}, U_{+y}$)) (1.15d)

"amplitude" $a_+(x, y) = \frac{1}{4}m_+(x, y)|S_{23}(x, y)|$

"phase" $\delta_+(x, y) = \phi_2(x, y) + \phi_1(x, y) - \arg\{S_{23}(x, y)\} + \pi$ On the other hand, when the "complex representation" of each component is demodulated, the following results are obtained.

[Mathematical Expression 10]

component [1] (low frequency component) (1.16a)
"complex representation" $F_0(x, y) = \frac{1}{2}m_0(x, y)S_0(x, y)$ component [2] (central spatial frequency $U_{-x}, U_{-y}$)) (1.16b)
"complex representation" $F_-(x, y) =$
$$\frac{1}{8}m_-(x, y)S_{23}(x, y)\exp i[\phi_2(x, y) - \phi_1(x, y)]$$

component [3] (central spatial frequency $U_{2x}, U_{2y}$)) (1.16c)
"complex representation" $F_2(x, y) =$
$$\frac{1}{4}m_2(x, y)S_1(x, y)\exp i\phi_2(x, y)$$

component [4] (central spatial frequency $U_{+x}, U_{+y}$)) (1.16d)
"complex representation" $F_+(x, y) =$
$$-\frac{1}{8}m_+(x, y)S_{23}^*(x, y)\exp i[\phi_2(x, y) + \phi_1(x, y)]$$

Here, * denotes a complex conjugation. It is to be noted that, for the sake of what is described below, the expressions of the complex representations are rewritten as follows.

[Mathematical Expression 11]

component [1] (low frequency component) (1.17a)
"complex representation" $F_0(x, y) = K_0(x, y)S_0(x, y)$ component [2] (central spatial frequency $U_{-x}, U_{-y}$)) (1.17b)
"complex representation" $F_-(x, y) = K_-(x, y)S_{23}(x, y)$ component [3] (central spatial frequency $U_{2x}, U_{2y}$)) (1.17c)
"complex representation" $F_2(x, y) = K_2(x, y)S_1(x, y)$ component [4] (central spatial frequency $U_{+x}, U_{+y}$)) (1.17d)
"complex representation" $F_+(x, y) = K_+(x, y)S_{23}^*(x, y)$ where $K_0(x, y) = \frac{1}{2}m_0(x, y)$ (1.18a)

$K_-(x, y) = \frac{1}{8}m_-(x, y)\exp i[\phi_2(x, y) - \phi_1(x, y)]$ (1.18b)

$K_2(x, y) = \frac{1}{4}m_2(x, y)\exp i\phi_2(x, y)$ (1.18c)

$K_+(x, y) = -\frac{1}{8}m_+(x, y)\exp i[\phi_2(x, y) + \phi_1(x, y)]$ (1.18d)

[Step 3]

Finally, from the "amplitude" and the "phase" or the "complex representation" obtained in Step 2, the two-dimensional spatial distributions $S_0(x, y)$, $S_1(x, y)$, $S_2(x, y)$, and $S_3(x, y)$ of the Stokes parameters as functions of the spatial coordinates (x, y) are determined.

The "amplitude" and the "phase" obtained in Step 2 include, other than the two-dimensional spatial distribution of the Stokes parameters to be obtained, parameters shown below.

[Mathematical Expression 12]

Parameter (function) determined based only upon property of polarimeter $$\begin{Bmatrix} m_0(x, y) \\ m_-(x, y) \\ m_2(x, y) \\ m_+(x, y) \end{Bmatrix}$$

and $$\begin{Bmatrix} \phi_-(x, y) = \phi_2(x, y) - \phi_1(x, y) \\ \phi_2(x, y) \\ \phi_+(x, y) = \phi_2(x, y) + \phi_1(x, y) \end{Bmatrix}$$

The former are included in the amplitude while the latter are included in the phase. These provide references in determining the two-dimensional spatial distribution of the Stokes parameters from the amplitude and the phase of each vibration component. Thus, each of these functions is hereinafter referred to as a "reference amplitude function" and a "reference phase function". Since these parameters do not depend upon light under measurement, each of the parameters is subjected to division or subtraction, to be determined as follows.

$S_0(x, y)$ can be determined from [component [1]].

$S_2(x, y)$ and $S_3(x, y)$ can be determined from (either) [component [2]] or [component [4]].

$S_1(x, y)$ can be determined from [component [3]].

Meanwhile, in the case of the "complex representation", parameters (functions) determined only by the property of the polarimeter itself are $K_0(x, y)$, $K_-(x, y)$, $K_2(x, y)$, and $K_+(x, y)$ which are defined by Expressions (1.18a) to (1.18d). These are, so to speak, "reference complex functions".

As revealed from Expressions (1.17a) to (1.17d), if the above reference complex functions have been obtained, by division of the complex representation of each vibration component demodulated in Step 2, the parameters can be determined as follows.

$S_0(x, y)$ can be determined from [component [1]]

$S_2(x, y)$ and $S_3(x, y)$ can be determined from (either) [component [2]] or [component [4]].

$S_1(x, y)$ can be determined from [component [3]].

When the angle formed between the birefringent prism pair $BPP_2$ and the analyzer A is not 45°, the fifth term that appears can be used in place of [component [2]] and [component [4]]. Namely, the description on line 2 above can be rewritten to:

$S_2(x, y)$ and $S_3(x, y)$ can be determined from any one of [component [2]], [component [4]] and [component [5]].

Next, as one of signal processing methods for demodulating the two-dimensional spatial distribution of the Stokes parameters, a "Fourier transform method" is described with reference to FIG. 7. The use of this method allows efficient concurrent performance of Steps 1 and 2, leading to immediate determination of all complex representations of each vibration component.

In this method, first, the intensity distribution I(x, y) measured with the imaging element in the imaging polarimeter using the birefringent prism pair is subjected to Fourier transformation, to obtain the following two-dimensional spatial-frequency spectrum.

[Mathematical Expression 13]

$$\tilde{I}(f_x, f_y) = A_0(f_x, f_y) + \qquad (1.19)$$
$$A_-(f_x - U_{-x}, f_y - U_{-y}) + A_-^*(-f_x - U_{-x}, -f_y - U_{-y}) +$$
$$A_2(f_x - U_{2x}, f_y - U_{2y}) + A_2^*(-f_x - U_{2x}, -f_y - U_{2y}) +$$
$$A_+(f_x - U_{+x}, f_y - U_{+y}) + A_+^*(-f_x - U_{+x}, -f_y - U_{+y})$$

where $$A_0(f_x, f_y) = F^{-1}\left[\frac{1}{2}m_0(x, y)S_0(x, y)\right] \qquad (1.20a)$$

$$A_-(f_x, f_y) = F^{-1}\left[\frac{1}{8}m_-(x, y)S_{23}(x, y)\exp i\Phi_-(x, y)\right] \qquad (1.20b)$$

$$A_2(f_x, f_y) = F^{-1}\left[\frac{1}{4}m_2(x, y)S_1(x, y)\exp i\Phi_2(x, y)\right] \qquad (1.20c)$$

$$A_+(f_x, f_y) = F^{-1}\left[-\frac{1}{8}m_+(x, y)S_{23}^*(x, y)\exp i\Phi_+(x, y)\right] \qquad (1.20d)$$

is spatial-frequency spectrum $\tilde{I}(f_x, f_x)$ contains seven components. In addition, as shown in the lower right box in FIG. 1, when the inclination of the contact surfaces of the $BPP_1$ and $BPP_2$ are only in the y direction and only in the x direction, respectively, the above spectrum becomes as follows.

$$\tilde{I}(f_x, f_y) = A_0(f_x, f_y) + \qquad (1.21)$$
$$A_-(f_x - U_{2x}, f_y - U_{1y}) + A_-^*(-f_x - U_{2x}, -f_y - U_{1y}) +$$
$$A_2(f_x - U_{2x}, f_y) + A_2^*(-f_x - U_{2x}, -f_y) +$$
$$A_+(f_x - U_{2x}, f_y - U_{1y}) + A_+^*(-f_x - U_{2x}, -f_y - U_{1y})$$

Figure 7:
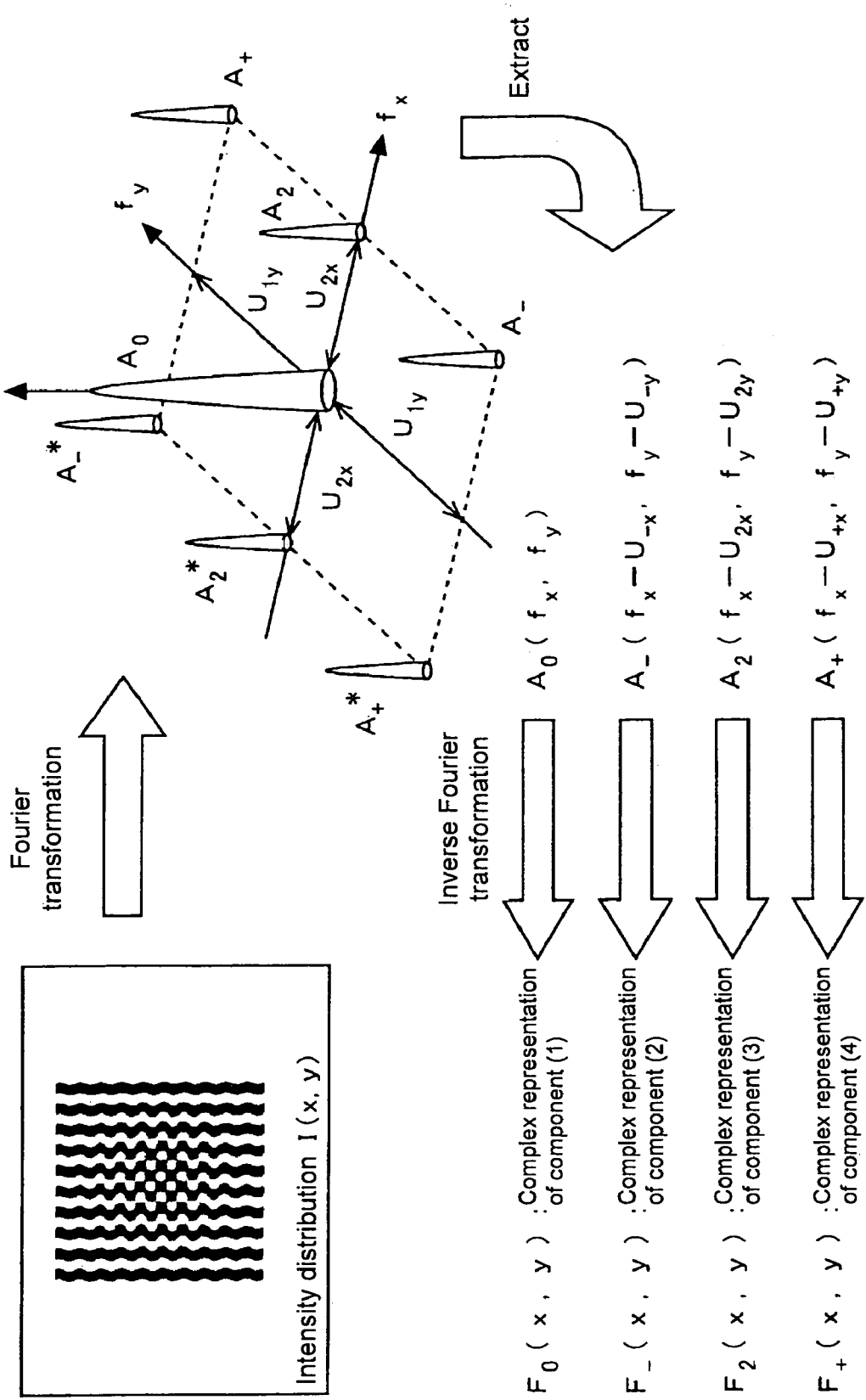
FIG. 7 shows an explanatory view of Fourier transformation.

This spectrum is schematically shown in a upper left box in FIG. 7.

Meanwhile, the central special frequency of the seven components contained in the spatial-frequency spectrum $\tilde{I}(f_x, f_x)$ are (0,0), $\pm(U_{-x}, U_{-y})$, $\pm(U_{2x}, U_{2y})$, and $\pm(U_{+x}, U_{+y})$. Here, when appropriate selection of these inverse frequencies, the components contained in the $\tilde{I}(f_x, f_x)$ can be separated in the two-dimensional spatial-frequency space from each other.

When four components with $(f_x, f_x)=(0,0)$, $(U_{-x}, U_{-y})$, $(U_{2x}, U_{2y})$, and $(U_{+x}, U_{+y})$ at the nucleus are taken out and then subjected to the Fourier transformation, the following expressions are satisfied.

[Mathematical Expression 14]

$$F[A_0(f_x, f_y)] = \frac{1}{2}m_0(x, y)S_0(x, y) \qquad (1.22a)$$
$$= F_0(x, y)$$

-continued $$F[A_-(f_x - U_{-x}, f_y - U_{-y})] = \frac{1}{8}m_-(x, y)S_{23}(x, y)\exp i \qquad (1.22b)$$
$$[\phi_2(x, y) - \phi_1(x, y)]$$
$$= F_-(x, y)$$

$$F[A_2(f_x - U_{2x}, f_y - U_{2y})] = \frac{1}{4}m_2(x, y)S_1(x, y)\exp i\phi_2(x, y) \qquad (1.22c)$$
$$= F_2(x, y)$$

$$F[A_+(f_x - U_{+x}, f_y - U_{+y})] = -\frac{1}{8}m_+(x, y)S_{23}^*(x, y)\exp i \qquad (1.22d)$$
$$[\phi_2(x, y) + \phi_1(x, y)]$$
$$= F_+(x, y)$$

As seen from the expressions above, what are obtained in the above operation are just the complex representations of the components [1] to [4] to be obtained in foregoing Step 2. Namely, in the above operations, Steps 1 and 2 are concurrently realized. Hence, when Step 3 is performed using the results of Steps 1 and 2, all two-dimensional spatial distribution of the Stokes parameters is obtained all at once.

1.5 Pre-Calibration: Calibration of Reference Amplitude Function, Reference Phase Function, Reference Complex Function "Prior to Measurement"

As described in the previous section, when the two-dimensional spatial distribution (two-dimensional spatial distribution of the Stokes parameters) of SOP of the light under measurement is determined from the intensity distribution obtained from the imaging element, it is necessary to determine in advance in Step 3 parameters to be obtained based only on a property of the polarimeter itself, namely:

"reference amplitude function" $m_0(x, y)$, $m_-(x, y)$, $m_2(x, y)$, $m_+(x, y)$, and "reference phase function" $\phi_2(x, y)$ and $\phi_1(x, y)$, or "reference complex function" $K_0(x, y)$, $K_-(x, y)$, $K_2(x, y)$, $K_+(x, y)$.

The former ("reference amplitude function" and "reference phase function") and the latter ("reference complex function") are required in the respective cases of obtaining the two-dimensional spatial distribution of the Stokes parameters from the "amplifier and phase" or the "complex representation" of each vibration component. Since these are functions not depending upon the light under measurement, it is desirable to calibrate the functions at least prior to measurement.

Figure 8:
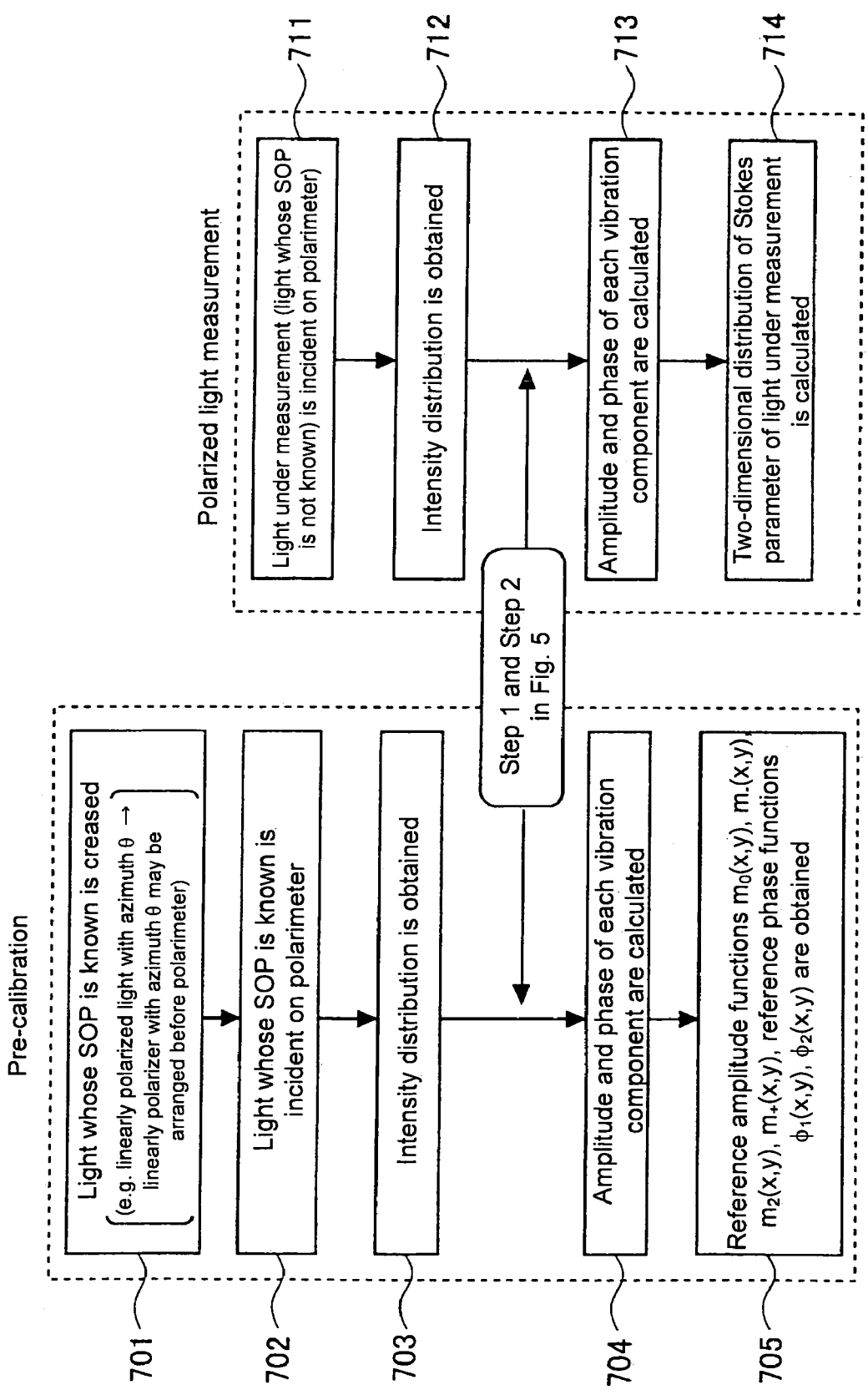
FIG. 8 shows a flowchart of pre-calibration and polarized light measurement.
Figure 9:
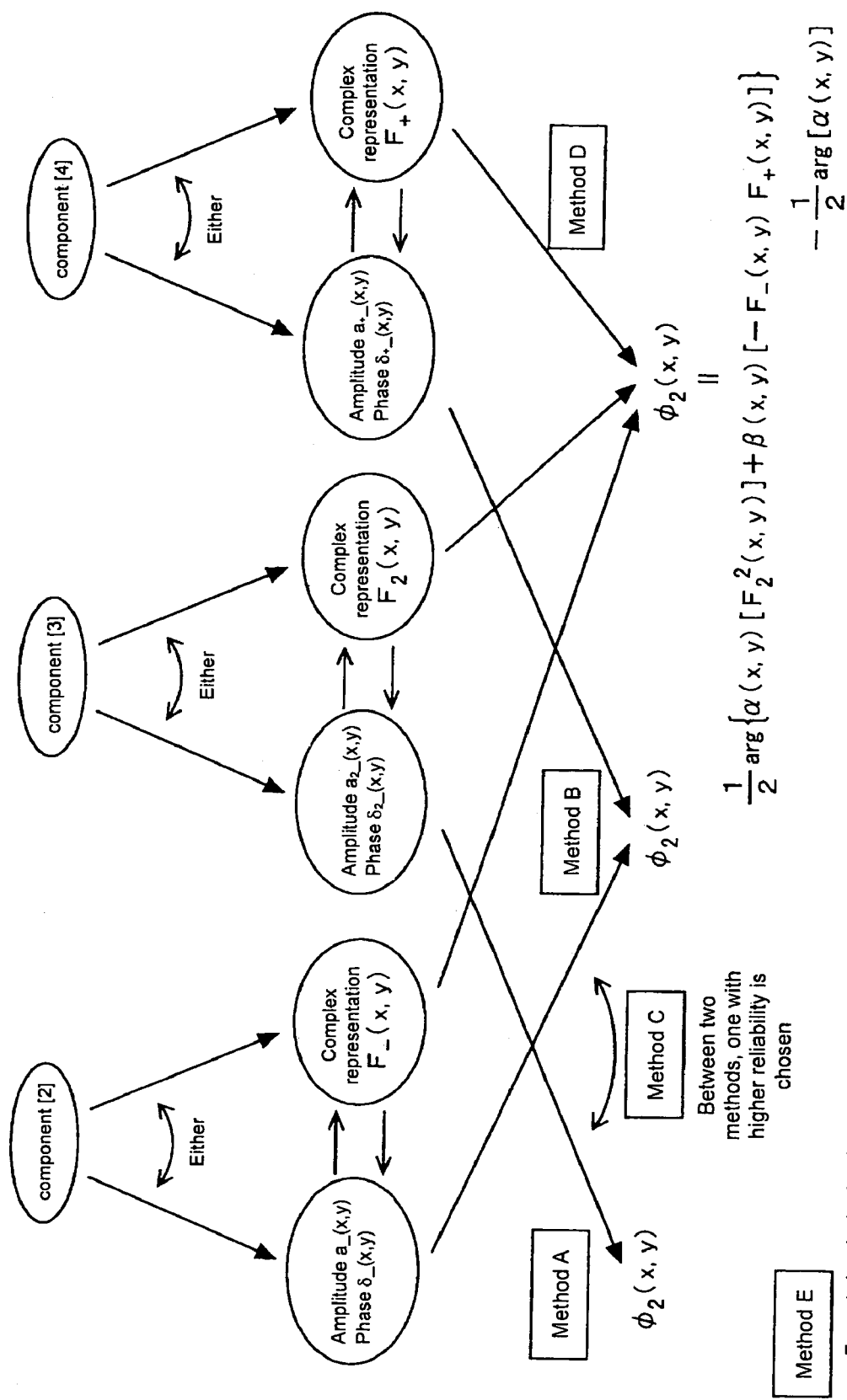
FIG. 9 shows an explanatory view of flows of signals for calibration during measurement.
Figure 10:
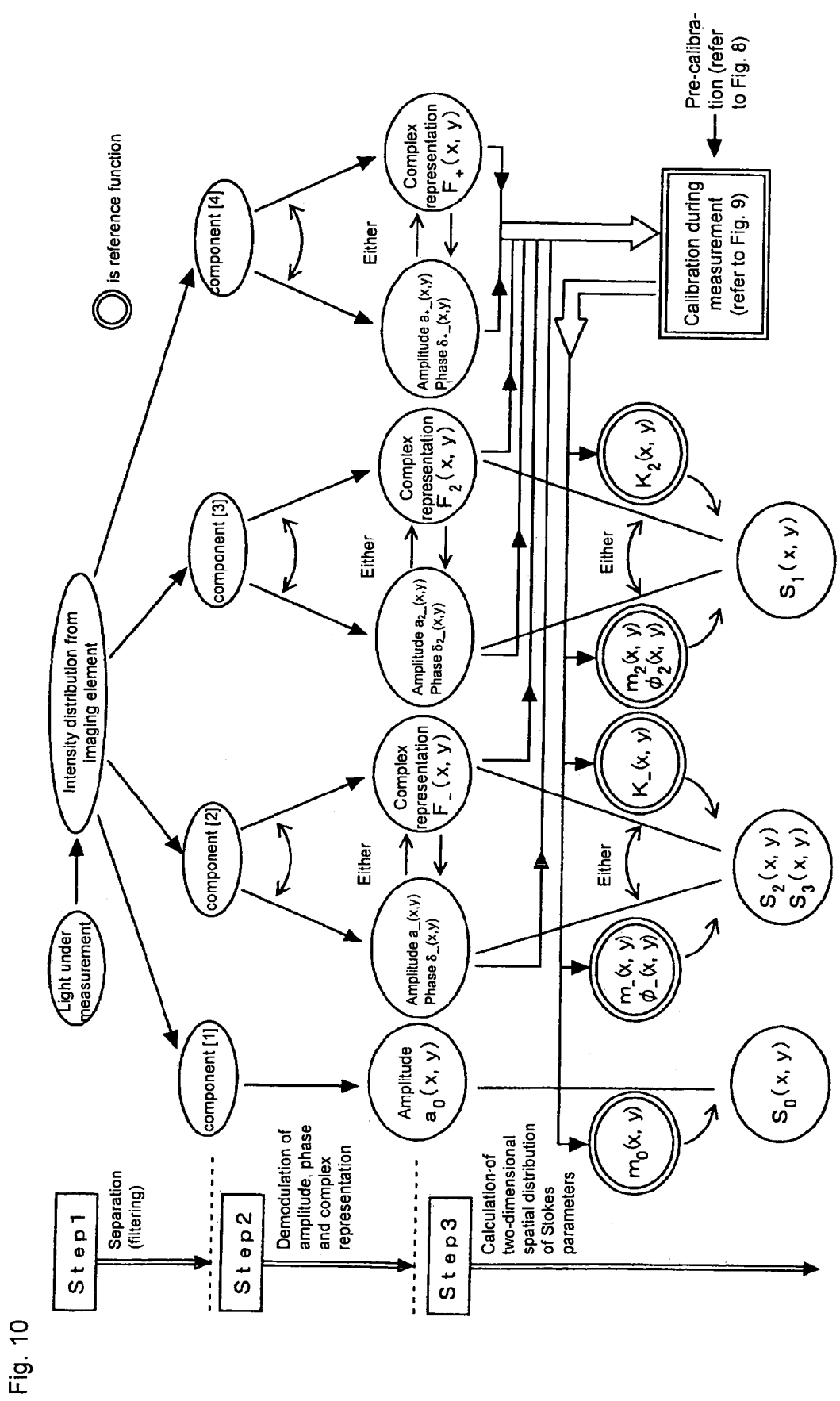
FIG. 10 shows an explanatory view of flows of signals in the combination of the "calibration during measurement" and the "measurement of a two-dimensional spatial distribution of Stokes parameter".

In this section, a process for calibrating these reference functions "prior to measurement, i.e. in advance" is described. Namely, as shown in FIG. 8, pre-calibration (Steps 701 to 705) needs to be performed prior to polarization measurement (Steps 711 to 714). There are two typical methods as follows.

[Method 1]: a method for calibrating reference phase functions and reference amplitude functions based upon a property of each element for use in the optical system.

[Method 2]: a method for calibrating reference phase functions and reference amplitude functions by the use of light having a known SOP.

1.5.1 [Method 1]

Method for Calibrating Reference Phase Function and Reference Amplitude Function Based upon Property of each Element for Use in Optical System Properties of a reference phase function and a reference amplitude function are essentially determined based upon elements for use in an imaging polarimeter using a birefringent prism pair. Therefore, optical properties of individual elements are repeatedly examined by experiment or calculation to perform calibration of parameters.

1.5.2 [Method 2]

Method for Calibrating Reference Phase Function and Reference Amplitude Function by Use of Light having a Known SOP The reference phase function and the reference amplitude function are in amount determined based not upon "SOP of light under measurement", but only upon the property of the "imaging polarimeter using the birefringent prism pair". Accordingly, the "light having a known SOP" (light whose measurement result is known)"is inputted into the polarimeter, and using the result of the input, it is possible to calculate backward the reference phase function and the reference amplitude function.

It is to be noted that the "imaging polarimeter using the birefringent prism pair" has the following advantages.

The "light whose SOP is known" may be "only one kind" of light.

"Linearly polarized light" can be used as the "only one kind of light".

In a currently used polarimeter for obtaining the two-dimensional spatial distribution of the Stokes parameters, it has been normally required in calibration that at least four kinds of light with different states of polarization be prepared and further that at least one kind of light be not linearly polarized light. As opposed to this, in the imaging polarimeter using the birefringent prism pair, only one kind of known polarized light is required, and it may further be linearly polarized light. The linearly polarized light is convenient because, unlike light in other SOPs, the linearly polarized light can facilitate creation of precisely controlled polarized light by means of high-extinction polarizer made of crystal.

Below, the process for calibration is shown. As described at the beginning of this section, the following should be noted.

When the SOP is obtained from the "amplitude and phase" of each vibration component, the "reference amplitude function" and the "reference phase function" are required.

When the SOP is obtained from the "complex representation" of each vibration component, the "reference complex function" is required.

In the following, the respective processes for calibration in the above two cases are described. Although these processes are essentially equivalent and different only in calculation method, they are separately put down for the sake of convenience.

A. Calibration Process for Separately Obtaining Reference Amplitude Function and Reference Phase Function In this calibration, first, "light having some known SOP" is prepared, and then incident on an imaging polarimeter using a birefringent prism pair. Two-dimensional spatial distribution of the Stokes parameters of the known light are referred to as $S_0^{(0)}(x, y)$, $S_1^{(0)}(x, y)$, $S_2^{(0)}(x, y)$, and $S_3^{(0)}(x, y)$. When the light is subjected to the above-mentioned demodulation means, the amplitude and the phase obtained in Step 2 are expressed as follows according to Expressions (1.15a) to (1.15d).

[Mathematical Expression 15]

component [1] (low frequency component) (1.23a)

"amplitude" $a_0^{(0)}(x, y) = \frac{1}{2}m_0(x, y)S_0^{(0)}(x, y)$

"phase" $\delta_0^{(0)}(x, y) = 0$ component [2] (central spatial frequency $U_{-x}, U_{-y}$)) (1.23b)

"amplitude" $a_-^{(0)}(x, y) = \frac{1}{4}m_-(x, y)|S_{23}^{(0)}(x, y)|$

"phase" $\delta_-^{(0)}(x, y) = \phi_2(x, y) - \phi_1(x, y) + \arg\{S_{23}^{(0)}(x, y)\}$ component [3] (central spatial frequency $U_{2x}, U_{2y}$) (1.23c)

"amplitude" $a_2^{(0)}(x, y) = \frac{1}{2}m_2(x, y)S_1^{(0)}(x, y)$

"phase" $\delta_2^{(0)}(x, y) = \phi_2(x, y)$ component [4] (central spatial frequency $U_{+x}, U_{+y}$)) (1.23d)

"amplitude" $a_+^{(0)}(x, y) = \frac{1}{4}m_+(x, y)|S_{23}^{(0)}(x, y)|$

"phase" $\delta_+^{(0)}(x, y) = \phi_2(x, y) + \phi_1(x, y) - \arg\{S_{23}^{(0)}(x, y)\} + \pi$ where, $$S_{23}^{(0)}(x, y) = S_2^{(0)}(x, y) + iS_3^{(0)}(x, y) \quad (1.24)$$

It is to be noted that this is mere replacement of $S_0(x, y)$ to $S_3(x, y)$ with $S_0^{(0)}(x, y)$ to $S_3^{(0)}(x, y)$.

The phase and the amplitude of each vibration component are determined only by the two-dimensional spatial distribution of the Stokes parameters, the reference phase functions and the reference amplitude functions. Here, since the two-dimensional spatial distribution of the Stokes parameters are known in a "case where light whose SOP is known is incident", the remaining reference amplitude functions $m_0(x, y)$, $m_-(x, y)$, $m_2(x, y)$, $m_+(x, y)$, and reference phase functions $\phi_1(x, y)$ and $\phi_2(x, y)$ are determined from the demodulated amplitude and phase. Specifically, these functions are given according to the following expressions:

[Mathematical Expression 16]

$$m_0(x, y) = \frac{2a_0^{(0)}(x, y)}{S_0^{(0)}(x, y)} \quad (1.25a)$$

$$m_-(x, y) = \frac{4a_-^{(0)}(x, y)}{|S_{23}^{(0)}(x, y)|} \quad (1.25b)$$

$$m_2(x, y) = \frac{2a_2^{(0)}(x, y)}{S_1^{(0)}(x, y)} \quad (1.25c)$$

$$m_+(x, y) = \frac{4a_+^{(0)}(x, y)}{|S_{23}^{(0)}(x, y)|} \quad (1.25d)$$

$$\phi_-(x, y) = \phi_2(x, y) - \phi_1(x, y) \quad (1.25e)$$
$$= \delta_-^{(0)}(x, y) - \arg\{S_{23}^{(0)}(x, y)\}$$

$$\phi_2(x, y) = \delta_2^{(0)}(x, y) \quad (1.25f)$$

$$\phi_+(x, y) = \phi_2(x, y) + \phi_1(x, y) \quad (1.25g)$$
$$= \delta_+^{(0)}(x, y) + \arg\{S_{23}^{(0)}(x, y)\} - \pi$$

Once these reference functions are obtained (can be calibrated), two-dimensional spatial distribution of the Stokes parameters of the light having an unknown SOP can be obtained.

It should be noted that it is seen from the above that the condition for the light having a known SOP is only that $S_0^{(0)}(x, y)$, $S_1^{(0)}(x, y)$ and $S_{23}^{(0)}(x, y)$ are not zero. In particular, as for the last $S_{23}^{(0)}(x, y)$, it is meant that the condition is satisfied even when one of $S_2^{(0)}(x, y)$ and $S_3^{(0)}(x, y)$ is zero if the other is not zero. Here, $S_3^{(0)}(x, y)=0$ means linearly polarized light. Namely, calibration is possible by the use of linearly polarized light alone. Specifically, when linearly polarized light with an azimuth 0 is used as the known light, those are expressed as follows.

$$S_0^{(0)}(x, y) = I^{(0)}(x, y) \tag{1.26a}$$

$$S_1^{(0)}(x, y) = I^{(0)}(x, y)\cos 2\theta \tag{1.26b}$$

$$S_2^{(0)}(x, y) = I^{(0)}(x, y)\sin 2\theta \tag{1.26c}$$

$$S_3^{(0)}(x, y) = 0 \tag{1.26d}$$

Here, $I_0^{(0)}(x, y)$ is an intensity distribution of calibration light. In this case, the above expressions (1.25a) to (1.25g) are expressed as follows.

[Mathematical Expression 17]

$$m_0(x, y) = \frac{2a_0^{(0)}(x, y)}{I^{(0)}(x, y)} \tag{1.27a}$$

$$m_-(x, y) = \frac{4a_-^{(0)}(x, y)}{I^{(0)}(x, y)\sin 2\theta} \tag{1.27b}$$

$$m_2(x, y) = \frac{2a_2^{(0)}(x, y)}{I^{(0)}(x, y)\cos 2\theta} \tag{1.27c}$$

$$m_+(x, y) = \frac{4a_+^{(0)}(x, y)}{I^{(0)}(x, y)\sin 2\theta} \tag{1.27d}$$

$$\phi_-(x, y) = \phi_2(x, y) - \phi_1(x, y) = \delta_-^{(0)}(x, y) \tag{1.27e}$$

$$\phi_2(x, y) = \delta_2^{(0)}(x, y) \tag{1.27f}$$

$$\phi_+(x, y) = \phi_2(x, y) + \phi_1(x, y) = \delta_+^{(0)}(x, y) - \pi \tag{1.27g}$$

It is revealed from the above that the reference amplitude function and the reference phase function can be obtained if only the azimuth angle $\theta$ and the intensity distribution $I^{(0)}(x, y)$ of a light source are known in advance. Further, even with $I^{(0)}(x, y)$ unknown, if only the azimuth angle $\theta$ is known, it can still be sufficient for use in obtaining part of (essential) polarized light parameters.

B. Calibration Process for Obtaining Both Altogether (by Regarding Both as Reference Complex Function) at Once The above-mentioned method was a method for calculating the "amplitude" and the "phase" of each vibration component separately. However, it may be more convenient (efficient) in some cases to calculate them as the "complex representation" of each vibration component. One example of such calculation may be the case of directly obtaining the "complex representation" (Expressions (1.17a) to (1.17d)), as in the Fourier transform method shown in FIG. 7 above. In such a case, calibration is efficiently performed when the "complex representation" is calibrated as it is without separation into the "amplitude" and "phase".

In the following, mathematical expressions for the above-mentioned case are shown. What needs to be concerned here is that the physical natures of the cases of using "amplitude and phase" and the "complex representation" are completely the same. It is just that in the latter case, a calculation is made using complex numbers, and thus more efficient.

Similarly to the previous section, a case is considered where light having known two-dimensional spatial distributions $S_0^{(0)}(x, y)$, $S_1^{(0)}(x, y)$, $S_2^{(0)}(x, y)$, and $S_3^{(0)}(x, y)$ of the Stokes parameters is incident on an imaging polarimeter using a birefringent prism pair. A complex representation of each vibration component is obtained according to Expressions (1.17a) to (1.17d) as follows.

$$F_0^{(0)}(x, y) = K_0(x, y)S_0^{(0)}(x, y) \tag{1.28a}$$

$$F_-^{(0)}(x, y) = K_-(x, y)S_{23}^{(0)}(x, y) \tag{1.28b}$$

$$F_2^{(0)}(x, y) = K_2(x, y)S_1^{(0)}(x, y) \tag{1.28c}$$

$$F_+^{(0)}(x, y) = K_+(x, y)S_{23}^{(0)*}(x, y) \tag{1.28d}$$

Here, the complex functions $K_0(x, y)$, $K_-(x, y)$, $K_2(x, y)$, and $K_+(x, y)$ are in amount (reference complex function) determined based not upon light under measurement, but only upon the reference amplitude function and the reference phase function, as seen from Expressions (1.18a) to (1.18d). Accordingly, these can be calculated backward as follows.

[Mathematical Expression 18]

$$K_0(x, y) = \frac{F_0^{(0)}(x, y)}{S_0^{(0)}(x, y)} \tag{1.29a}$$

$$K_-(x, y) = \frac{F_-^{(0)}(x, y)}{S_{23}^{(0)}(x, y)} \tag{1.29b}$$

$$K_2(x, y) = \frac{F_2^{(0)}(x, y)}{S_1^{(0)}(x, y)} \tag{1.29c}$$

$$K_+(x, y) = \frac{F_+^{(0)}(x, y)}{S_{23}^{(0)*}(x, y)} \tag{1.29d}$$

Similar to the case of calculating the amplitude and the phase separately, once the above reference complex function is obtained (can be calibrated), a two-dimensional spatial distribution of the Stokes parameters of light having an unknown SOP can be obtained.

It is to be noted that, just for reference, a mathematical expressions in the case of using linearly polarized light with the azimuth angle $\theta$ are shown below.

[Mathematical Expression 19]

$$K_0(x, y) = \frac{F_0^{(0)}(x, y)}{I^{(0)}(x, y)} \tag{1.30a}$$

$$K_-(x, y) = \frac{F_-^{(0)}(x, y)}{I^{(0)}(x, y)\sin 2\theta} \tag{1.30b}$$

$$K_2(x, y) = \frac{F_2^{(0)}(x, y)}{I^{(0)}(x, y)\cos 2\theta} \tag{1.30c}$$

-continued $$K_+(x, y) = \frac{F_+^{(0)}(x, y)}{I^{(0)}(x, y)\sin 2\theta} \tag{1.30d}$$

Chapter 2: Problems of Imaging Polarimeter Using Birefringent Prism Pair

As described in Step 3 in Section 1. 4, for demodulation of the two-dimensional spatial distributions $S_0(x, y)$, $S_1(x, y)$, $S_2(x, y)$, and $S_3(x, y)$ of Stokes parameters from the measured intensity distribution $I(x, y)$, it is necessary to obtain (calibrate) the following functions in advance (refer to FIG. 8).

[Mathematical Expression 20]

$$\text{Reference amplitude function} \begin{cases} m_0(x, y) \\ m_-(x, y) \\ m_2(x, y) \\ m_+(x, y) \end{cases}$$

$$\text{Reference phase function} \begin{cases} \phi_1(x, y) \\ \phi_2(x, y) \end{cases}$$

$$\text{Or reference complex function} \begin{cases} K_0(x, y) \\ K_-(x, y) \\ K_2(x, y) \\ K_+(x, y) \end{cases}$$

However, the reference phase functions $\phi_1(x, y)$ and $\phi_2(x, y)$ have the property of varying for a variety of reasons. When these functions vary, there occurs a problem in that a large error occurs in measured values of the two-dimensional spatial distribution of the Stokes parameters.

2.1 Cause of Variations in Reference Phase Function 2.1.1 Temperature Change

Figure 22:
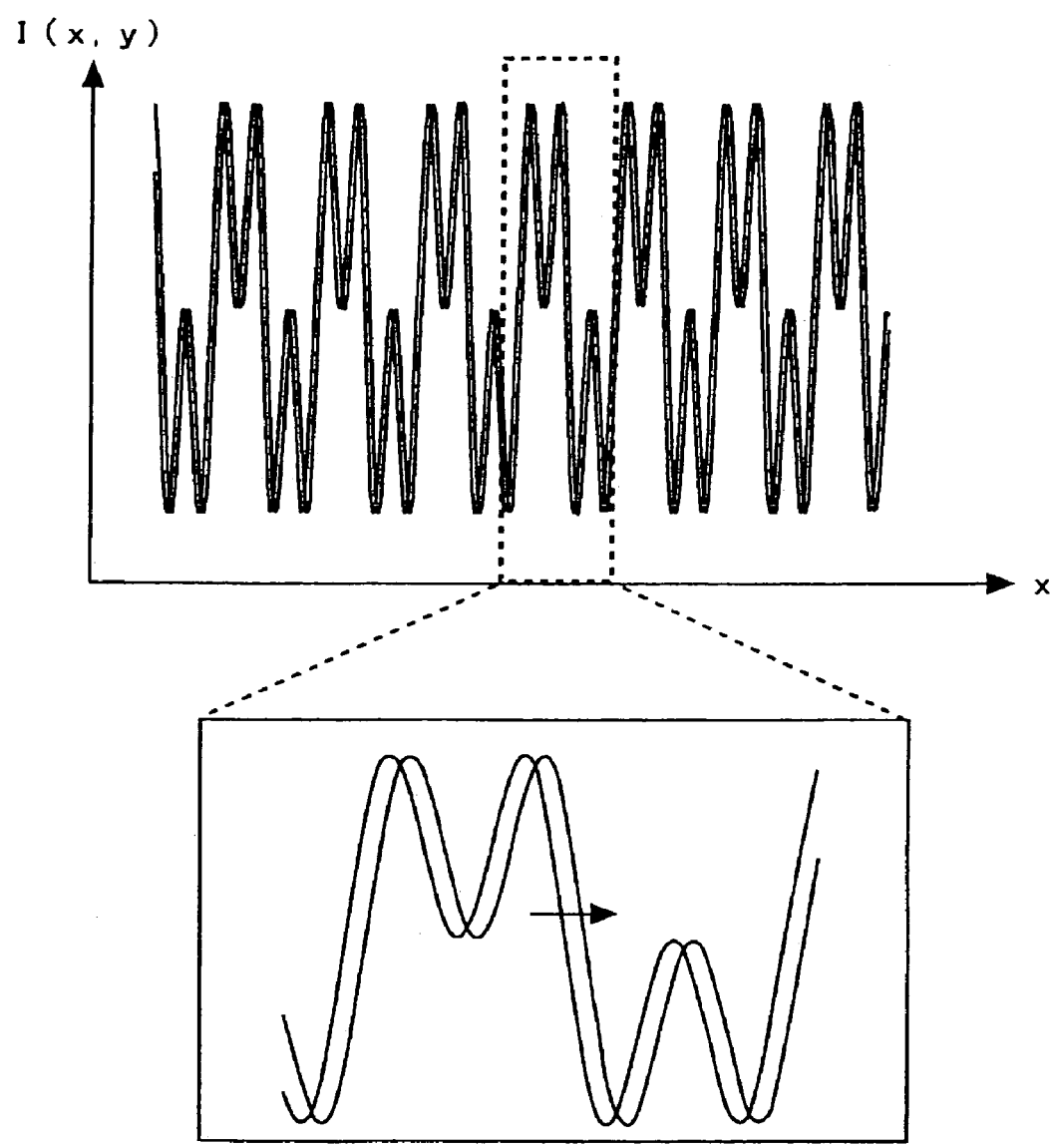
FIG. 22 shows a graph for explaining phase displacement due to a temperature change of the intensity distribution.
Figure 23:
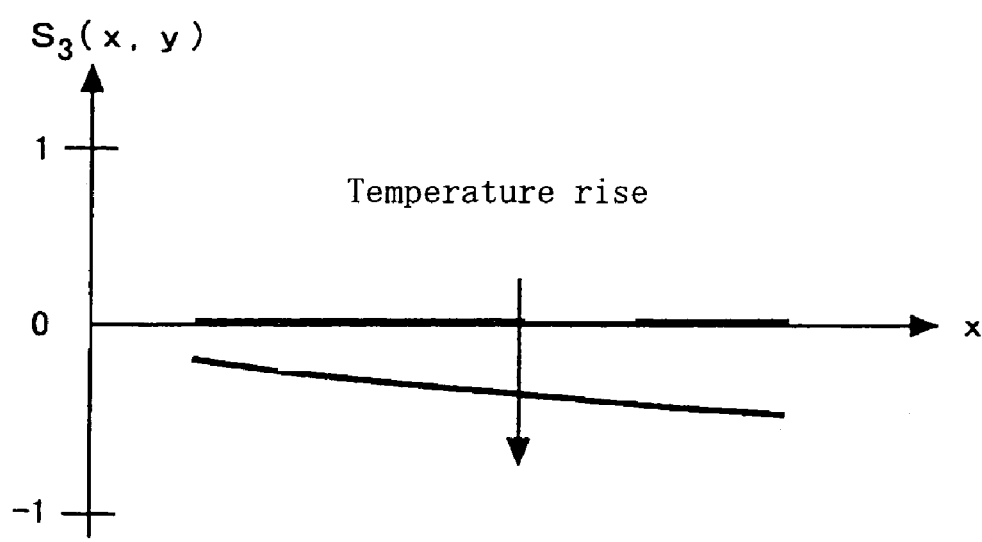
FIG. 23 shows a graph for explaining variations in Stokes parameters due to a temperature change.

The reference phase functions $\phi_1(x, y)$ and $\phi_2(x, y)$ are amounts (retardation) determined by the birefringent prism pairs $BPP_1$ and $BPP_2$ in the imaging polarimeter. This retardation has the property of changing sensitively with respect to a temperature. Hence the phase of the intensity distribution is displaced due to the temperature change (refer to FIG. 22). This results in occurrence of an error in a measured value due to a temperature rise (refer to FIG. 23). Moreover, a similar change occurs with respect to pressure change.

Figure 24:
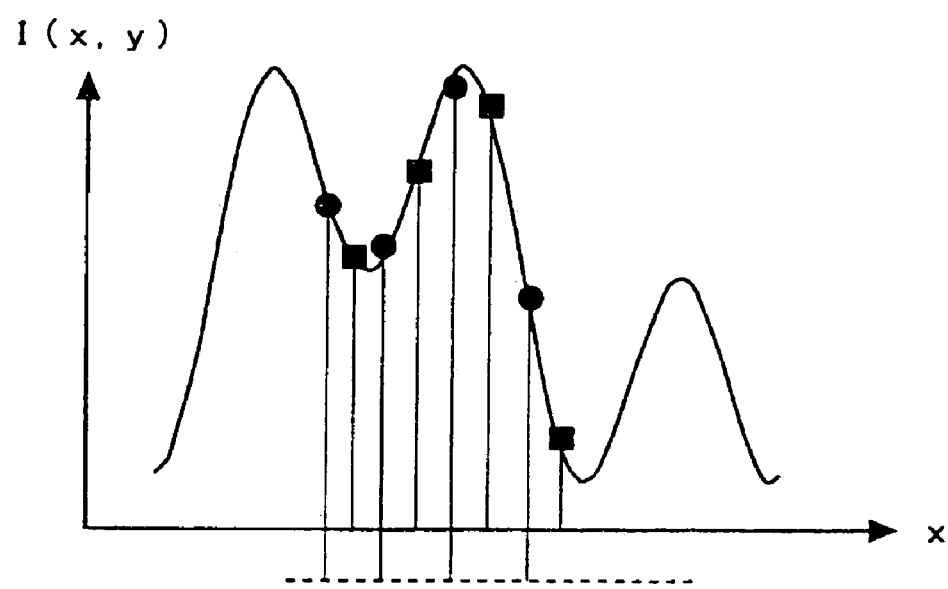
FIG. 24 shows a graph for explaining a phase displacement due to relative displacement between the birefringent prism pair and the imaging element.

2.1.2 Displacement of Relative Position between Birefringent Prism Pair and Imaging Element When a relative position between the birefringent prism pair and the imaging element is displaced, a problem that is "equivalent" to fluctuations in the reference phase function occurs. When the relative position between them is displaced in a system to which a relay lens and the like is inserted, a similar effect to an effect in lateral displacement of the intensity distribution is produced. This is an equivalent phase displacement (refer to FIG. 24). In particular, in a field of application in which it is necessary to provide the polarimeter on a mobile object such as remote sensing or a robot vision, the relative position between the birefringent prism pair and the imaging element is likely to be displaced because vibration is inevitable.

2.1.3 Solution Easily Found

For preventing variations in the reference phase function of each vibration component, stabilizing a cause of the fluctuations is considered. However, this is very hard to realize. For example, when noting the temperature change, the accuracy required for the two-dimensional spatial distribution of an ellipticity angle or an azimuth angle in inspecting an optical electronics is to be not more than about 0.1°, and for satisfying this, it is necessary to keep the temperature change within about 0.5° C. This requires large equipment for temperature stabilization, unfavorably leading to a loss of a variety of advantages (size reduction, non-inclusion of an active element, etc.) of the imaging polarimeter using the birefringent prism pair.

Chapter 3: Constitution of Embodiment of the Present Invention

The reference phase functions $\phi_1(x, y)$ and $\phi_2(x, y)$ (depending not upon light under measurement but only upon parameters of the polarimeter) included in the intensity distribution obtained from the imaging element vary by a variety of factors, which becomes a major contributor to an error. In consideration of this respect, in the present embodiment, the imaging polarimeter using the birefringent prism pair is provided with a function capable of calibrating the reference phase functions $\phi_1(x, y)$ and $\phi_2(x, y)$ of each vibration component during measurement (concurrently with measurement) (refer to FIGS. 9 to 11). In addition, although only x-section is shown in FIG. 11 for convenience, the same is true in the y-direction.

3.1 Method for Calibration "During Measurement" (No. 1)

The calibration method described in Section 1. 5 was a method for calibration "prior to measurement". As opposed to this, in the following section, a method for calibration "during measurement" is shown. This is an embodiment of the "principal part of the present invention".

3.1.1 Basic Idea

The amplitude and the phase obtained in Step 2 in Chapter 1 during measurement (when light in an unknown SOP is incident on the imaging polarimeter using the birefringent prism pair) is shown again below.

[Mathematical Expression 21]

component [1] (low frequency component) (3.1a)

"amplitude" $a_0(x, y) = \frac{1}{2}m_0(x, y)S_0(x, y)$

"phase" $\delta_0(x, y) = 0$ component [2] (central spatial frequency $U_{-x}, U_{-y}$) (3.1b)

"amplitude" $a_-(x, y) = \frac{1}{4}m_-(x, y)|S_{23}(x, y)|$

"phase" $\delta_-(x, y) = \phi_2(x, y) - \phi_1(x, y) + \arg\{S_{23}(x, y)\}$ component [3] (central spatial frequency $U_{2x}, U_{2y}$) (3.1c)

"amplitude" $a_2(x, y) = \frac{1}{2}m_2(x, y)S_1(x, y)$

"phase" $\delta_2(x, y) = \phi_2(x, y)$ component [4] (central spatial frequency $U_{+x}, U_{+y}$) (3.1d)

"amplitude" $a_+(x, y) = \frac{1}{4}m_+(x, y)|S_{23}(x, y)|$

"phase" $\delta_+(x, y) = \phi_2(x, y) + \phi_1(x, y) - \arg\{S_{23}(x, y)\} + \pi$ Here, all needed for obtaining the two-dimensional spatial distribution of the four Stokes parameters are found to be:

"amplitude" of component [1]→$S_0(x, y)$
"amplitude" and "phase" of one of component [2] and component [4]→$S_2(x, y)$ and $S_3(x, y)$
"amplitude" of component [3]→$S_1(x, y)$ It is found that the remaining ones as follows are not used for demodulation of the two-dimensional spatial distribution of the Stokes parameters.

"phase" of component [3]
"amplitude" and "phase" of the remaining one of components [2] and [4]

The present inventors and the like found it possible to obtain not only the two-dimensional spatial distribution of the four Stokes parameters but also the "reference phase functions ($\phi_1(x, y)$ and $\phi_2(x, y)$, etc.)" all at once through the use of the remaining component. This method means that calibration can be concurrently performed in the midst of measurement without particular input of known polarized light.

3.1.2 Preparation

In order to use the "calibration method during measurement", the following prior preparation is necessary.

The reference amplitude functions $m_0(x, y)$, $m_-(x, y)$, $m_2(x, y)$, and $m_+(x, y)$ are subjected to pre-calibration (refer to FIG. 8)

Since the following method is effective only on the reference phase function, any one of the methods described in Section 1. 5 is to be performed as for the reference amplitude function. It is to be noted that the fluctuations in the reference amplitude function during measurement typically have considerably small magnitude, and are ignorable in many cases. Namely, in contrast to the reference phase function, there is generally almost no need for re-calibration of the reference amplitude function during measurement.

As for the reference phase function, the pre-calibration is not necessarily required. However, a relation between $\phi_1(x, y)$ and $\phi_2(x, y)$ need to be obtained so that one of $\phi_1(x, y)$ and $\phi_2(x, y)$ can be obtained from the other.

A concrete example to provide the relation between $\phi_1(x, y)$ and $\phi_2(x, y)$ is shown hereinafter.

EXAMPLE 1

It is assumed that the birefringent prism pairs $BPP_1$ and $BPP_2$ are made of the same medium, and non-linear terms $\phi_1(x, y)$ and $\phi_2(x, y)$ are negligible.

At this time, a ratio among coefficients $U_{1x}$, $U_{1y}$, $U_{2x}$, and $U_{2y}$ to determine $\phi_1(x, y)$ and $\phi_2(x, y)$ can be determined by a ratio of inclination angles of the contact surface. Therefore, when $\phi_2(x, y)$ is found, the $U_{2x}$ and $U_{2y}$ can be determined and the $U_{1x}$ and $U_{1y}$ can be obtained from a proportional calculation.

EXAMPLE 2

Similar to the example 1, it is assumed that the birefringent prism pairs $BPP_1$ and $BPP_2$ are made of the same medium, and non-linear terms $\phi_1(x, y)$ and $\phi_2(x, y)$ are negligible.

In this case, when the reference phase function is calibrated in advance, the ratio among $U_{1x}$, $U_{1y}$, $U_{2x}$, and $U_{2y}$ can be determined.

Note here that, in case that $\phi_1(x, y)$ and $\phi_2(x, y)$ are not negligible, the following "local coefficient" of each pixel may be used instead of $U_{1x}$, $U_{1y}$, $U_{2x}$, and $U_{2y}$.

[Mathematical Expression 22]

$$\frac{1}{2\pi}\frac{\partial \phi_1}{\partial x}, \frac{1}{2\pi}\frac{\partial \phi_1}{\partial y}, \frac{1}{2\pi}\frac{\partial \phi_2}{\partial x}, \frac{1}{2\pi}\frac{\partial \phi_2}{\partial y}$$

In addition, in case that the above ratio differs from pixel to pixel, that is, in case that there is a variation in temperature in a measuring range, for example, the ratio of the "local coefficient" of each pixel may be used.

In case that the ratio among $U_{1x}$, $U_{1y}$, $U_{2x}$, and $U_{2y}$ differs during the measurement (in case that temperatures of the two birefringent prism pairs are different from each other, for example), the following method cannot be used.

3.1.3 Actual Calibration Method

Based upon the above-mentioned idea, a method for actual calibration is described below.

A. Method for Obtaining Reference Phase Function $\phi_2(x, v)$ from Vibration Component [3]

By noting only vibration component [3], the amplitude and the phase thereof are shown again as follows.

[Mathematical Expression 23]

$$\begin{cases} \text{"amplitude"} & a_2(x, y) = \frac{1}{2}m_2(x, y)S_1(x, y) \\ \text{"phase"} & \delta_2(x, y) = \phi_2(x, y) \end{cases} \quad (3.2)$$

What needs to be noted here is that the phase $\delta_2(x, y)$ of this component is one of the reference phase functions $\phi_2(x, y)$ (itself). Namely, when the phase $\delta_2(x, y)$ of component [3] is measured, one of the reference phase functions $\phi_2(x, y)$ is immediately determined according to the following expression.

$$\phi_2(x, y) = \delta_2(x, y) \quad (3.3)$$

This relational expression is constantly satisfied regardless of an SOP of the light under measurement, meaning that one of the reference phase functions can be immediately obtained from a measured value, even from any kind of light under measurement. This is a calibration method that can be performed utterly concurrently during measurement, and in the case of "using known polarized light", there is no need for performing calibration "prior to measurement or after discontinuation of measurement" as in (Section 1. 5). However, it should be noted that, at this time, the condition of observing component [3] at a sufficient SN ratio needs to be satisfied (refer to later-described C)

It is to be noted that, when the "complex representation" is obtained in place of the "set of the amplitude and phase" in Step 2 of the "process for demodulating two-dimensional spatial distribution of Stokes parameters in Section 1. 4, a calculation method, rewritten from the above and described below, may be applied.

From Expression (1.14b), $\delta_2(x, y)$ has the following relation with the complex representation $F_2(x, y)$ of component [3].

$$\delta_2(x, y) = \arg[F_2(x, y)] \quad (3.4)$$

Therefore, the reference phase function phase $\phi_2(x, y)$ can be obtained from the complex representation of component [3] according to the following expression.

$$\phi_2(x, y) = \arg[F_2(x, y)] \quad (3.5)$$

It should be noted that what is needed at the time of complex representation is not the reference phase function $\phi_2(x, y)$ but the reference complex function $K_2(x, y)$. Since there is a relation between these two functions as expressed by Expression (1.18c), once $\phi_2(x, y)$ is determined, $K_2(x, y)$ can also be determined (this will be later described in detail in F).

B. Method for Obtaining Reference Phase Function $\phi_2(x, y)$ from a Plurality of Vibration Components (Set of [2] and [4], etc.)

The phases of vibration components [2] and [4] are again shown as follows.

Phase of Component [2]:

$$\delta_-(x, y) = \phi_2(x, y) - \phi_1(x, y) + \arg\{S_{23}(x, y)\} \quad (3.6a)$$

Phase of Component [4]:

$$\delta_+(x, y) = \phi_2(x, y) + \phi_1(x, y) - \arg\{S_{23}(x, y)\} + \pi \quad (3.6b)$$

When the one phase is added to the other, $\phi_1(x, y)$ and $\arg\{S_{23}(x\ y)\}$ are canceled out, and only the terms depending upon $\phi_2(x, y)$ are left. It is found therefrom that the following expression can be satisfied.

[Mathematical Expression 24]

$$\phi_2(x, y) = \frac{1}{2}\{\delta_-(x, y) + \delta_+(x, y)\} - \frac{\pi}{2} \quad (3.7)$$

The right side of the above expression means that one $\phi_2(x, y)$ of the reference phase functions can be obtained by taking an average of the phases of vibration components [2] and [4]. Similarly to method A, this relational expression can also be satisfied regardless of an SOP of light under measurement, meaning that one of the reference phase functions can be immediately obtained from a measured value, even from an intensity distribution by any kind of light under measurement.

Namely, similar to method A, this is a "calibration method that can be performed utterly concurrently during measurement", and in the case of "using known polarized light", there is no need for performing calibration "prior to measurement or after discontinuation of measurement" as in (Section 1. 5). However, it should be noted that the condition of observing components [2] and [4] at a sufficient SN ratio needs to be satisfied (refer to later-described C).

Here, similar to the case of method A, a calculation method is described for a case where the "complex representation" is obtained in place of the "set of the amplitude and phase" in Step 2 of Section 1. 4.

From Expression (1.14b), $\delta_-(x, y)$ and $\delta_+(x, y)$ have the following relation with the complex representations $F_-(x, y)$ and $F_+(x, y)$ of components [2] and [4].

$$\delta_-(x, y) = \arg[F_-(x, y)] \quad (3.8a)$$

$$\delta_+(x, y) = \arg[F_+(x, y)] \quad (3.8b)$$

Therefore, the reference phase function $\phi_2(x, y)$ can be obtained from the complex representations of the two components as follows.

[Mathematical Expression 25]

$$\phi_2(x, y) = \frac{1}{2}\{\arg[F_-(x, y)] + \arg[F_+(x, y)]\} - \frac{\pi}{2} \quad (3.9)$$

Or, the following expression obtained by rewriting the above expression using a simple formula of the complex function may be applied.

[Mathematical Expression 26]

$$\phi_2(x, y) = \frac{1}{2}\arg[-F_-(x, y)F_+(x, y)] \quad (3.10)$$

In the optical system (the imaging polarimeter using the birefringent prism pairs) in FIG. 1, an obtained intensity distribution contains another component having a different period as described in FIG. 4 and the like except for the case where the angle formed between the birefringent prism pair $BPP_2$ and the analyzer A is not 45°.

As seen from Expression (1.9), the phase of this component is "$\delta_1(x, y) = \phi_1(x, y) - \arg\{S_{23}(x, y)\}$", and similar to the phase terms of above vibration components [2] and [4]. Hence, even when component [2] or [4] is combined (or replaced) with the another component, it is possible to calibrate $\phi_2(x, y)$.

C. Combination of A and B

The two methods (method A and method B) described above are methods in which one $\phi_2(x, y)$ of the reference phase functions can be calibrated utterly concurrently during measurement. However, the used vibration components are different between the two methods. What should be concerned here is that the amplitude of vibration component [3] used in method A is proportional to $S_1(x, y)$, while the amplitudes of vibration components [2] and [4] used in Method B are proportional to the following.

[Mathematical Expression 27]

$$|S_{23}(x, y)| = \sqrt{S_2^2(x,y) + S_3^2(x,y)}$$

Since an SOP of light under measurement is unknown, there is no guarantee that the two-dimensional spatial distribution of Stokes parameters is constantly sufficiently large for phase measurement for each component. For example, when light with small $S_1(x, y)$ is projected as the light under measurement, determination of $\phi_2(x, y)$ by Method A using the phase of this component might result in occurrence of a large error. For solving this problem, adaptive combination of methods A and B is desired. Specifically, a value of one $\phi_2(x, y)$ with more certainty can be obtained by selecting, or weighting up and balancing results of the two methods.

It should be noted that the light under measurement whose $S_1(x, y)$ and $S_{23}(x, y)$ are "both" very small is practically non-existent. This is because, when both are small, an intensity of a complete polarized light:

[Mathematical Expression 28]

$$\sqrt{S_1^2(x,y) + S_2^2(x,y) + S_3^2(x,y)}$$

is small, namely light is in a state infinitely close to non-polarized light. In such a case, there is no point of obtaining an SOP itself. Accordingly, the combination of the above methods A and B enables calibration of $\phi_2(x, y)$ of light under measurement in any SOP concurrently with measurement.

D. Combination of A and B (No. 2)

One idea for efficiently combining A and B is shown below. This is a method in which direct calculation is possible without particular separation by case. It should be noted that, in this part (method D), three complex representation functions $F_-(x, y)$, $F_2(x, y)$ and $F_+(x, y)$ of vibration components [2] to [4] are used for calculation. When a vibration calculation is to be made from the "set of the amplitude and phase" of each vibration component, the set may once be changed to the "complex representation" according to Expression (1.13), and then the following calculation process may be performed.

As a preparation for explaining this method, first, the following two expressions are derived and the natures thereof are described. By transforming Expression (3.5), the following expression can be obtained.

$$2\phi_2(x, y)=arg[F_2{}^2(x, y)] \tag{3.11}$$

Meanwhile, by doubling both sides of Expression (3.10), the following expression can be obtained.

$$2\phi_2(x, y)=arg[-F_-(x, y)F_+(x, y)] \tag{3.12}$$

It is found from the comparison between the above two expressions that the complex function in the brackets on the right side of each of the expressions has the same argument $2\phi_2(x, y)$. Further, when the absolute value of the complex function in the brackets is calculated in each of the expressions, the results are found to be as follows:

[Mathematical Expression 29]

$$|F_2^2(x, y)| = \frac{1}{16}m_2^2(x, y)S_1^2(x, y) \tag{3.13a}$$

$$|-F_-(x, y)F_+(x, y)| = \frac{1}{64}m_-(x, y)m_+(x, y)\{S_2^2(x, y)+S_3^2(x, y)\} \tag{3.13b}$$

This expression means that the absolute value of the former (obtained from component [3]) is proportional to $S_1{}^2(x, y)$, while the absolute value of the latter (obtained from components [2] and [4]) is proportional to $S_2{}^2(x, y)+S_3{}^2(x, y)$. As described above, these two complex functions do not concurrently become smaller. Thereby, appropriate "weighting functions $\alpha(x, y)$ and $\beta(x, y)$ having the same argument" were respectively multiplied by the above two complex functions, and then the obtained two terms were added together.

[Mathematical Expression 30]

$$\alpha(x, y)[F_2{}^2(x, y)]+\beta(x, y)[-F_-(x, y)F_+(x, y)] \tag{3.14}$$

It is revealed that the absolute value of the sum of the two terms (practically) do not become smaller. When either one of $S_1{}^2(x, y)$ and $S_2{}^2(x, y)+S_3{}^2(x, y)$ becomes smaller, one of the above two terms accordingly becomes smaller, but the other remains for certain. Even when the SOP of the light under measurement changes as a result, the absolute value of this expression does not become extremely smaller. Further, the argument of this expression is constantly equivalent to $2\phi_2(x, y)+arg\alpha(x, y)$. Through the use of these natures, it is possible to obtain $\phi_2(x, y)$ according to the following expression without a decrease in S/N ratio.

[Mathematical Expression 31]

$$\phi_2(x, y) = \frac{1}{2}arg\left\{\begin{matrix}\alpha(x, y)[F_2^2(x, y)]+\\ \beta(x, y)[-F_-(x, y)F_+(x, y)]\end{matrix}\right\} - \frac{1}{2}arg[\alpha(x, y)] \tag{3.15}$$

Two ways to select specific $\alpha(x, y)$ and $\beta(x, y)$ are shown below.

$$\alpha(x, y)=\beta(x, y)=1 \quad [D-1]$$

The simplest way to select the weighting functions is making the two functions the same constant (1). In this case, an expression for obtaining the reference phase function $\phi_2(x, y)$ is shown below.

[Mathematical Expression 32]

$$\phi_2(x, y) = \frac{1}{2}arg\{[F_2^2(x, y)]+[-F_-(x, y)F_+(x, y)]\} \tag{3.16}$$

[Mathematical Expression 33]

$$[D-2]\ \alpha(x, y) = \frac{16}{m_2^2(x, y)} \cdot \beta(x, y) = \frac{64}{m_-(x, y)m_+(x, y)}$$

Another Example is a method for selecting $\alpha(x, y)$ and $\beta(x, y)$ using reference amplitude functions having been subjected to pre-calibration, as shown in the above expression. Here, an expression for deriving the reference phase function $\phi_2(x, y)$ from the complex representation of the demodulated vibration component is shown as below.

[Mathematical Expression 34]

$$\phi_2(x, y) = \frac{1}{2}arg\left\{\left[16\frac{F_2^2(x, y)}{m_2^2(x, y)}\right]+\left[-64\frac{F_-(x, y)F_+(x, y)}{m_-(x, y)m_+(x, y)}\right]\right\} \tag{3.17}$$

With the expression made in this form,

[Mathematical Expression 35]

$\{\}$ The absolute value in $\{\}$ is: $\hspace{3em} (3.18)$ $$\left|\left[16\frac{F_2^2(x, y)}{m_2^2(x, y)}\right]+\left[-64\frac{F_-(x, y)F_+(x, y)}{m_-(x, y)m_+(x, y)}\right]\right| =$$

$$\sqrt{S_1^2(x, y)+S_2^2(x, y)+S_3^3(x, y)}\ S_1^2(x, y)+S_2^2(x, y)+S_3^3(x, y)$$

This absolute value is a square of the following intensity of complete polarized light component of the light under measurement.

In particular, this constantly agrees with the square $S_0{}^2(x, y)$ of intensity of the light under measurement (regardless of the SOP). Namely, $\Omega_2(x, y)$ can be constantly stably obtained using Expression (3.17) so long as the light under measurement has sufficient light intensity.

E. Calculation of $\phi_1(x, y)$

Since fluctuations in $\phi_1(x, y)$ are considered to be similar to those in $\phi_2(x, y)$, it is possible to obtain $\phi_1(x, y)$ by proportional calculation (e.g. by using a relation between the $\phi_2(x, y)$ and $\phi_1(x, y)$) from a measured value of $\phi_2(x, y)$.

F. Calculation of Reference Complex Function

In the demodulation in Step 2 of the "process for demodulating two-dimensional spatial distribution of Stokes parameters" in Section 1. 4, when (not the "set of the amplitude and phase" but) the "complex representation" is obtained, what are needed ultimately in the operation of Step 3 for obtaining the two-dimensional spatial distribution of the Stokes parameters are not the reference phase functions $\phi_1(x, y)$ and $\phi_2(x, y)$ but the reference complex functions $K_0(x, y)$, $K_-(x, y)$, $K_2(x, y)$, and $K_+(x, y)$. However, these can also be immediately obtained through the use of the relations of Expressions (1.18a) to (1.18d) if the reference phase functions $\phi_1(x, y)$ and $\phi_2(x, y)$ have been obtained by the processes up to above Process E.

The imaging polarimetry described in this section can be summarized as follows. In any case, it is assumed that data showing a relation between $\phi_1(x, y)$ and $\phi_2(x, y)$ has been made available.

The imaging polarimetry of this section is a method in which, by the use of an intensity distribution obtained by launching the light under measurement into the optical system (polarimetric imaging device) of the imaging polarimeter using the birefringent prism pair, components [1] and [3] of the intensity distribution are obtained, and at least one of components [2], [4] and [5] is obtained, and by the use of the data showing the relation between $\phi_1(x, y)$ and $\phi_2(x, y)$ and each of the obtained intensity distribution components, $\phi_1(x, y)$ and $\phi_2(x, y)$ are obtained, and also a parameter indicating the two-dimensional spatial distribution of the SOP is obtained.

More specifically, the imaging polarimetry of method A of this section is a method to be performed as follows. By the use of the intensity distribution obtained by launching the light under measurement into the polarimetric imaging device, components [1] and [3] of the intensity distribution are obtained, and at least one of components [2], [4] and [5] is obtained. $\phi_2(x, y)$ is obtained from obtained component [3], and $\phi_1(x, y)$ is obtained from the data showing the relation between $\phi_1(x, y)$ and $\phi_2(x, y)$ and obtained $\phi_2(x, y)$. By the use of each obtained intensity distribution component, and obtained $\phi_1(x, y)$ and $\phi_2(x, y)$, a parameter indicating the two-dimensional spatial distribution of the SOP is obtained method A is a preferred embodiment when the two-dimensional spatial distribution $S_1(x, y)$ of the Stokes parameter of the light under measurement is not zero or not close to zero.

The imaging polarimetry of method B of this section is a method to be performed as follows. By the use of the intensity distribution obtained by launching the light under measurement into the polarimetric imaging device, components [1] and [3] of the intensity distribution are obtained, and at least two of components [2], [4] and [5] are obtained. $\phi_2(x, y)$ is obtained from at least two of components [2], [4] and [5], and $\phi_1(x, y)$ is obtained from the data showing the relation between $\phi_1(x, y)$ and $\phi_2(x, y)$ and obtained $\phi_2(x, y)$. By the use of each obtained intensity distribution component, and obtained $\phi_1(x, y)$ and $\phi_2(x, y)$, a parameter indicating the two-dimensional spatial distribution of the SOP is obtained. The method B is a preferred embodiment in a case other than the case where the both two-dimensional spatial distributions $S_2(x, y)$ and $S_3(x, y)$ of the Stokes parameters of the light under measurement are neither zero nor close to zero.

The imaging polarimetry of methods C and D of this section are methods to be performed as follows. By the use of the intensity distribution obtained by launching the light under measurement into the polarimetric imaging device, components [1] and [3] of the intensity distribution are obtained, and at least two of components [2], [4] and [5] are obtained. $\phi_2(x, y)$ is obtained by selecting either a first process for obtaining $\phi_2(x, y)$ from the obtained component [3] or a second process for obtaining $\phi_2(x, y)$ from at least two of components [2], [4] and [5], or by combining the first process and the second process, and $\phi_1(x, y)$ is obtained from the data showing the relation between $\phi_1(x, y)$ and $\phi_2(x, y)$ and the obtained $\phi_2(x, y)$. By the use of each obtained intensity distribution component, and the obtained $\phi_1(x, y)$ and $\phi_2(x, y)$, a parameter indicating two-dimensional spatial distribution of the SOP is obtained. The methods C and D are embodiments capable of measurement by appropriate selection of either the first or second process or by appropriate combination of the first and second processes, so long as all of the two-dimensional spatial distribution $S_1(x, y)$, $S_2(x, y)$ and $S_3(x, y)$ of Stokes parameters of the light under measurement are not concurrently zero or close to zero.

In the imaging polarimetry of this section, since component [5] of the intensity distribution does not appear when the analyzer A is arranged such that the direction of the transmission axis thereof forms an angle of 45° with respect to the direction of the principal axis of the second birefringent prism pair $BPP_2$, at least either or both of components [2] and [4] may be obtained in a part where at least one or two of components [2], [4] and [5] are to be obtained.

3.2 Method for Calibrating Reference Phase Function "During Measurement" (No. 2)

3.2.1 Basic Idea

In the same idea as described in the previous section 3. 1, "only a difference" of the reference phase functions can be obtained. Although the terms "pre-calibration" and "initial value" are used below for the sake of convenience, the timing for calibration is not necessarily prior to measurement of the light under measurement. Therefore, the initial value of the reference phase function is typically grasped as a reference value for calibration of the reference phase function. Further, an appropriate value which is not a measured value is usable as the reference value for calibration of the reference phase function.

In the previous method (in the previous section 3. 1), the "reference amplitude function" was obtained in the pre-calibration, and it was not particularly necessary to obtain the "reference phase function". However, as appeared from Section 3. 2, those two functions can be calibrated almost concurrently. It is thus possible to obtain in advance an "initial value of the reference phase function in pre-calibration" so as to only track a difference thereof during measurement.

Advantages in this case are as follows.

Slightly additional phase displacement part which might be generated due to properties of the imaging element or the signal processing system can be removed.

Burdensome phase unwrapping is not necessary.

Since a phase difference itself is small, a dynamic range in calculation can be made small. Further, as a result of this, a calculation error can be relatively made small in many cases.

Accordingly, "obtaining only the difference in the reference phase function" has its own meaning.

The following is described as supplement for the foregoing explanation. As shown in FIG. 11, the two methods have different factors of an error in calculation of $\phi_1$ from $\phi_2$. Namely, as shown in FIG. 11(a), it is necessary to perform phase unwrapping for obtaining $\phi_1(x, y)$ from $\phi_2(x, y)$. This phase unwrapping is a major factor of the error. Especially when period frequency is high as compared with sampling, noise is included in the period, or the like, wrong phase unwrapping might be performed. With wrong phase wrapping performed, an error becomes an integer multiple of $2\pi$, leading to calculation of a wrong phase. Further, this error affects a broad region. The error is essentially caused by that a solution of an arg operator (or an arctan operator) for obtaining an argument has phase ambiguity by the integer multiple of $2\pi$. As opposed to this, as shown in FIG. 11(b), it is not necessary in obtaining $\Delta\phi_1(x, y)$ from $\Delta\phi_2(x, y)$ to perform phase unwrapping since the difference $\Delta\phi_2(x, y)$ from the initial value of the reference phase function is small. This allows the measurement error to be relatively small.

3.2.2 Preparation

The use of the "calibration method during measurement" is based upon the premise of pre-calibration of both the "reference amplitude function" and the "reference phase function" prior to measurement. It is to be noted that, as for the phase, an obtained value of the phase is not necessarily required to have high accuracy since a variance difference, i.e. an error, can be corrected later.

In addition, it is necessary to find the relation between the "difference of the reference phase function" $\Delta\phi_1(x, y)$ and $\Delta\phi_2(x, y)$ in advance. In this case, the following examples are provided.

EXAMPLE 1

The relation between the $\phi_1(x, y)$ and $\phi_2(x, y)$ is used as it is.

EXAMPLE 2

The relation between the $\Delta\phi_1(x, y)$ and $\Delta\phi_2(x, y)$ is found by applying fluctuation (temperature change, for example) actually.

3.2.3 Actual Calibration Method

The basic idea on the calibration method is completely the same as in Section 3.1. There thus exist calculation methods corresponding to all A to E described in Section 3.1.3. Hence, in this section, the idea is described only when different from that of the previous section, and the following description concentrates on listing of mathematical expressions.

First, a couple of symbols are defined. The reference phase functions obtained by the pre-calibration are defined as $\phi_1^{(i)}(x, y)$ and $\phi_2^{(i)}(x, y)$. Reference complex functions corresponding to these reference phase functions are expressed as follows according to Expressions (1.18a) to (1.18d).

[Mathematical Expression 36]

$$K_0^{(i)}(x, y) = \frac{1}{2}m_0(x, y) \quad (3.19a)$$

-continued $$K_-^{(i)}(x, y) = \frac{1}{8}m_-(x, y)\exp i[\phi_2^{(i)}(x, y) - \phi_1^{(i)}(x, y)] \quad (3.19b)$$

$$K_2^{(i)}(x, y) = \frac{1}{4}m_2(x, y)\exp i\phi_2^{(i)}(x, y) \quad (3.19c)$$

$$K_+^{(i)}(x, y) = -\frac{1}{8}m_+(x, y)\exp i[\phi_2^{(i)}(x, y) + \phi_1^{(i)}(x, y)] \quad (3.19d)$$

Assuming that the reference phase functions changed during measurement as follows.

$$\phi_1(x, y) = \phi_1^{(i)}(x, y) + \Delta\phi_1(x, y) \quad (3.20a)$$

$$\phi_2(x, y) = \phi_2^{(i)}(x, y) + \Delta\phi_2(x, y) \quad (3.20b)$$

Below described are methods for obtaining the differences $\Delta\phi_1(x, y)$ and $\Delta\phi_2(x, y)$ of the reference phase functions or changes in the reference complex functions corresponding to those differences.

A. Method for Obtaining Reference Phase Function $\phi_2(x, y)$ from Vibration Component [3]

As described in method A in the previous section, the phase of component [3] is expressed as follows.

$$\delta_2(x, y) = \phi_2(x, y) = \phi_2^{(i)}(x, y) + \delta\phi_2(x, y) \quad (3.21)$$

Here, the difference in $\phi_2(x, y)$ can be obtained as:

$$\Delta\phi_2(x, y) = \delta_2(x, y) - \phi_2^{(i)}(x, y) \quad (3.22)$$

Namely, this means that, once the phase $\delta_2$ of component [3] is measured, one $\delta\phi_2(x, y)$) of the differences in the reference phase functions can be immediately determined.

It is to be noted that in Step 2, when not the "set of amplitude and phase" but the "complex representation" is obtained, it is obtained according to the following expressions.

[Mathematical Expression 37]

$$\delta_2(x, y) = \arg[F_2(x, y)] \quad (3.23a)$$

$$\phi_2^{(i)}(x, y) = \arg[K_2^{(i)}(x, y)] \quad (3.23b)$$

From $$\Delta\phi_2(x, y) = \arg[F_2(x, y)] - \arg[K_2^{(i)}(x, y)] \quad (3.24)$$

Or $$\Delta\phi_2(x, y) = \arg\left[\frac{F_2(x, y)}{K_2^{(i)}(x, y)}\right] \quad (3.25)$$

B. Method for Obtaining Reference Phase Function $\phi_2(x, y)$ from a Plurality of Vibration Components (set of [2] and [4], etc.)

In the method for obtaining the difference in $\phi_2(x, y)$ from the phase of each of vibration component [2] and [4], the difference is obtained according to the following expression.

[Mathematical Expression 38]

$$\Delta\phi_2(x, y) = \left[\frac{1}{2}\{\delta_-(x, y) + \delta_+(x, y)\} - \frac{\pi}{2}\right] - \phi_2^{(i)}(x, y) \quad (3.26)$$

When not the "set of amplitude and phase" but the "complex representation" is to be obtained, the difference is obtained according to the following expressions.

[Mathematical Expression 39]

$$\Delta\phi_2(x, y) = \qquad (3.27)$$
$$\frac{1}{2}\{\arg[F_-(x, y)] + \arg[F_+(x, y)] - \arg[K_-^{(i)}(x, y)] - \arg[K_+^{(i)}(x, y)]\}$$

Or, the following expressions obtained by rewriting the above expression using a simple formula of the complex function may be applied.

[Mathematical Expression 40]

$$\Delta\phi_2(x, y) = \frac{1}{2}\left\{\arg\left[\frac{F_-(x, y)}{K_-^{(i)}(x, y)}\right] + \arg\left[\frac{F_+(x, y)}{K_+^{(i)}(x, y)}\right]\right\} \qquad (3.28)$$

Or $$\Delta\phi_2(x, y) = \frac{1}{2}\arg\left[\frac{F_-(x, y)}{K_-^{(i)}(x, y)}\frac{F_+(x, y)}{K_+^{(i)}(x, y)}\right] \qquad (3.29)$$

In addition, as noted at the end of Section 3.1.3, the same idea as above shown can be applied to the case of using another term.

C. Combination of A and B

As in the case described in the previous section, adaptive combination of methods A and B is also effective in the case of obtaining only the "difference" in the reference phase functions. It should be noted that a description of the combination is completely the same as that in the previous section and it is thus omitted.

D. Combination of A and B (No. 2)

One of desired mathematical expressions in the case of obtaining only the difference is as follows.

[Mathematical Expression 41]

$$\alpha(x, y) = \left[\frac{1}{K_2^{(i)}(x, y)}\right]^2 \qquad (3.30a)$$

$$\beta(x, y) = -\frac{1}{K_-^{(i)}(x, y)K_+^{(i)}(x, y)} \qquad (3.30b)$$

Since $\arg[\alpha(x, y)]=\arg[\beta(x, y)]=2\phi_2(x, y)$ in the above expressions, the difference can be obtained as follows.

[Mathematical Expression 42]

$$\Delta\phi_2(x, y) = \frac{1}{2}\arg\left\{\left[\frac{F_2(x, y)}{K_2^{(i)}(x, y)}\right]^2 + \frac{F_-(x, y)}{K_-^{(i)}(x, y)}\frac{F_+(x, y)}{K_+^{(i)}(x, y)}\right\} \qquad (3.31)$$

This absolute value is a square of the following intensity of complete polarized light component of light under measurement:

$$\sqrt{S_1^2(x,y)+S_2^2(x,y)+S_3^2(x,y)}$$

In particular, this is constantly the square $S_0^2(x, y)$ of intensity of the light under measurement (regardless of the SOP) in the case of complete polarized light. Namely, $\Delta\phi_2(x, y)$ can be constantly stably obtained using the above expression so long as the light under measurement has sufficient light intensity.

E. Calculation of $\Delta\phi_1(x, y)$

Fluctuations in $\Delta\phi_1(x, y)$ are considered to be similar to those in $\Delta\phi_2(x, y)$. They can be obtained from the measured value of the $\Delta\phi_2(x, y)$ using a proportional calculation (the relation between $\Delta\phi_2(x, y)$ and $\Delta\phi_1(x, y)$).

F. Calculation of Reference Complex Function

In the demodulation of each vibration component in Step 2, when not the "set of the amplitude and phase" but the "complex representation" is obtained, what are needed ultimately in obtaining the two-dimensional spatial distribution of the Stokes parameters (operation of Step 3) are not the reference phase functions $\phi_1(x, y)$ and $\phi_2(x, y)$ but the reference complex functions $K_0(x, y)$, $K_-(x, y)$, $K_2(x, y)$, and $K_+(x, y)$.

If the reference phase function differences $\Delta\phi_1(x, y)$ and $\Delta\phi_2(x, y)$ have been obtained by the processes up to above Process E, the reference complex functions can be immediately obtained as follows.

[Mathematical Expression 43]

$$K_0(x, y)=K_0^{(i)}(x, y) \qquad (3.32a)$$

$$K_-(x, y)=K_-^{(i)}(x, y)e^{i\{\Delta\phi_{is}\,2(x,y)-\Delta\phi_1(x,y)\}} \qquad (3.32b)$$

$$K_2(x, y)=K_2^{(i)}(x, y)e^{i\Delta\phi_2(x,y)} \qquad (3.32c)$$

$$K_+(x, y)=K_+^{(i)}(x, y)e^{i\{\Delta\phi_2(x,y)+\Delta\phi_1(x,y)\}} \qquad (3.32d)$$

The imaging polarimetry described in this section can be summarized as follows. In any case, it is assumed that a reference value for calibration of the first reference phase function $\phi_1^{(i)}(x, y)$, a reference value for calibration of the second reference phase function $\phi_2^{(i)}(x, y)$, and data showing the relation between $\Delta\phi_1(x, y)$ and $\Delta\phi_2(x, y)$ are made available.

The imaging polarimetry of this section is a method to be performed as follows. By the use of the intensity distribution obtained by launching the light under measurement into the polarimetric imaging device, components [1] and [3] of the intensity distribution are obtained, and at least one of components [2], [4] and [5] is obtained, and by the use of $\phi_1^{(i)}(x, y)$, $\phi_2^{(i)}(x, y)$, the data showing the relation between $\Delta\phi_1(x, y)$ and $\Delta\phi_2(x, y)$, and each of the obtained intensity distribution components, $\Delta\phi_1(x, y)$ and $\Delta\phi_2(x, y)$ are obtained, and also a parameter indicating two-dimensional spatial distribution of the SOP is obtained.

More specifically, the imaging polarimetry of method A of this section is a method to be performed as follows. By the use of the intensity distribution obtained by launching the light under measurement into the polarimetric imaging device, components [1] and [3] of the intensity distribution are obtained, and at least one of components [2], [4] and [5] is obtained. $\Delta\phi_2(x, y)$ is obtained from the obtained component [3] and $\Delta\phi_1(x, y)$ is obtained from the obtained $\Delta\phi_2(x, y)$. By the use of each of the obtained intensity distribution components and $\Delta\phi_1(x, y)$ and $\Delta\phi_2(x, y)$, a parameter indicating two-dimensional spatial distribution of the SOP is obtained.

The imaging polarimetry of method B of this section is a method to be performed as follows. By the use of the intensity distribution obtained by launching the light under measurement into the polarimetric imaging device, components [1] and [3] of the intensity distribution are obtained, and at least two of components [2], [4] and [5] are obtained. $\Delta\phi_2(x, y)$ is obtained from at least two of components [2], [4] and [5], and $\Delta\phi_1(x, y)$ is obtained from the obtained $\Delta\phi_2(x, y)$. By the use of each obtained spectral intensity component, and the obtained $\Delta\phi_1(x, y)$ and $\Delta\phi_2(x, y)$, a parameter indicating two-dimensional spatial distribution of the SOP is obtained.

The imaging polarimetry of methods C and D of this section are methods to be performed as follows. By the use of the intensity distribution obtained by launching the light under measurement into the polarimetric imaging device, components [1] and [3] of the intensity distribution are obtained, and at least two of components [2], [4] and [5] are obtained. $\Delta\phi_2(x, y)$ is obtained by selecting either a first process for obtaining $\Delta\phi_2(x, y)$ from obtained component [3] or a second process for obtaining $\Delta\phi_2(x, y)$ from at least two of components [2], [4] and [5], or by combining the first process and the second process, and $\Delta\phi_1(x, y)$ is obtained from the obtained $\Delta\phi_2(x, y)$. By the use of each obtained intensity distribution component, and obtained $\Delta\phi_1(x, y)$ and $\Delta\phi_2(x, y)$, a parameter indicating two-dimensional spatial distribution of the SOP is obtained.

In the imaging polarimetry of this section, since component [5] of the intensity distribution does not appear when the analyzer A is arranged such that the direction of the transmission axis thereof forms an angle of 45° with respect to the direction of the principal axis of the second birefringent prism pair $BPP_2$, at least either or both of components [2] and [4] may be obtained in a part where at least one or two of components [2], [4] and [5] are to be obtained.

Chapter 4: Common Demonstration of Possibility for Calibration During Measurement As described in the previous chapter, it is possible in the imaging polarimetry using the birefringent prism pair to calibrate (or correct) a reference phase function or a reference phase function difference "during measurement (concurrently with measurement)". However, the description given in the previous chapter was based upon the premise of applying a signal processing method using frequency filtering, namely, separating a quasi-sinusoidal component that vibrates at a frequency different from an intensity distribution obtained from the imaging element. However, this frequency filtering is in practice not an essential step for realization of "calibration during measurement". The inventors and the like found it possible to perform calibration of the reference phase function during measurement even by a different demodulation method, namely, a different signal processing method.

In order to demonstrate this, first in this chapter, the reason why calibration is possible during measurement in the imaging polarimetry using the birefringent prism pair is described without limiting to the "specific process of the signal processing method". Further, in the next chapter, a "method for applying a generalized inverse matrix" is shown as a specific example of a "calibration method during measurement without the use of frequency filtering".

Figure 25:
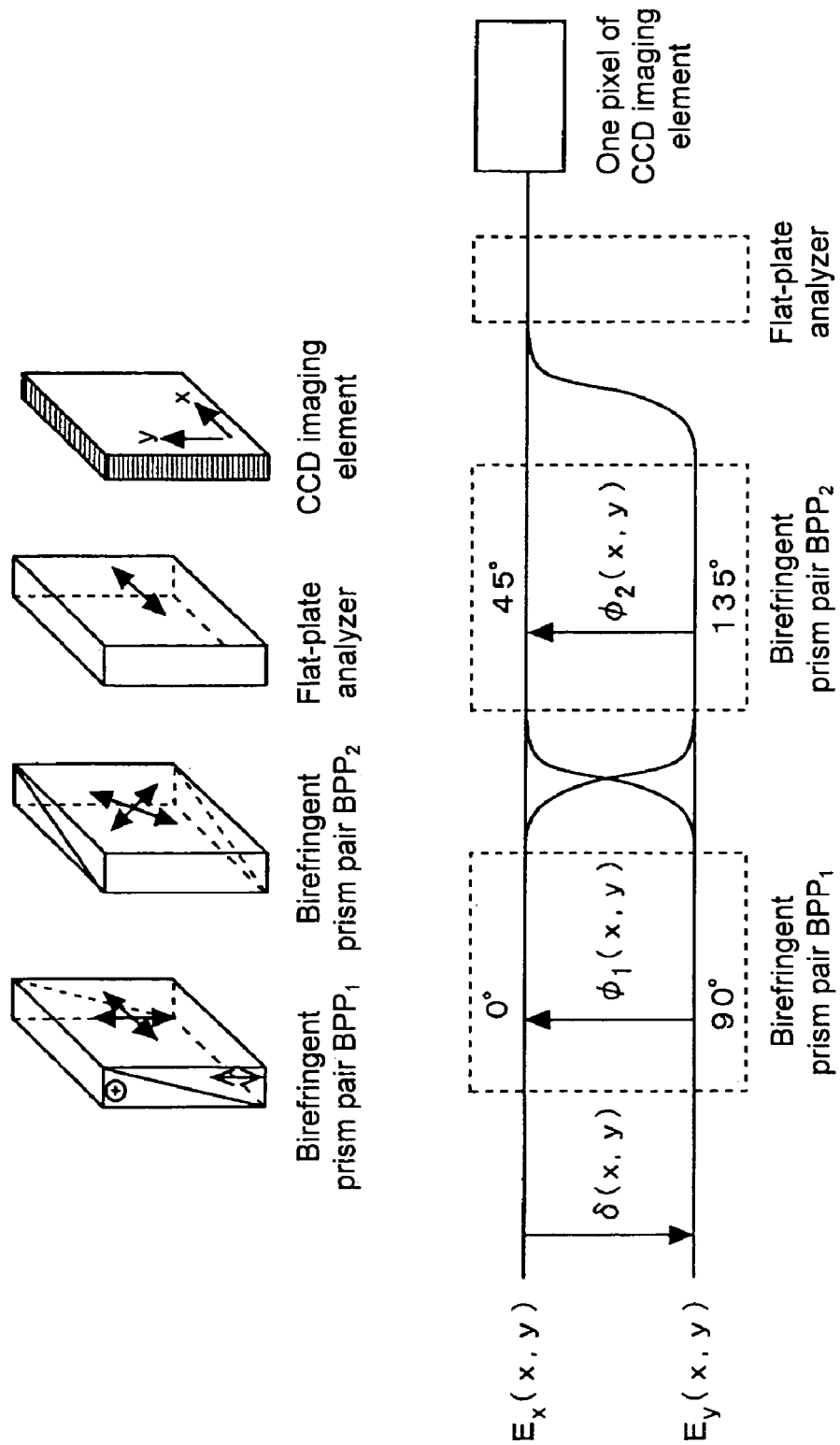
FIG. 25 shows a view for explaining a relation between the intensity distribution and a reference phase function.

4.1 Relation between Intensity Distribution Obtained from Imaging Element and Reference Phase Functions $\Delta\phi_1(x, y)$, $\Delta\phi_2(x, y)$ First of all, the relation between the intensity distribution obtained from the imaging element and the reference phase function is described using an idea of interference. In the lower part of FIG. 25, two upper and lower lines traveling in parallel are channels of the two linearly polarized light components which are orthogonal to each other. However, the respective directions of the linearly polarized lights in the birefringent prism pairs $BPP_1$ and $BPP_2$ are assumed to be arranged along the principal axes of the respective elements. Light entered from the left into the birefringent prism pair $BPP_1$ is separated into x and y polarized light components ($E_x(x, y)$ and $E_y(x, y)$), and the separated components propagate respectively along two principal axes of the $BPP_1$ in the directions 0° and 90°. The directions of the principal axes of the two linearly polarized light components emitted from the $BPP_1$ are rotated at 45° prior to incidence on the $BPP_2$, and at that time, part of the polarized light component is exchanged. The light is redistributed to components along the two principal axes of the $BPP_2$ in the directions of 45° and 135°, and transmits through the $BPP_2$. The two components emitted from the $BPP_2$ are superposed on each other in the analyzer A, and then incident on the imaging element.

As immediately apparent by tracing the channels in this figure, there exist four channels from the incidence end to the imaging element as shown below.

$E_x(x, y) \to$ principal axis of $BPP_1$ in 0° direction $\to$ principal axis of $BPP_2$ in 45° direction $\to$ imaging element $E_x(x, y) \to$ principal axis of $BPP_1$ in 0° directions $\to$ principal axis of $BPP_2$ in 135° direction—imaging element $E_x(x, y) \to$ principal axis of $BPP_1$ in 90° direction—principal axis of $BPP_2$ in 45° direction—imaging element $E_x(x, y) \to$ principal axis of $BPP_1$ in 90° direction—principal axis of $BPP_2$ in 135° direction—imaging element In the imaging element, these four components are superposed on one another to mutually interfere. A phase of an interference term is determined from a phase difference between arbitral two components taken out from the four components. All possible combined sets of components are listed below.

0
$\phi_2(x,y)$
$\{\phi_1(x,y)-\delta(x,y)\}$
$\phi_2(x,y)-\{\phi_1(x,y)-\delta(x,y)\}$
$\phi_2(x,y)+\{\phi_1(x,y)-\delta(x,y)\}$ However, $\delta(x, y)$ is a phase difference between the x and y polarized light components of light under measurement, namely, $$\delta(x, y)=\arg[E_y(x, y)]-\arg[E_x(x, y)]=\arg[S_{23}(x, y)] \qquad (4.1)$$

The intensity distribution generated in the imaging element consequently contains vibration components corresponding to five kinds of phase differences shown above. (However, as described in Section 1. 2, when the crossing angle between $BPP_2$ and A is 45°, the terms depending upon $\{\phi_1(x, y)-\delta_1(x, y)\}$ are canceled out, and thus do not occur in the intensity distribution.)

Here, in the combinations of phase differences that appear in the intensity distribution, the way $\phi_1(x, y)$ and $\phi_2(x, y)$ appear is examined. $\phi_1(x, y)$ constantly appears as a difference from the phase difference $\delta_1(x, y)=\arg[S_{23}(x, y)]$ between the x and y polarized light components of light under measurement, namely $\{\phi_1(x, y)-\delta(x, y)\}$. On the other hand, $\phi_2(x, y)$ appears independently, or as the sum with or difference from $\{\phi_1(x, y)-\delta(x, y)\}$. Thereby, the following is found.

As for $\phi_1(x, y)$, when the SOP of light under measurement is unknown, it is not possible to obtain the value directly from the intensity distribution obtained from the imaging element alone. This is because the value can be obtained only as $\{\phi_1(x, y) - \delta_1(x, y)\}$, and $\phi_1(x, y)$ cannot be specified when the phase difference $\delta(x, y)$ between the x and y polarized light components of the light under measurement is unknown.

On the other hand, as for $\phi_2(x, y)$, there is no limitation as in the case of $\phi_1(x, y)$. There is a term independently containing $\phi_2(x, y)$. Other terms contain $\phi_2(x, y)$ as a sum with or a difference from $\{\phi_1(x, y)\} - \delta(x, y)\}$, and therefore an average between the two may be taken. Namely, $\phi_2(x, y)$ contained in the intensity distribution obtained from the imaging element can be constantly fixed even when the SOP, especially the phase difference $\delta(x, y)$ between the x and y polarized light components, of the light under measurement takes any value. Namely, this means that calibration concurrently with measurement is possible as for $\phi_2(x, y)$.

It is to be noted that, once the $\phi_2(x, y)$ is obtained, the $\phi_1(x, y)$ may also be indirectly obtained in many cases. This is because there are often cases where the $\phi_1(x, y)$ and the $\phi_2(x, y)$ are under the same disturbance, and also the relation between the $\phi_1(x, y)$ and the $\phi_2(x, y)$ is known in advance. Namely, Once the $\phi_2(x, y)$ is fixed from the intensity distribution obtained from the imaging element, the $\phi_1(x, y)$ can be fixed according to a relation between them known in advance.

The basic principle obtained above is summarized as follows.

With appropriate signal processing performed, it is possible to demodulate the $\phi_2(x, y)$ from the intensity distribution obtained from the imaging element regardless of the SOP of the light under measurement, namely without the use of information provided in advance on the SOP of the light under measurement.

Through the use of the relation between the $\phi_1(x, y)$ and the $\phi_2(x, y)$, it is possible to also demodulate the $\phi_1(x, y)$, though indirectly, independently of the SOP of the light under measurement.

It is to be noted that, what needs to be concerned here is apparently that $\phi_2(x, y)$ is not necessarily obtained in advance of the $\phi_2(x, y)$, depending upon a formula making manner. When the relation between the $\phi_1(x, y)$ and the $\phi_2(x, y)$ is given in advance and a formula is made including such a relation, it may be represented (at least in a mathematical expression,) that the $\phi_1(x, y)$ is obtained concurrently with the $\phi_2(x, y)$ or in advance of the $\phi_2(x, y)$.

4.2 Phase Attribute Function of Measurement System

In the previous section, it was demonstrated that the reference phase function $\phi_2(x, y)$ can be obtained independently of the SOP of the light under measurement. Here, this principle does not mean that the $\phi_2(x, y)$ itself needs to be directly obtained. The ways to obtain the $\phi_2(x, y)$ may for example include obtaining the difference $\Delta\phi_2(x, y)$ from the initial value $\phi_2^{(i)}(x, y)$ when it is known. Or an amount including the reference phase function $\phi_2(x, y)$ and the like, e.g. $K_2(x, y)$, $\cos \phi_2(x, y)$, $\cos \Delta\phi_2(x, y)$, etc. can be obtained during measurement.

Further, when the relation between the $\phi_1(x, y)$ and the $\phi_2(x, y)$ is known in advance, an expression including $\phi_1(x, y)$, the difference $\Delta\phi_1(x, y)$ thereof and the like, e.g. $K_-(x, y)$, $K_+(x, y)$, $\cos [\phi_2(x, y) - \phi_1(x, y)]$, $\cos [\Delta\phi_2(x, y) - \Delta\phi_1(x, y)]$, etc. can all be calibrated during measurement, and using these, it is possible to concurrently measure the two-dimensional spatial distribution of the Stokes parameters, or polarized light parameters similar to them.

Hereinafter, a function as thus described which is directly or indirectly related to the reference phase functions $\phi_1(x, y)$ and $\phi_2(x, y)$ and the differences thereof from their reference value, and is determined only with parameters of the imaging polarimetric measurement system using the birefringent prism pair is referred to as a phase attribute function of the measurement system. While some of phase attribute functions are necessary in demodulating the two-dimensional spatial distribution of the SOP of the light under measurement from the intensity distribution obtained from the imaging element, a function, such as the reference amplitude function, which does not depend upon the reference phase function, may also be necessary in some cases. A set of functions, which is determined based only upon parameters of the imaging polarimetry measurement system using the birefringent prism pair and is sufficient for demodulation of the two-dimensional spatial distribution of the SOP, is generically named as a set of attribute functions of a measurement system.

With the use of this term, it can be said that the present invention "provides a method for calibrating, concurrently with measurement of polarized light, a set of phase attribute functions out of attribute functions sufficient for demodulation of a two-dimensional spatial distribution of an SOP."

With consideration of the above descriptions, "explicit" frequency filtering is found not necessarily essential for obtaining the phase attribute function of the measurement system from the intensity distribution provided from the imaging element. Although the operation for separating some components contained in the intensity distribution is certainly included in the signal processing, the separation is not necessarily required to be performed with "a period of a quasi-sinusoidal component" on the reference. All needed is separation sufficient for extracting $\phi_2(x, y)$ and an amount relative to the difference of the $\phi_2(x, y)$.

Chapter 5: Calibration Method During Measurement through Use of Generalized Inverse Matrix A method for using a generalized inverse matrix is shown in this chapter as one of specific examples of methods for calibration of a phase attribute function during measurement and demodulation of two-dimensional spatial distribution of Stokes parameters without the use of frequency filtering, namely without separation of a quasi-sinusoidal vibration component from the intensity distribution obtained from an imaging element.

5.1 Matrix Representation

It is assumed that reference phase functions to be obtained by some pre-calibration are $\phi_1^{(i)}(x, y))$ and $\phi_2^{(i)}(x, y)$, and that the reference phase functions are changed as follows during measurement.

$$\phi_1(x,y) = \phi_1^{(i)}(x,y) + \Delta\phi_1(x,y) \tag{5.1a}$$

$$\phi_2(x,y) = \phi_2^{(i)}(x,y) + \Delta\phi^2(x,y) \tag{5.1b}$$

Below described is a method for obtaining the differences $\Delta\phi_1(x, y)$, $\Delta\phi_2(x, y)$ of the reference phase functions, or a change in reference complex functions corresponding to these.

When the above expressions are substituted into Expression (1.5), the following expression is given.

[Mathematical Expression 44]

$$I(x, y) = \frac{1}{2}m_0(x, y)S_0(x, y) + \qquad (5.2)$$
$$\frac{1}{4}m_-(x, y)|S_{23}(x, y)|\cos[\phi_2^{(i)}(x, y) + \Delta\phi_2(x, y) -$$
$$\phi_1^{(i)}(x, y) - \Delta\phi_1(x, y) + \arg\{S_{23}(x, y)\}] +$$
$$\frac{1}{2}m_2(x, y)S_1(x, y)\cos[\phi_2^{(i)}(x, y) + \Delta\phi_2(x, y)] -$$
$$\frac{1}{4}m_+(x, y)|S_{23}(x, y)|\cos$$
$$[\phi_2^{(i)}(x, y) + \Delta\phi_2(x, y) + \phi_1^{(i)}(x, y) + \Delta\phi_1(x, y) - \arg\{S_{23}(x, y)\}]$$

Here, when the second and fourth terms (underlined) of this expression are put together and transformed, the following expression is given.

$$I(x, y) = p_0(x, y) + \cos[\phi_2^{(i)}(x, y)]p_c(x, y) + \qquad (5.3)$$
$$\sin[\phi_2^{(i)}(x, y)]p_s(x, y) + \sin[\phi_2^{(i)}(x, y)]\sin[\phi_1^{(i)}(x, y)]q_{ss}(x, y) +$$
$$\cos[\phi_2^{(i)}(x, y)]\cos[\phi_1^{(i)}(x, y)]q_{cc}(x, y) +$$
$$\sin[\phi_2^{(i)}(x, y)]\cos[\phi_1^{(i)}(x, y)]q_{sc}\sin[\phi_1^{(i)}(x, y)] +$$
$$\cos[\phi_2^{(i)}(x, y)]\sin[\phi_1^{(i)}(x, y)]q_{cs}(x, y)$$

However,

[Mathematical Expression 45]

$$p_0(x, y) = \frac{1}{2}m_0(x, y)S_0(x, y) \qquad (5.4a)$$

$$p_c(x, y) = \frac{1}{2}m_2(x, y)S_1(x, y)\cos[\Delta\phi_2(x, y)] \qquad (5.4b)$$

$$p_s(x, y) = -\frac{1}{2}m_2(x, y)S_1(x, y)\sin[\Delta\phi_2(x, y)] \qquad (5.4c)$$

$$q_{ss}(x, y) = \frac{1}{4}m_-(x, y)\{S_2(x, y)\cos[\Delta\phi_2(x, y) - \Delta\phi_1(x, y)] - \qquad (5.4d)$$
$$S_3(x, y)\sin[\Delta\phi_2(x, y) - \Delta\phi_1(x, y)]\} +$$
$$\frac{1}{4}m_+(x, y)\{S_2(x, y)\cos[\Delta\phi_2(x, y) + \Delta\phi_1(x, y)] +$$
$$S_3(x, y)\sin[\Delta\phi_2(x, y) + \Delta\phi_1(x, y)]\}$$

$$q_{cc}(x, y) = \frac{1}{4}m_-(x, y)\{S_2(x, y)\cos[\Delta\phi_2(x, y) - \Delta\phi_1(x, y)] - \qquad (5.4e)$$
$$S_3(x, y)\sin[\Delta\phi_2(x, y) - \Delta\phi_1(x, y)]\} -$$
$$\frac{1}{4}m_+(x, y)\{S_2(x, y)\cos[\Delta\phi_2(x, y) + \Delta\phi_1(x, y)] +$$
$$S_3(x, y)\sin[\Delta\phi_2(x, y) + \Delta\phi_1(x, y)]\}$$

$$q_{sc}(x, y) = -\frac{1}{4}m_-(x, y)\{S_2(x, y)\cos[\Delta\phi_2(x, y) - \Delta\phi_1(x, y)] + \qquad (5.4f)$$
$$S_3(x, y)\sin[\Delta\phi_2(x, y) - \Delta\phi_1(x, y)]\} +$$
$$\frac{1}{4}m_+(x, y)\{S_2(x, y)\cos[\Delta\phi_2(x, y) + \Delta\phi_1(x, y)] -$$
$$S_3(x, y)\sin[\Delta\phi_2(x, y) + \Delta\phi_1(x, y)]\}$$

-continued $$q_{cs}(x, y) = \frac{1}{4}m_-(x, y)\{S_2(x, y)\cos[\Delta\phi_2(x, y) - \Delta\phi_1(x, y)] + \qquad (5.4g)$$
$$S_3(x, y)\sin[\Delta\phi_2(x, y) - \Delta\phi_1(x, y)]\} +$$
$$\frac{1}{4}m_+(x, y)\{S_2(x, y)\cos[\Delta\phi_2(x, y) + \Delta\phi_1(x, y)] -$$
$$S_3(x, y)\sin[\Delta\phi_2(x, y) + \Delta\phi_1(x, y)]\}$$

Incidentally, in the actual measurement, the two-dimensional spatial coordinates are digitized since digitized measured values are used. Assuming that a digitized marks are denoted as M and N in the x and y directions and a digitized two-dimensional spatial coordinates are denoted as $x_m$ and $y_n$, respectively (m=1 ... M, n=1 ... N), Expression (5.3) can be written as follows.

[Mathematical Expression 46]

$$I(x_m, y_n) = 1 \cdot p_0(x_m, y_n) + \qquad (5.5)$$
$$\{\cos[\phi_2^{(i)}(x_m, y_n)]\} \cdot p_c(x_m, y_n) + \{\sin[\phi_2^{(i)}(x_m, y_n)]\} \cdot p_s(x_m, y_n) +$$
$$\{\sin[\phi_2^{(i)}(x_m, y_n)]\sin[\phi_1^{(i)}(x_m, y_n)]\} \cdot q_{ss}(x_m, y_n) +$$
$$\{\cos[\phi_2^{(i)}(x_m, y_n)]\cos[\phi_1^{(i)}(x_m, y_n)]\} \cdot q_{cc}(x_m, y_n) +$$
$$\{\sin[\phi_2^{(i)}(x_m, y_n)]\cos[\phi_1^{(i)}(x_m, y_n)]\} \cdot q_{sc}(x_m, y_n) +$$
$$\{\cos[\phi_2^{(i)}(x_m, y_n)]\sin[\phi_1^{(i)}(x_m, y_n)]\} \cdot q_{cs}(x_m, y_n)$$

This expression means that the intensity distribution $I(x_m, y_n)$ is a linear sum of a group of parameters $p_0(x_m, y_n)$, $p_c(x_m, y_n)$, $p_s(x_m, y_n)$, $q_{ss}(x_m, y_n)$, $q_{cc}(x_m, y_n)$, $q_{sc}(x_m, y_n)$, and $q_{cs}(x_m, y_n)$, which includes the two-dimensional spatial distribution of the Stokes parameters and the reference phase function differences. Therefore, this can be written in matrix form. Examples of the way for such writing are listed below.

$$P = RQ \qquad (5.6)$$

Here, as $I=(m-1)N+n$, elements of a column vector P (line MN), Q (line 7MN) in m=1 ... M, and n=1 ... N are:

$$P_I = I(x_m, y_n) \qquad (5.7a)$$

$$Q_{(7I-6)} = p_0(x_m, y_n) \qquad (5.7b)$$

$$Q_{(7I-5)} = p_c(x_m, y_n) \qquad (5.7c)$$

$$Q_{(7I-4)} = p_s(x_m, y_n) \qquad (5.7d)$$

$$Q_{(7I-3)} = q_{ss}(x_m, y_n) \qquad (5.7e)$$

$$Q_{(7I-2)} = q_{cc}(x_m, y_n) \qquad (5.7f)$$

$$Q_{(7I-1)} = q_{sc}(x_m, y_n) \qquad (5.7g)$$

$$Q_{(7I)} = q_{cs}(x_m, y_n) \qquad (5.7h)$$

On the other hand, elements of a matrix R (line MN, column 7MN) in m=1 ... M and n=1 ... N are:

$$R_{I(7I-6)} = 1 \qquad (5.8a)$$

$$R_{I(7I-5)} = \cos[\phi_2^{(i)}(x_m, y_n)] \qquad (5.8b)$$

$$R_{I(7I-4)} = \sin[\phi_2^{(i)}(x_m, y_n)] \qquad (5.8c)$$

$$R_{I(7I-3)} = \sin[\phi_2^{(i)}(x_m, y_n)]\sin[\phi_1^{(i)}(x_m, y_n)] \qquad (5.8d)$$

$$R_{I(7I-2)} = \cos[\phi_2^{(i)}(x_m, y_n)]\cos[\phi_1^{(i)}(x_m, y_n)] \qquad (5.8e)$$

$$R_{I(7I-1)}=\sin[\phi_2^{(i)}(x_m,y_n)]\cos[\phi_1^{(i)}(x_m,y_n)] \quad (5.8f)$$

$$R_{I(7I)}=\cos[\phi_2^{(i)}(x_m,y_n)]\sin[\phi_1^{(i)}(x_m,y_n)] \quad (5.8g)$$

Only the above elements have values and the remaining elements are zero. It is to be noted that in this selection manner, all elements are real numbers.

Other than the above example, there may exist an almost unlimited number of ways to represent properties of the imaging polarimeter using the birefringent prism pair in matrix form. Any representation may be acceptable so long as satisfying the following conditions.

Condition 1: A column vector on the left side (P in the above example) lists information on two-dimensional spatial distribution of light intensity obtained from the imaging element.

Condition 2: A column vector on the right side (Q in the above example) lists information including two-dimensional spatial distribution of Stokes parameters of light under measurement and phase attribute functions of a measurement system.

Condition 3: A matrix on the right side (R in the above example) is a liner sum that completely relates the column vectors on the left and right sides to each other, and all elements thereof are fixed before demodulation. (A provisional calibration value or the like may be used.) It should be noted that an element of Q made relative to one of elements of P is not related to other elements of P in the above example. However, this is not essential. If anything, depending upon a constitution of an optical system, an approximating manner in a theoretical expression, or the like, there may be cases where the above-mentioned relation between elements of Q and P does not apply, namely, an intensity distribution in certain coordinates (x, y) could be related to a two-dimensional spatial distribution of Stokes parameter in other coordinates (in the vicinity thereof).

5.2 Inverse Transformation by Generalized Inverse Matrix

As revealed from the above description, Expression (5.6) expresses a linear simultaneous equation, since column vector P on the left side is determined by measurement of the intensity distribution whereas the matrix R on the right side is fixed prior to measurement. Solving this linear simultaneous equation leads to determination of column vector Q (unknown) on the right side. However, the number of elements of Q is typically considerably large as compared to the number of elements of P. (In the above example, the elements of Q are seven times larger in number than the elements of P.) Hence, the matrix R does not have an inverse matrix.

As a method for solving a linear simultaneous equation written in matrix form in such a case, a method for using a generalized inverse matrix may be employed. A matrix X that satisfies the following four conditions is referred to as a generalized inverse matrix of R and denoted as $R^+$.

$$RXR=R \quad (5.9a)$$

$$XRX=X \quad (5.9b)$$

$$(RX)^*=RX \quad (5.9c)$$

$$(XR)^*=XR \quad (5.9d)$$

However, a superscript asterisk * added to the matrix denotes a conjugate transpose matrix. It should be noted that X as shown above certainly exists with respect to any R, and is further determined uniquely to R. In addition, a variety of methods have been proposed as concrete methods for calculating $R^+$ from R. (Reference: "Matrix numerical value calculation", written by Hayato Togawa, Ohmsha, Ltd., 1971, p46)

The use of this generalized inverse matrix $R^+$ allows determination of each unknown element of column vector Q included in the right side of Expression (5.6), according to the following expression.

$$Q=R^+P \quad (5.10)$$

That is, this means that the group of parameters $p_0(x_m, y_n)$, $p_c(x_m, y_n)$, $p_s(x_m y_n)$, $q_{ss}(x_m, y_n)$, $q_c(x_m, y_n)$, $q_{sc}(x_m, y_n)$, and $q_{cs}(x_m, y_n)$ (where m=1 ... M, n=1 ... N), which includes the two-dimensional spatial distribution of Stokes parameters and the reference phase function differences, is obtained.

It is to be noted that, even in the case of using another matrix representation as described at the end of the previous section, the use of an appropriate generalized inverse matrix enables fixing of "a list of information including two-dimensional spatial distribution of Stokes parameters of the light under measurement and phase attribute functions of the measurement system."

Each element obtained by this generalized inverse matrix is not in one-to-one correspondence with each quasi-sinusoidal vibration component contained in the intensity distribution obtained from the imaging element. For example, as apparent from the above-mentioned derivation process, each of $q_{ss}(x, y)$, $q_{cc}(x, y)$, $q_{sc}(x, y)$, and $q_{cs}(x, y_I)$ is relative to both of two quasi-sinusoidal components related to $\phi_2(x, y)-\phi_1(x, y)$ and $\phi_2(x, y)+\phi_1(x, y)$.

That is to say, separation of elements by this generalized inverse matrix calculation is not in one-to-one correspondence with separation of quasi-sinusoidal period components by frequency filtering which is made by the Fourier transform method or the like.

5.3 Demodulation of Phase Attribute Function

Next, a phase attribute function is obtained from an element of column vector Q.

As described as the general idea in the previous chapter, the phase attribute function can be obtained as follows.

$\phi_2(x, y)$ (or a function determined based thereupon) is obtained from information included in the intensity distribution obtained from the imaging element regardless of the SOP of the light under measurement.

$\phi_1(x, y)$ as well as $\phi_2(x, y)$, and further a function relative to both, are obtained by the use of the relation between the $\phi_1(x, y)$ and the $\phi_2(x, y)$ (information provided in advance) regardless of the SOP of the light under measurement.

By the use of an element of column vector Q obtained using a generalized inverse matrix, an equation is further set up and solved so that $\phi_1(x,y)$, $\phi_2(x, y)$ and functions equivalent to those, namely phase attribute functions, can be obtained. Moreover, solving the results in a simultaneous manner, it is possible to determine the SOP of the light under measurement.

Concrete examples of a calculating expression in a case where each element of column vector Q is given by Expressions (5.7b) to (5.7h) are shown below. Those are only representation of results, but are corresponded, when possible, to the methods described in Chapter 3.

A. Method for Obtaining $\Delta\phi_2(x, y)$, Effective in Case of $S_1(x, y) \neq 0$ Among the elements of Column Vector Q, $p_c(x, y)$ and $p_s(x, y)$ are obtained as follows.

[Mathematical Expression 47]

$$I(x, y) = p_0(x, y) + \cos[\phi_2^{(i)}(x, y)]p_c(x, y) + \quad (5.3)$$
$$\sin[\phi_2^{(i)}(x, y)]p_s(x, y) + \sin[\phi_2^{(i)}(x, y)]\sin[\phi_1^{(i)}(x, y)]q_{ss}(x, y) +$$
$$\cos[\phi_2^{(i)}(x, y)]\cos[\phi_1^{(i)}(x, y)]q_{cc}(x, y) +$$
$$\sin[\phi_2^{(i)}(x, y)]\cos[\phi_1^{(i)}(x, y)]q_{sc}(x, y) +$$
$$\cos[\phi_2^{(i)}(x, y)]\sin[\phi_1^{(i)}(x, y)]q_{cs}(x, y)$$

From the above, $\Delta\phi_2(x, y)$ can be calculated as follows.

$$\Delta\phi_2(x, y) = -\tan^{-1}\frac{p_s(x, y)}{p_c(x, y)} \quad (5.12)$$

Here, the denominator and the numerator of the arctangent in the above expression are both proportional to $S_1(x, y)$ of the light under measurement. It is thus possible to obtain $\Delta\phi_2(x, y)$ according to the above expression so long as $S_1(x, y)$ is not zero.

B. Method for Obtaining $\Delta\phi_2(x, y)$, Effective in Case where Either $S_2(x, y)\neq 0$ or $S_3(x, y)\neq 0$ is Satisfied Among the elements of column vector Q, the following relations are derived even from those not used in above A.

[Mathematical Expression 48]

$$\frac{1}{4}m_-(x, y)m_+(x, y)[S_2^2(x, y) + S_3^2(x, y)]\cos[2\Delta\phi_2(x, y)] = \quad (5.13a)$$
$$q_{ss}^2(x, y) - q_{cc}^2(x, y) + q_{sc}^2(x, y) - q_{cs}^2(x, y)$$

$$\frac{1}{4}m_-(x, y)m_+(x, y)[S_2^2(x, y) + S_3^2(x, y)]\sin[2\Delta\phi_2(x, y)] = \quad (5.13b)$$
$$2[q_{cc}(x, y)q_{sc}(x, y) + q_{ss}(x, y)q_{cs}(x, y)]$$

From the above, $\Delta\phi_2(x, y)$ can be calculated as follows.

$$\Delta\phi_2(x, y) = \frac{1}{2}\tan^{-1}\frac{2[q_{cc}(x, y)q_{sc}(x, y) + q_{ss}(x, y)q_{cs}(x, y)]}{q_{ss}^2(x, y) - q_{cc}^2(x, y) + q_{sc}^2(x, y) - q_{cs}^2(x, y)} \quad (5.14)$$

The denominator and the numerator of the arctangent in the above expression are both proportional to $S_2^2(x, y) + S_3^2(x, y)$ of the light under measurement. It is thus possible to obtain $\Delta\phi_2(x, y)$ according to the above expression so long as $S_2(x, y)$ and $S_3(x, y)$ do not concurrently become zero.

C. Combination of A and B

Similar to the case (case of using the frequency filtering) described in Chapter 3, adaptive combination of methods A and B is effective. It should be noted that, since a process to be performed for the combination is completely the same as previously done, a description thereof is omitted.

D. Method for Obtaining $\Delta\phi_2(x, y)$, Effective so Long as $S_1$, $S_2$, $S_3$ do not Concurrently become Zero Among the elements of column vector Q, the following expressions are derived from a further different combination.

[Mathematical Expression 49]

$$\frac{1}{4}\{m_2^2(x, y)[S_1^2(x, y)] + m_-(x, y)m_+(x, y)[S_2^2(x, y) + S_3^2(x, y)]\} \quad (5.15a)$$
$$\cos[2\Delta\phi_2(x, y)] =$$
$$p_c^2(x, y) - p_s^2(x, y) + q_{ss}^2(x, y) - q_{cc}^2(x, y) + q_{sc}^2(x, y) - q_{cs}^2(x, y)$$

$$\frac{1}{4}\{m_2^2(x, y)[S_1^2(x, y)] + m_-(x, y)m_+(x, y)[S_2^2(x, y) + S_3^2(x, y)]\} \quad (5.15b)$$
$$\sin[2\Delta\phi_2(x, y)] =$$
$$2[-p_c(x, y)p_s(x, y) + q_{cc}(x, y)q_{sc}(x, y) + q_{ss}(x, y)q_{cs}(x, y)]$$

From the above, an expression is derived as follows as a third expression for calculating the $\Delta\phi_2(x, y)$.

$$\Delta\phi_2(x, y) = \frac{1}{2}\tan^{-1}\frac{2[-p_c(x, y)p_s(x, y) + q_{cc}(x, y)q_{sc}(x, y) + q_{ss}(x, y)q_{cs}(x, y)]}{p_c^2(x, y) - p_s^2(x, y) + q_{ss}^2(x, y) - q_{cc}^2(x, y) + q_{sc}^2(x, y) - q_{cs}^2(x, y)} \quad (5.16)$$

The denominator and the numerator of the arctangent in the above expression are both proportional to $m_2^2(x, y)S_1^2(x, y) + m_-(x, y)m_+(x, y)[S_2^2(x, y) + S_3^2(x, y)]$. It is thus possible to obtain $\Delta\phi_2(x, y)$ according to the above expression so long as $S_1(x, y)$, $S_2(x, y)$ and $S_3(x, y)$ do not concurrently become zero.

It should be noted that "$S_1(x, y) = S_2(x, y) = S_3(x, y) = 0$" is satisfied when the light under measurement is unpolarized light. In this case, calibration of the phase attribute function itself is not required because only the polarization degree (i.e. 0) is significant information.

E. Calculation of $\Delta\phi_1(x, y)$

Since fluctuations in $\Delta\phi_1(x, y)$ are considered to be similar to those in $\Delta\phi_2(x, y)$, it is possible to obtain $\Delta\phi_1(x, y)$ by proportional calculation (e.g. by using a relation between $\Delta\phi_2(x, y)$ and $\Delta\phi_1(x, y)$) from a measured value of $\Delta\phi_2(x, y)$.

F. Demodulation of Two-Dimensional Spatial Distribution of Stokes Parameters

Using obtained $\Delta\phi_1(x, y)$ and $\Delta\phi_2(x, y)$, the two-dimensional spatial distributions $S_0(x, y)$, $S_1(x, y)$, $S_2(x, y)$, and $S_3(x, y)$ of Stokes parameters are determined from $p_0(x, y)$, $p_c(x, y)$, $p_s(x, y)$, $q_{ss}(x, y)$, $q_{cc}(x, y)$, $q_{sc}(x, y)$, and $q_{cs}(x, y)$. For example, the following expressions may be used.

[Mathematical Expression 50]

$$S_0(x, y) = \frac{2}{m_0(x, y)}p_0(x, y) \quad (5.17a)$$

$$S_1(x, y) = \frac{2}{m_2(x, y)}[p_c(x, y)\cos\Delta\phi_2(x, y) - p_s(x, y)\sin\Delta\phi_2(x, y)] \quad (5.17b)$$

$$S_2(x, y) = \quad (5.17c)$$
$$\frac{2}{m_-(x, y)}\{[q_{ss}(x, y) + q_{cc}(x, y)]\cos[\Delta\phi_2(x, y) - \Delta\phi_1(x, y)] -$$
$$[q_{sc}(x, y) - q_{cs}(x, y)]\sin[\Delta\phi_2(x, y) - \Delta\phi_1(x, y)]\}$$

-continued $$S_3(x,y) = \frac{2}{m_-(x,y)}\{-[q_{ss}(x,y)+q_{cc}(x,y)]\sin[\Delta\phi_2(x,y)-\Delta\phi_1(x,y)] - [q_{sc}(x,y)-q_{cs}(x,y)]\cos[\Delta\phi_2(x,y)-\Delta\phi_1(x,y)]\} \quad (5.17d)$$

EXAMPLE 1

Figure 12:
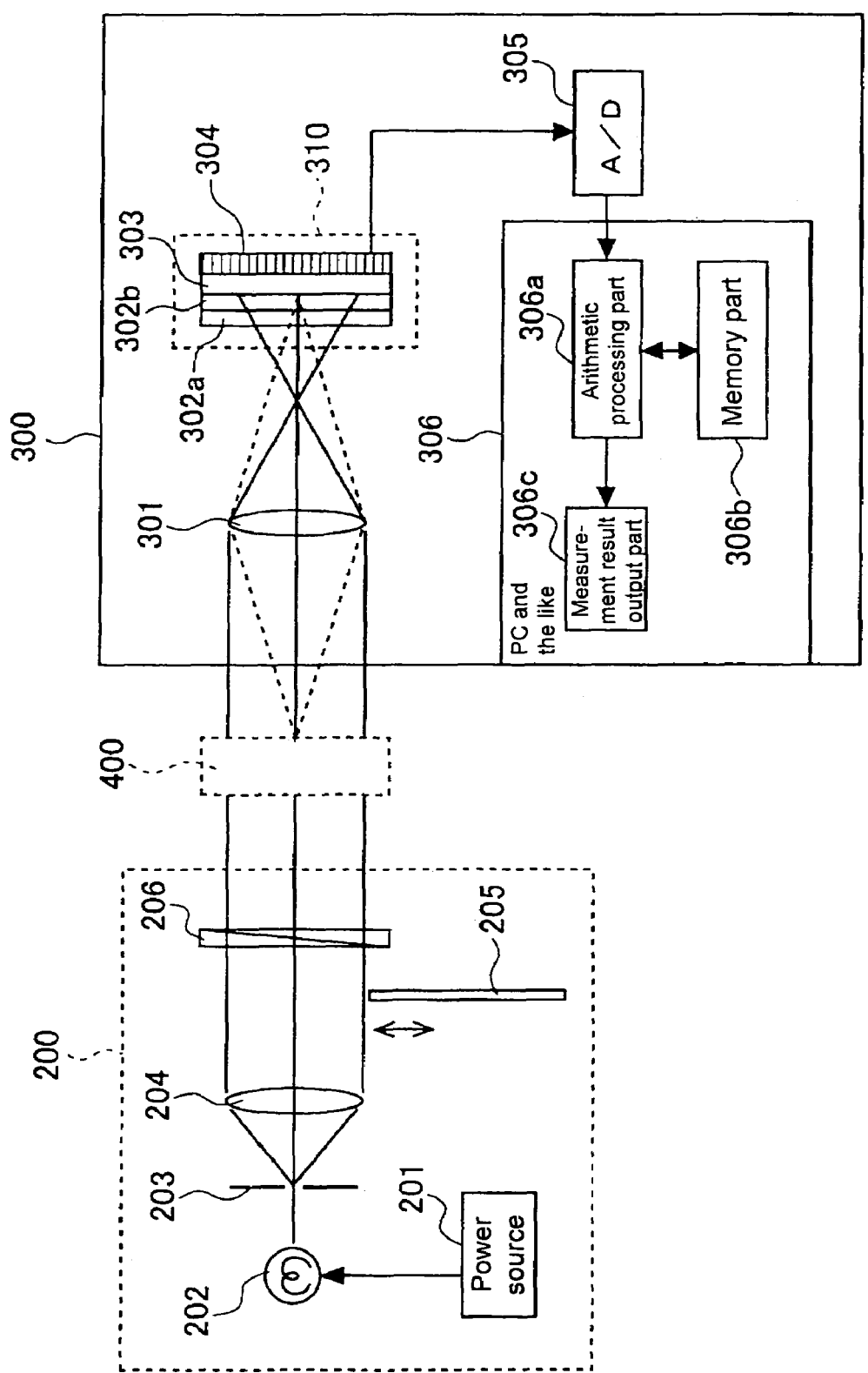
FIG. 12 shows a constitutional view of one example of an imaging polarimeter.

In the following, a preferred example of the present invention is specifically described with reference to FIGS. 12 to 18. FIG. 12 shows a constitutional view of one example of an imaging polarimeter. As shown in this figure, this device comprises a photo-projecting side unit 200 and a photo-receiving side unit 300. It is to be noted that numeral 400 denotes a sample.

The photo-projecting side unit 200 comprises: a power source 201; a light source 202 that is turned on by power feeding from the power source 201; a pinhole plate 203 arranged on the front face side of the light source 202 in the light-projecting direction; a collimator lens 204 for collimating light transmitting through the pinhole of the pinhole plate 203; a shutter 205 which is arranged on the front face side of the collimator lens 204 and opens and closes to transmit or block the transmitted light; and a polarizer 206 on which the light having transmitted through the shutter is incident.

The light after passage of a polarizer 206 is projected from the photo-projecting side unit 200 onto the sample 400. The light transmitted through or reflected on the sample 400 is incident on the photo-receiving side unit 300.

On an incident light channel in the photo-receiving side unit 300, an imaging lens 301 and a polarimetric imaging device 310 are arranged. This polarimetric imaging device 310 is so constituted that two birefringent prism pairs 302a and 302b, an analyzer 303 and a CCD imaging element 304 intervene in sequence. The photo-receiving side unit 300 further comprises an A/D converter 305 that converts a light output from the CCD imaging element 304 to a digital signal. The digital output signal from the A/D converter 305 is processed in a computer 306 such as a personal computer (PC).

As widely known, the computer 306 comprises: an arithmetic processing part 306a comprised of a microprocessor and the like; a memory part 306b comprised of an ROM, a RAM, an HDD and the like; and a measurement result output part 306c comprised of a display, a printer, a variety of data output devices, a communication device, and the like.

In addition, although the photo-projecting side unit and the photo-receiving side unit are separately constituted in this example as described above, the photo-projecting side unit and the photo-receiving unit may be integrated. Furthermore, the light source 202 emits single-wavelength light and includes a laser, a white lamp+an interference filter, a lamp having bright line spectrum+a color filter, and the like.

Figure 13:
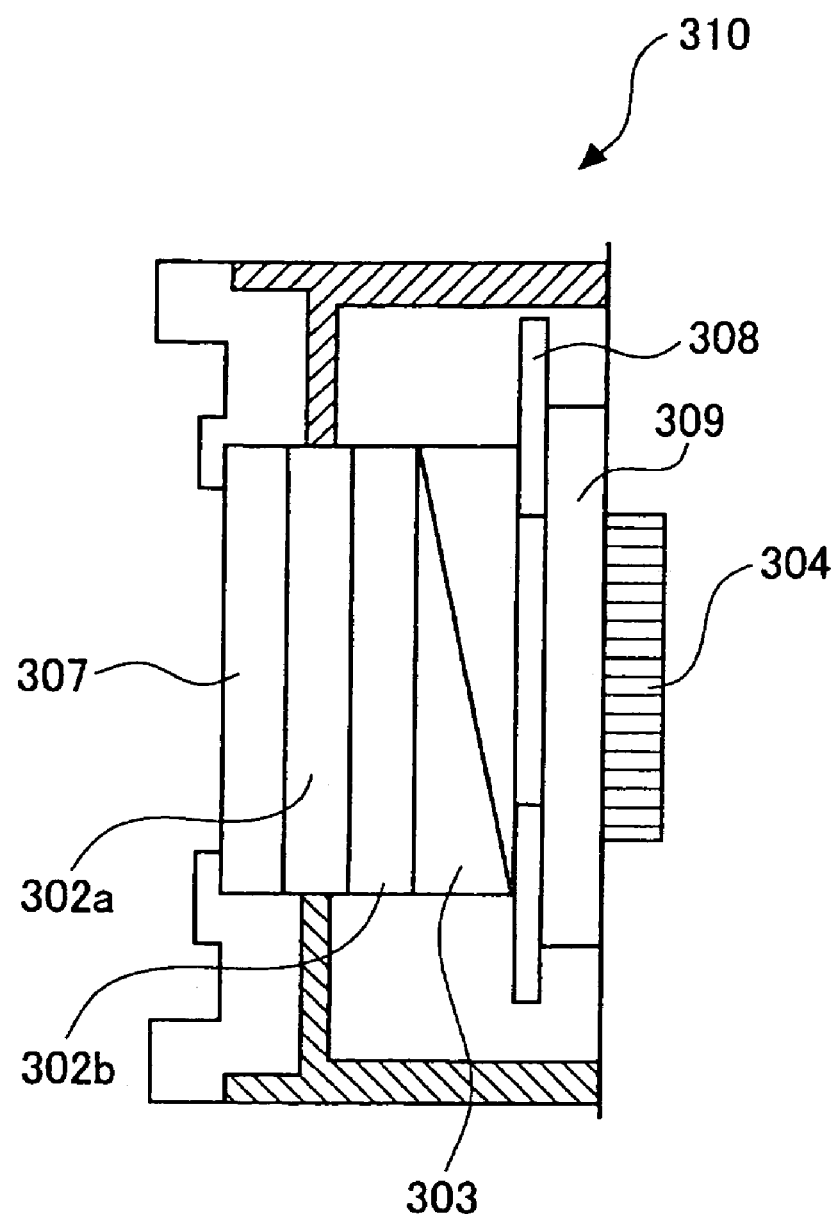
FIG. 13 shows a sectional view of the imaging polarimeter shown in FIG. 12.

FIG. 13 is a sectional view showing the polarimetric imaging device 310 shown in FIG. 12. As shown in this figure, a glass plate 307 is arranged on the front side of the birefringent prism pair 302a and a spacer 308 and a cover glass 309 are arranged between the analyzer 303 and the CCD imaging element 304. In this constitution, a completely compact polarimetric imaging device integrated with the imaging element can be implemented.

Figure 14:
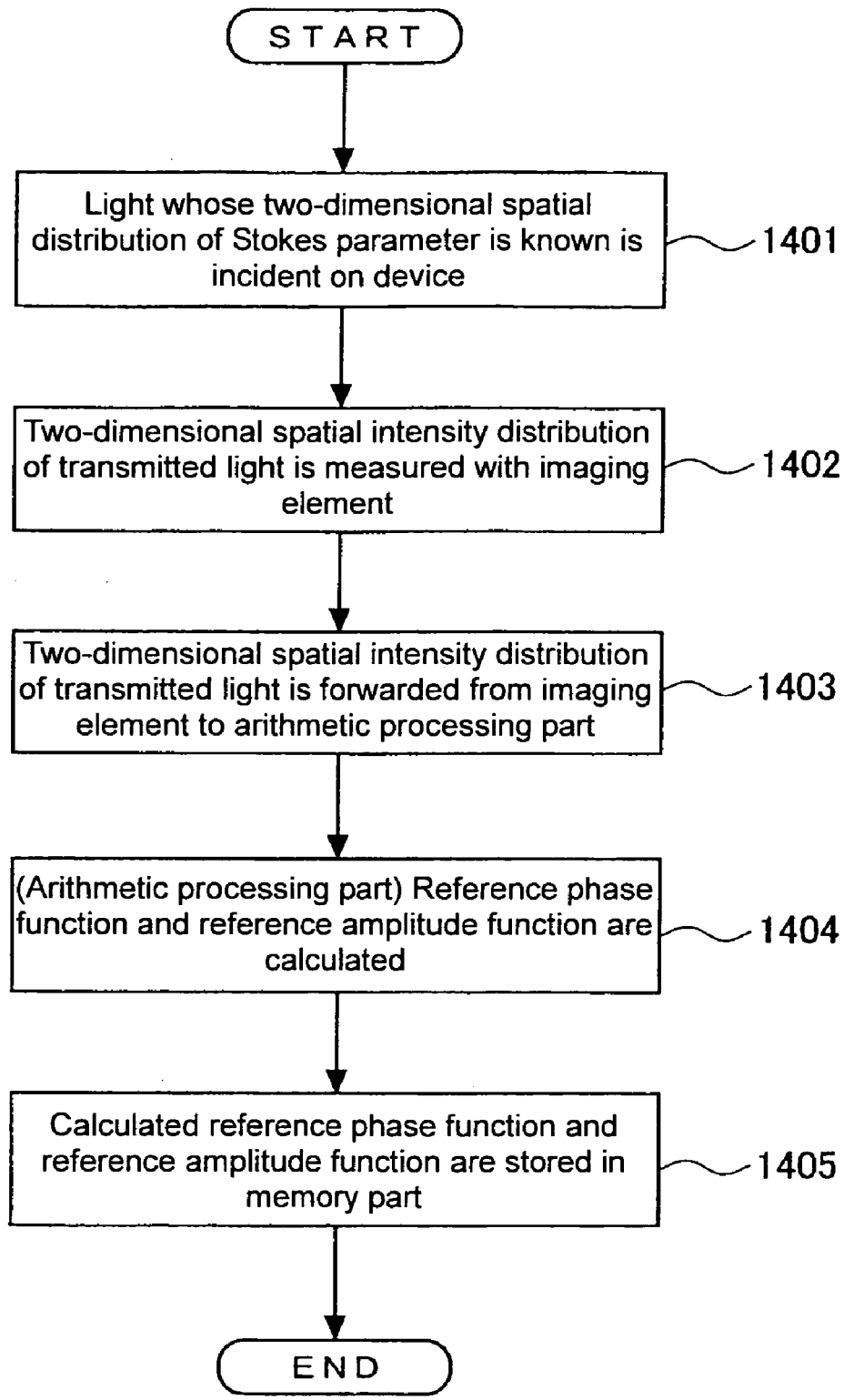
FIG. 14 shows a flowchart of a pre-calibration process.

Next, FIG. 14 shows a flowchart of a pre-calibration process. As shown in this figure, as the pre-calibration process, first in Step 1401, light whose two-dimensional spatial distribution of Stokes parameters is known is incident on a device (photo-receiving side unit 300 in this case). It should be noted that, for generation of light whose two-dimensional spatial distribution of Stokes parameters is known, for example, the polarizer 206 of the device in the figure may be rotated so as to be arranged in a desired orientation.

Next in Step 1402, a two-dimensional spatial intensity distribution of transmitted light is measured with the imaging element. Here, the shutter 205 may be utilized for reduction in influence of unnecessary light, such as lost light. Specifically, an intensity distribution of the unnecessary light can be canceled out by taking a difference in intensity distribution when measured with the shutter open and when measured with the shutter closed.

Next in Step 1403, the two-dimensional spatial intensity distribution of the transmitted light is forwarded from the imaging element to the computer 306, to be provided to processing in the arithmetic processing part 306a.

Next in Step 1404, reference phase functions and reference amplitude functions are calculated by an action of the arithmetic processing part 306a.

Next in Step 1405, the calculated reference phase functions and reference amplitude functions are stored into the memory part 306b, whereby the pre-calibration process is completed.

Figure 15:
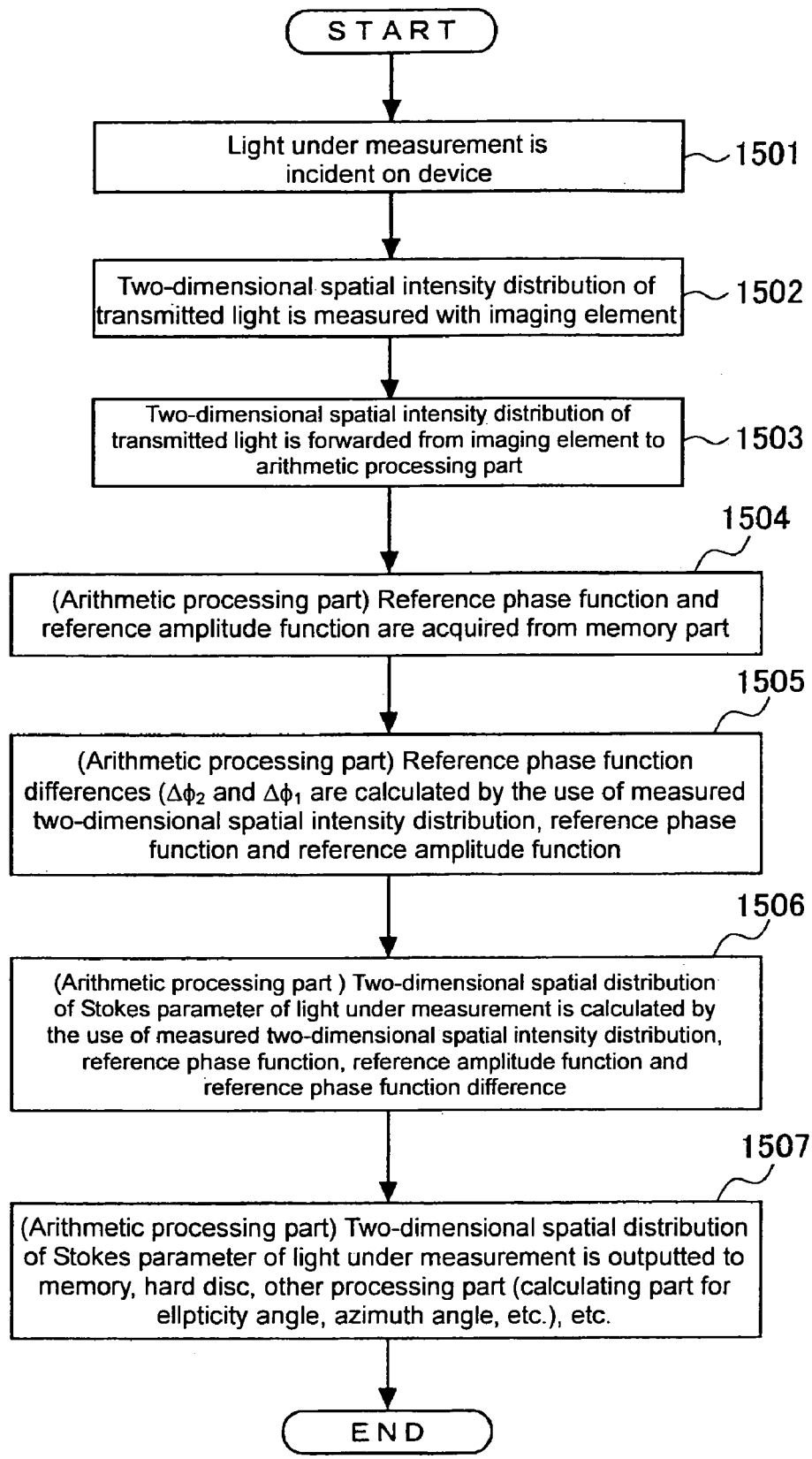
FIG. 15 shows a flowchart of a measurement process.
Figure 19:
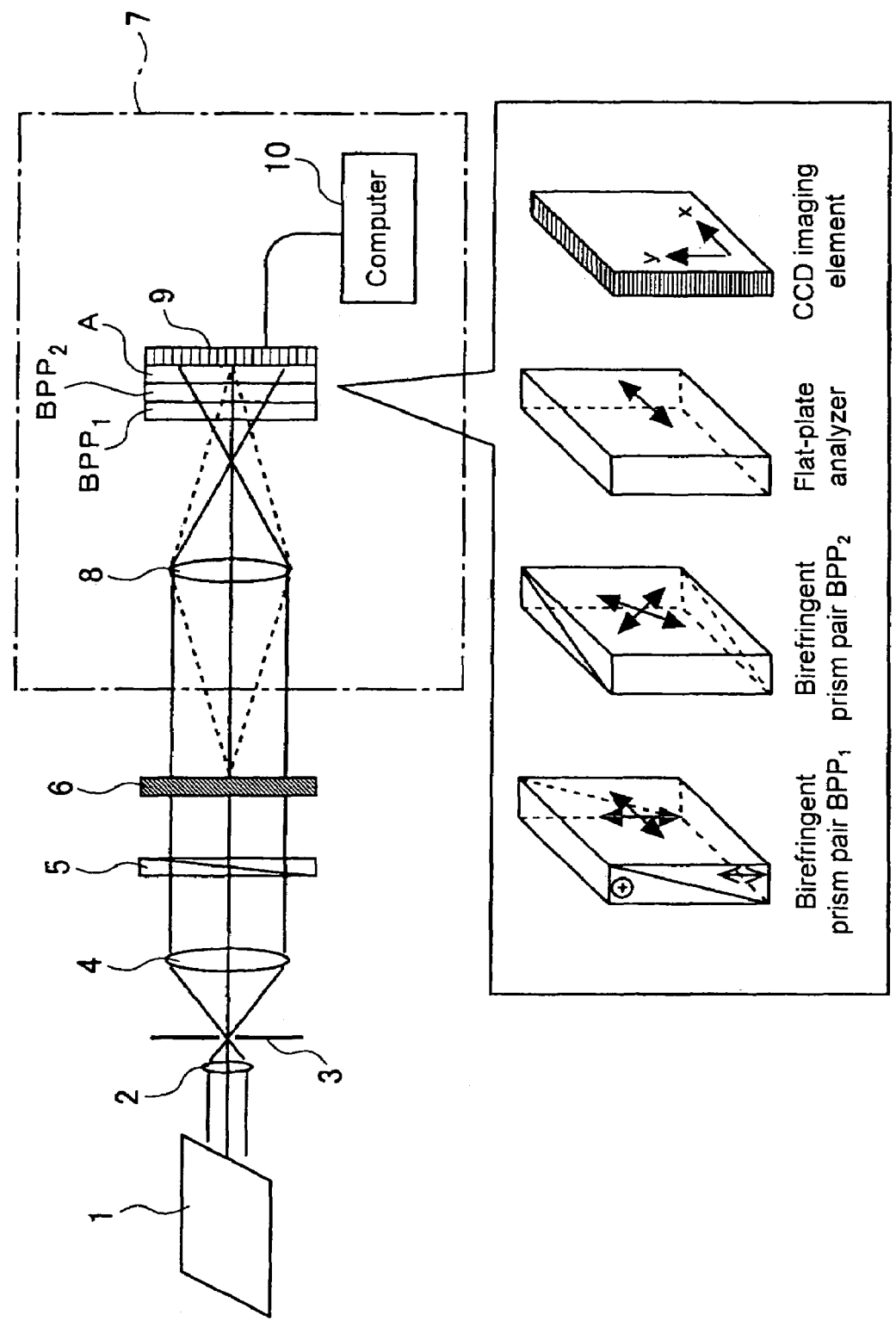
FIG. 19 shows a constitutional view of an experiment system of an imaging polarimetry using a birefringent prism pair proposed by the present inventor and the like in advance.
Figure 20:
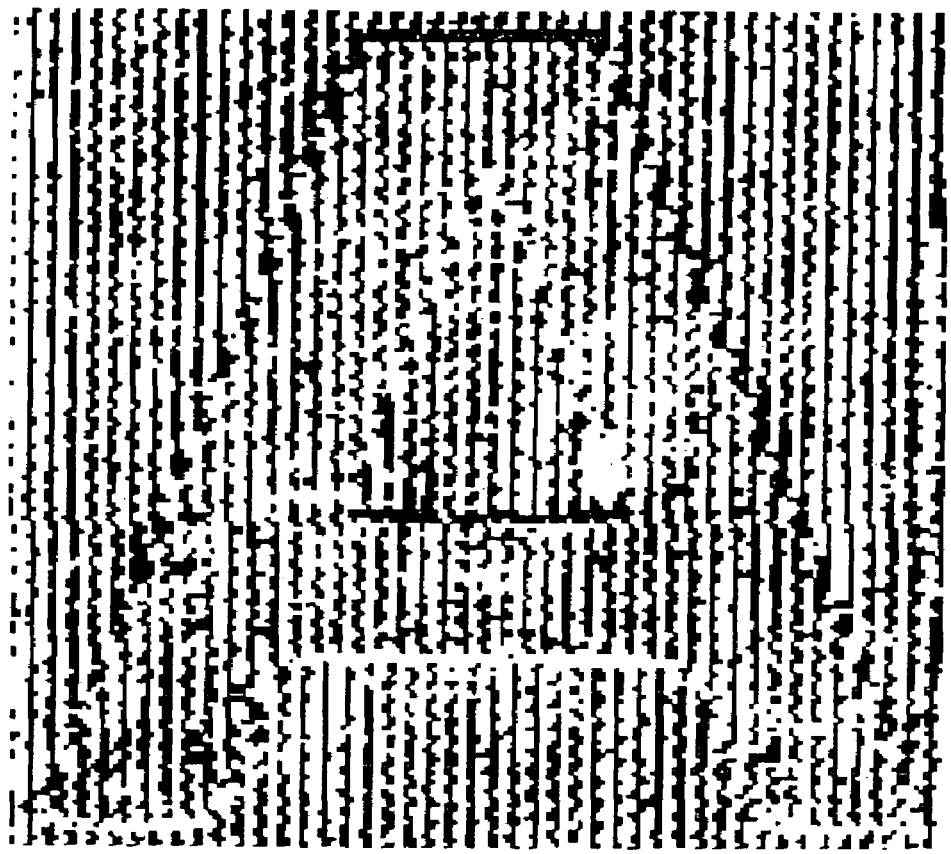
FIG. 20 shows a view of an intensity distribution obtained from an imaging element in the same experiment system.
Figure 21:
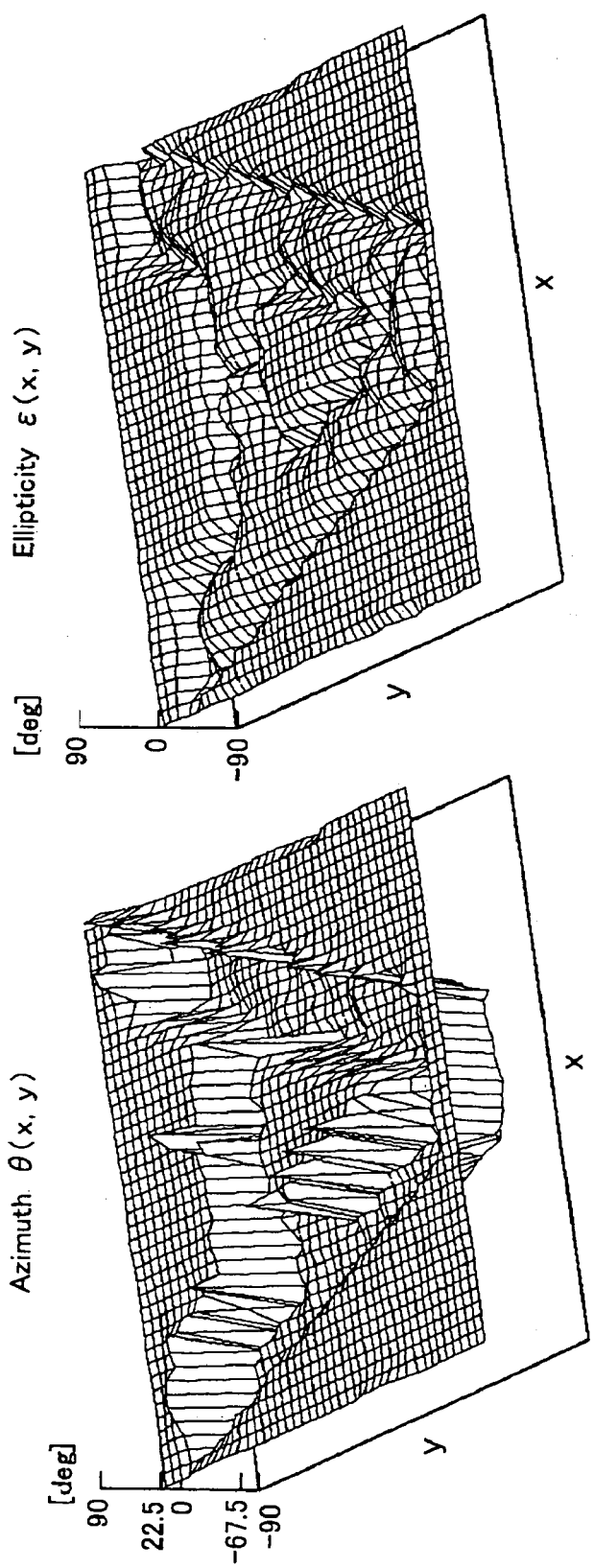
FIG. 21 shows a graph of measured azimuth angle and ellipticity angle in the same experiment system.

FIG. 15 shows a flowchart of a measurement process. As shown in the figure, as the measurement process, first, light under measurement is incident on the device in Step 1501. Here, when the aim of measurement is to examine the SOP associated with transmission and reflection of the light through and on the sample 400, first, the sample 400 is irradiated with light whose SOP is known, and then the light transmitted through or reflected on the sample 400 is incident on the device (photo-receiving side unit 300: polarimeter).

Next in Step 1502, the two-dimensional spatial intensity distribution of the transmitted light is measured with the imaging element 304. Here, the shutter 205 can be utilized for reduction in influence of unnecessary light, such as lost light. Specifically, the intensity distribution of the unnecessary light can be canceled out by taking a difference in intensity distribution when measured with the shutter open and when measured with the shutter closed.

Next in Step 1503, the two-dimensional spatial intensity distribution of the transmitted light is forwarded from the imaging element 304 to the computer 306, to be provided to processing in the arithmetic processing part 306a.

Next in Step 1504, in the computer 306, the arithmetic processing part 306a acquires reference phase functions and reference amplitude functions from the memory part 306b.

Next in Step 1505, in the computer 306, the arithmetic processing part 306a calculates reference phase function differences ($\Delta\phi_1$ and $\Delta\phi_2$) by the use of the measured two-dimensional spatial intensity distribution, the reference phase functions and the reference amplitude functions.

Next in Step 1506, in the computer 306, the arithmetic processing part 306a calculates two-dimensional spatial distribution of Stokes parameters of the light under measurement by the use of the measured two-dimensional spatial intensity distribution, and differences of the reference phase functions and the reference amplitude functions.

Next in Step 1507, in the computer 306, the arithmetic processing part 306a outputs the two-dimensional spatial distribution of the Stokes parameters of the light under measurement. Examples of the measurement result output part 306c may include a memory, a hard disc, and other processing part (calculating part for ellipticity angle, azimuth angle, etc.).

As described above, in the imaging polarimeter of this example, the Stokes parameters regarding the light under measurement are calculated through the pre-calibration process shown in FIG. 14 and the measurement process shown in FIG. 15 in the system constitution shown in FIG. 12.

An example of specific experimental results is described with reference to FIGS. 16 to 18. In this experiment, pre-calibration of the reference phase function and the like is performed. Then, measurement is taken 3 times, rising the temperature about 3° C. at a time. The light under measurement is a linear polarized light with an azimuth of 22.5° and its SOP is constant in a measurement region.

FIGS. 16 and 17 show graphs showing measured results of the ellipticity angle. In FIG. 16, the measured result in the case of the pre-calibration only is shown. FIG. 6A shows the measured result in case that the temperature is raised 3° C., FIG. 6B shows the measured result in case that the temperature is further raised 3° C. (+6° C.), and FIG. 6C shows the measured result in case that the temperature is further raised 3° C. (+9° C.). In FIG. 17, the measured result in case that calibration is performed during measurement in addition to the pre-calibration, and similar to FIG. 16, the measured results in case that the temperature is raised 3° C., 6° C. and 9° C. are shown in FIGS. 17A, 17B and 17C, respectively.

As shown in FIG. 16, it is found that the measured values are shifted as the temperature is raised in the case of the pre-calibration only. Although the SOP of the light under measurement is constant, the measured values are shifted together with the temperature change. In addition, this shift amount varies depending upon a position (spatial coordinates).

Meanwhile, as shown in FIG. 17, in case that the difference of the reference phase function is corrected during measurement (correction during measurement of $\Delta\phi_1$ and $\Delta\phi_2$) in addition to the pre-calibration, almost an ideal value (0°) is provided over the whole measurement region without depending on the temperature change.

FIG. 18A shows a sectional view of the graph showing the measured result in FIG. 16 in case that only the pre-calibration is performed, and FIG. 18B shows a sectional view of the graph showing the measured result in FIG. 17 in case that the calibration during measurement is performed in addition to the pre-calibration. As can be seen from FIG. 18, when the calibration (correction) during measurement is added to the pre-calibration, the measured value does not depend on the temperature change.

Here, since the light under measurement is a linearly polarized light with an azimuth of 22.5°, the measured value of the ellipticity angle should be 0 ideally without depending on the position (spatial coordinates). As can be seen from FIGS. 16 to 18, while the measured result is varied as the temperature is raised in the case of the pre-calibration only, the measured result is in the vicinity of 0° even when the temperature is raised in case of the calibration during measurement is performed in addition to the pre-calibration. Thus, in the imaging polarimeter, the measured result can be stably provided without depending upon a temperature change.

What is claimed is:

1. An imaging polarimetry, comprising:
   a step of preparing a polarimetric imaging device, where a first birefringent prism pair, a second birefringent prism pair and an analyzer, through which light under measurement passes in sequence, and a device for obtaining a two-dimensional intensity distribution of the light having passed through the analyzer are provided,
   each birefringent prism pair comprises parallel flat plates in which two wedge-shaped retarders having the same apex angle are attached and directions of fast axes of the two retarders are orthogonal to each other,
   the second birefringent prism pair is arranged such that the direction of a principal axis of the second birefringent prism pair disagrees with the direction of a principal axis of the first birefringent prism pair, and
   the analyzer is arranged such that the direction of a transmission axis of the analyzer disagrees with the direction of the principal axis of the second birefringent prism pair;
   a step of launching the light under measurement into the polarimetric imaging device to obtain a two-dimensional intensity distribution; and
   an arithmetic step of obtaining a set of phase attribute functions of a measurement system, and also obtaining a parameter indicating a two-dimensional spatial distribution of a state of polarization (SOP) of the light under measurement by the use of the above obtained intensity distribution, wherein
   the set of phase attribute functions is a set of functions defined by properties of the polarimetric imaging device, and includes a function depending upon at least a first reference phase function ($\phi_1(x, y)$) as retardation of the first birefringent prism pair and a function depending upon at least a second reference phase function ($\phi_2(x, y)$) as retardation of the second birefringent prism pair, and by those functions themselves, or by addition of another function defined by the properties of the polarimetric imaging device, the set of phase attribute functions becomes a set of functions sufficient to determine the parameter indicating the two-dimensional spatial distribution of the SOP of the light under measurement.

2. The imaging polarimetry according to claim 1, wherein the analyzer is arranged such that the direction of the transmission axis of the analyzer forms an angle of 45° with respect to the direction of the principal axis of the second birefringent prism pair.

3. The imaging polarimetry according to claim 1, wherein, in the arithmetic step,
   the set of phase attribute functions is composed of the first reference phase function and the second reference phase function, and
   data showing a relation between the first reference phase function and the second reference phase function is made available, and
   the arithmetic step is a unit where,
   by the use of the obtained intensity distribution, a first intensity distribution component which nonperiodically vibrates with special coordinates and a third intensity distribution component which vibrates with spatial coordinates at a frequency depending upon the second reference phase function and not depending upon the first reference phase function are obtained, and at least one of a second intensity distribution component which vibrates with spatial coordinates at a frequency depending upon a difference between the first reference phase function and the second reference phase function, a fourth intensity distribution component which vibrates with spatial coordinates at a frequency depending upon a sum of the first reference phase function and the second reference phase function, and a fifth intensity distribution component which vibrates with spatial coordinates at a frequency depending upon the first reference phase function and not depending upon the second reference phase function is obtained, and by the use of the data showing the relation between the first reference phase function and the second reference phase function and each of the intensity distribution components, the first reference phase function and the second reference phase function are obtained, and also the parameter indicating the two-dimensional spatial distribution of the SOP is obtained.

4. The imaging polarimetry according to claim 3, further comprising a step of launching light for calibration, with known parameters each showing the two-dimensional spatial distribution of the SOP, into the polarimetric imaging device to obtain a two-dimensional intensity distribution for calibration, so as to obtain the data showing the relation between the first reference phase function difference and the second reference phase function difference, by the use of each of the parameters showing the two-dimensional spatial distribution of the SOP of the light for calibration and the obtained intensity distribution for calibration, whereby the data showing the relation between the first reference phase function difference and the second reference phase function difference is made available.

5. The imaging polarimetry according to claim 4, wherein the light for calibration is linearly polarized light.

6. The imaging polarimetry according to claim 1, wherein, in the arithmetic step, the set of phase attribute functions is composed of a difference ($\Delta\phi_1(x, y)$) of the first reference phase function from a reference value for calibration of the first reference phase function and a difference ($\Delta\phi_2(x, y)$) of the second reference phase function from a reference value for calibration of the second reference phase function, and the reference value ($\phi_1^{(i)}(x, y)$) for calibration of the first reference phase function, the reference value ($\phi_2^{(i)}(x, y)$) for calibration of the second reference phase function, and data showing a relation between the first reference phase function difference and the second reference phase function difference are made available, and the arithmetic step is a unit where, by the use of the obtained intensity distribution, a first spectral intensity component which nonperiodically vibrates with spatial coordinates and a third intensity distribution component which vibrates with spatial coordinates at a frequency depending upon the second reference phase function and not depending upon the first reference phase function are obtained, and at least one of a second intensity distribution component which vibrates with spatial coordinates at a frequency depending upon a difference between the first reference phase function and the second reference phase function, a fourth intensity distribution component which vibrates with spatial coordinates at a frequency depending upon a sum of the first reference phase function and the second reference phase function, and a fifth intensity distribution component which vibrates with spatial coordinates at a frequency depending upon the first reference phase function and not depending upon the second reference phase function is obtained, and by the use of the reference value for calibration of the first reference phase function, the reference value for calibration of the second reference phase function, the data showing the relation between the first reference phase function difference and the second reference phase function difference, and each of the obtained intensity distribution components, the first reference phase function difference and the second reference phase function difference are obtained, and also the parameter indicating the two-dimensional spatial distribution of the SOP is obtained.

7. The imaging polarimetry according to claim 6, further comprising a step of launching light for calibration, with known parameters each showing the two-dimensional spatial distribution of the SOP, into the polarimetric imaging device to obtain a two-dimensional intensity distribution for calibration, so as to obtain the reference value ($\phi_1^{(i)}(x, y)$) for calibration of the first reference phase function and the reference value ($\phi_2^{(i)}(x, y)$) for calibration for the second reference phase function by the use of each of the parameters showing the two-dimensional spatial distribution of the SOP of the light for calibration and the obtained intensity distribution for calibration, whereby these reference values for calibration are made available.

8. The imaging polarimetry according to claim 7, wherein the light for calibration is linearly polarized light.

9. The imaging polarimetry according to claim 6, further comprising a step of launching light for calibration, with known parameters each showing the two-dimensional spatial distribution of the SOP, into the polarimetric imaging device to obtain a two-dimensional intensity distribution for calibration, so as to obtain the reference value ($\phi_1^{(i)}(x, y)$) for calibration of the first reference phase function, the reference value ($\phi^{2(i)}(x, y)$) for calibration for the second reference phase function, and the data showing the relation between the first reference phase function difference and the second reference phase function difference, by the use of each of the parameters showing the two-dimensional spatial distribution of the SOP of the light for calibration and the obtained intensity distribution for calibration, whereby these reference values for calibration are made available.

10. The imaging polarimetry according to claim 1, wherein, in the arithmetic step, a value of each element of a generalized inverse matrix of a matrix is made available such that a relation is formed where a first vector including information on the two-dimensional intensity distribution is expressed by a product of the matrix and a second vector including information on the two-dimensional spatial distribution of the SOP of the light under measurement and information on the set of phase attribute functions, and the arithmetic step is a unit where a value of each element of the first vector is specified by the use of the obtained intensity distribution, a value of each element of the second vector is obtained by calculation of a product of the generalized inverse matrix and the first vector, and by the use of the value of the element included in the second vector, the set of phase attribute functions is obtained, and also the parameter showing the two-dimensional spatial distribution of the SOP of the light under measurement is obtained.

11. The imaging polarimetry according to claim 10, wherein, in the arithmetic step, the set of phase attribute functions is composed of a difference ($\Delta\phi_1(x, y)$) of the first reference phase function from a reference value for calibration of the first reference phase function and a difference ($\Delta\phi_2(x, y)$) of the second reference phase function from a reference value for calibration of the second reference phase function, data showing a relation between the first reference phase function difference and the second reference phase function difference is made available, and further the generalized inverse matrix of the matrix, obtained from the reference value ($\phi_1^{(i)}(x, y)$) for calibration of the first reference phase function and the reference value ($\phi_2^{(i)}(x, y)$) for calibration for the second reference phase function, is made available, and the arithmetic step is a unit where a value of each element of the first vector is specified by the use of the obtained intensity distribution, a value of each element of the second vector is obtained by calculation of a product of the generalized inverse matrix and the first vector, and by the use of the value of the element included in the second vector and the data showing the relation between the first reference phase function difference and the second reference phase function difference, the first reference phase function difference and the second reference phase function difference are obtained, and also the parameter showing the two-dimensional spatial distribution of the SOP is obtained.

12. An imaging polarimeter, comprising:

a polarimetric imaging device in which a first birefringent prism pair, a second birefringent prism pair and an analyzer, through which light under measurement passes in sequence, and a device for obtaining a two-dimensional intensity distribution of the light having passed through the analyzer are provided, each birefringent prism pair comprises parallel flat plates in which two wedge-shaped retarders having the same apex angle are attached and directions of fast axes of the two retarders are orthogonal to each other, the second birefringent prism pair is arranged such that the direction of a principal axis of the second birefringent prism pair disagrees with the direction of a principal axis of the first birefringent prism pair, and the analyzer is arranged such that the direction of a transmission axis of the analyzer disagrees with the direction of the principal axis of the second birefringent prism pair; and an arithmetic unit for obtaining a set of phase attribute functions of a measurement system, and also obtaining a parameter indicating a two-dimensional spatial distribution of a state of polarization (SOP) of the light under measurement by the use of the two-dimensional intensity distribution obtained by launching the light under measurement into the polarimetric imaging device, wherein the set of phase attribute functions is a set of functions defined by properties of the polarimetric imaging device, and includes a function depending upon at least a first reference phase function ($\phi_1(x, y)$) as retardation of the first birefringent prism pair and a function depending upon at least a second reference phase function ($\phi_2(x, y)$) as retardation of the second retarder, and by those functions themselves, or by addition of another function defined by the properties of the polarimetric imaging device, the set of phase attribute functions becomes a set of functions sufficient to determine a parameter indicating a two-dimensional spatial distribution of the SOP of the light under measurement.

13. The imaging polarimeter according to claim 12, wherein the analyzer is arranged such that the direction of the transmission axis of the analyzer forms an angle of 45° with respect to the direction of the principal axis of the second birefringent prism pair.

14. The spectroscopic polarimeter according to claim 12, wherein, in the arithmetic unit, the set of phase attribute functions is composed of the first reference phase function and the second reference phase function, and data showing a relation between the first reference phase function and the second reference phase function is made available, and the arithmetic unit is a unit where, by the use of the two-dimensional intensity distribution obtained by launching the light under measurement into the polarimetric imaging device, a first intensity distribution component which nonperiodically vibrates with spatial coordinates and a third intensity distribution component which vibrates with spatial coordinates at a frequency depending upon a second reference phase function and not depending upon the first reference phase function are obtained, and at least one of a second intensity distribution component which vibrates with spatial coordinates at a frequency depending upon a difference between the first reference phase function and the second reference phase function, a fourth intensity distribution component which vibrates with spatial coordinates at a frequency depending upon a sum of the first reference phase function and the second reference phase function, and a fifth intensity distribution component which vibrates with spatial coordinates at a frequency depending upon the first reference phase function and not depending upon the second reference phase function is obtained, and by the use of the data showing the relation between the first reference phase function and the second reference phase function and each of the obtained intensity distribution components, the first reference phase function and the second reference phase function are obtained, and also the parameter indicating the two-dimensional spatial distribution of the SOP is obtained.

15. The imaging polarimeter according to claim 12, wherein, in the arithmetic unit, the set of phase attribute functions is composed of a difference ($\Delta\phi_1(x, y)$) of the first reference phase function from a reference value for calibration of the first reference phase function and a difference ($\Delta\phi_2(x, y)$) of the second reference phase function from a reference value for calibration of the second reference phase function, and the reference value ($\phi_1^{(i)}(x, y)$) for calibration of the first reference phase function, the reference value ($\phi_2^{(i)}(x, y)$) for calibration of the second reference phase function, and data showing a relation between the first reference phase function difference and the second reference phase function difference are made available, and the arithmetic unit is a unit where, by the use of the two-dimensional intensity distribution obtained by launching the light under measurement into the polarimetric imaging device, a first intensity distribution component which nonperiodically vibrates with spatial coordinates and a third intensity distribution component which vibrates with spatial coordinates at a frequency depending upon a second reference phase function and not depending upon the first reference phase function are obtained, and at least one of a second intensity distribution component which vibrates with spatial coordinates at a frequency depending upon a difference between the first reference phase function and the second reference phase function, a fourth intensity distribution component which vibrates with spatial coordinates at a frequency depending upon a sum of the first reference phase function and the second reference phase function, and a fifth intensity distribution component which vibrates with spatial coordinates at a frequency depending upon the first reference phase function and not depending upon the second reference phase function is obtained, and by the use of the reference value for calibration of the first reference phase function, the reference value for calibration of the second reference phase function, the data showing the relation between the first reference phase function difference and the second reference phase function difference, and each of the obtained intensity distribution components, the first reference phase function difference and the second reference phase function difference are obtained, and also the parameter indicating the two-dimensional spatial distribution of the SOP is obtained.

16. The imaging polarimeter according to claim 12, wherein, in the arithmetic unit, a value of each element of a generalized inverse matrix of a matrix is made available such that a relation is formed where a first vector including information on the two-dimensional intensity distribution is expressed by a product of the matrix and a second vector including information on the two-dimensional spatial distribution of the SOP of the light under measurement and information on the set of the phase attribute function, and the arithmetic unit is a unit where a value of each element of the first vector is specified by the use of the two-dimensional intensity distribution obtained by launching the light under measurement into the polarimetric imaging device, a value of each element of the second vector is obtained by calculation of a product of the generalized inverse matrix and the first vector, and by the use of the value of the element included in the second vector, the set of phase attribute functions is obtained, and also the parameter showing the two-dimensional spatial distribution of the SOP of the light under measurement is obtained.

17. The spectroscopic polarimeter according to claim 16, wherein, in the arithmetic unit, the set of phase attribute functions is composed of a difference ($\Delta\phi_1(x, y)$) of the first reference phase function from a reference value for calibration of the first reference phase function and a difference ($\Delta\phi_2(x, y)$) of the second reference phase function from a reference value for calibration of the second reference phase function, data showing a relation between the first reference phase function difference and the second reference phase function difference is made available, and further the generalized inverse matrix of the matrix, obtained from the reference value ($\phi_1^{(i)}(x, y)$) for calibration of the first reference phase function and the reference value ($\phi_2^{(i)}(x, y)$) for calibration for the second reference phase function, is made available, and the arithmetic unit is a unit where a value of each element of the first vector is specified by the use of the two-dimensional intensity distribution obtained by launching the light under measurement into the polarimetric imaging device, a value of each element of the second vector is obtained by calculation of a product of the generalized inverse matrix and the first vector, and by the use of the value of the element included in the second vector and the data showing the relation between the first reference phase function difference and the second reference phase function difference, the first reference phase function difference and the second reference phase function difference are obtained, and also the parameter showing the two-dimensional spatial distribution of the SOP is obtained.

* * * * *